(12) United States Patent
Ozick et al.

(10) Patent No.: US 9,317,038 B2
(45) Date of Patent: Apr. 19, 2016

(54) DETECTING ROBOT STASIS

(71) Applicant: iRobot Corporation, Bedford, MA (US)

(72) Inventors: Daniel N. Ozick, Newton, MA (US); Duane L. Gilbert, Jr., Goffstown, NH (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 13/777,648

(22) Filed: Feb. 26, 2013

(65) Prior Publication Data
US 2013/0310978 A1 Nov. 21, 2013

Related U.S. Application Data

(63) Continuation of application No. 11/756,262, filed on May 31, 2007, now Pat. No. 8,417,383.

(60) Provisional application No. 60/803,608, filed on May 31, 2006.

(51) Int. Cl.
*A47L 9/28* (2006.01)
*G05D 1/02* (2006.01)
*A47L 9/00* (2006.01)

(52) U.S. Cl.
CPC .............. *G05D 1/0231* (2013.01); *A47L 9/009* (2013.01); *A47L 9/2826* (2013.01); *G05D 1/0227* (2013.01); *A47L 2201/00* (2013.01); *A47L 2201/04* (2013.01); *G05D 2201/0203* (2013.01)

(58) Field of Classification Search
CPC .............. G05D 1/0231; G05D 1/0227; G05D 2201/0203; A47L 9/009; A47L 9/2826; A47L 2201/00; A47L 2201/04; G01B 5/28
USPC ............. 250/231.13, 231.14, 231.16, 231.17, 250/231.18; 700/245, 258; 701/23
See application file for complete search history.

(56) References Cited

U.S. PATENT DOCUMENTS

| 1,755,054 | A | 4/1930 | Darst |
| 1,780,221 | A | 11/1930 | Buchmann |

(Continued)

FOREIGN PATENT DOCUMENTS

| DE | 2128842 C3 | 12/1980 |
| DE | 3317376 C2 | 12/1987 |

(Continued)

OTHER PUBLICATIONS

Andersen et al., "Landmark based navigation strategies," SPIE Conference on Mobile Robots XIII, SPIE vol. 3525, pp. 170-181, Jan. 8, 1999.

(Continued)

*Primary Examiner* — Stephen Holwerda
(74) *Attorney, Agent, or Firm* — Fish & Richardson P.C.

(57) ABSTRACT

A coverage robot includes a drive configured to maneuver the robot as directed by a controller, a stasis indication wheel rotatable about a first axis perpendicular to a direction of forward travel, and a suspension supporting the wheel. The stasis indication wheel defines a first reflective portion and a second reflective portion. The second reflective portion is substantially less reflective than the first reflective portion. The suspension permits movement of the wheel in a direction other than rotation about the first axis. A signal emitter is disposed remotely from the wheel and positioned to direct a signal that sequentially is intercepted by the first and second reflective portions of the wheel. A signal receiver is positioned to receive the reflected signal by the rotating wheel. Communication between the emitter and the receiver is affected by rolling transitions between the first and second reflective portions during permitted movement of the wheel.

20 Claims, 13 Drawing Sheets

(56) References Cited

U.S. PATENT DOCUMENTS

| | | |
|---|---|---|
| 1,970,302 A | 8/1934 | Gerhardt |
| 2,136,324 A | 11/1938 | John |
| 2,302,111 A | 11/1942 | Dow et al. |
| 2,353,621 A | 7/1944 | Sav et al. |
| 2,770,825 A | 11/1956 | Pullen |
| 2,930,055 A | 3/1960 | Fallen et al. |
| 3,119,369 A | 1/1964 | Harland et al. |
| 3,166,138 A | 1/1965 | Dunn |
| 3,333,564 A | 8/1967 | Waters |
| 3,375,375 A | 3/1968 | Robert et al. |
| 3,381,652 A | 5/1968 | Schaefer et al. |
| 3,457,575 A | 7/1969 | Bienek |
| 3,550,714 A | 12/1970 | Bellinger |
| 3,569,727 A | 3/1971 | Aggarwal et al. |
| 3,649,981 A | 3/1972 | Woodworth |
| 3,674,316 A | 7/1972 | De Bray |
| 3,678,882 A | 7/1972 | Kinsella |
| 3,690,559 A | 9/1972 | Rudloff |
| 3,744,586 A | 7/1973 | Leinauer |
| 3,756,667 A | 9/1973 | Bombardier et al. |
| 3,809,004 A | 5/1974 | Leonheart |
| 3,816,004 A | 6/1974 | Bignardi |
| 3,845,831 A | 11/1974 | James |
| RE28,268 E | 12/1974 | Autrand |
| 3,851,349 A | 12/1974 | Lowder |
| 3,853,086 A | 12/1974 | Asplund |
| 3,863,285 A | 2/1975 | Hukuba |
| 3,888,181 A | 6/1975 | Kups |
| 3,937,174 A | 2/1976 | Haaga |
| 3,952,361 A | 4/1976 | Wilkins |
| 3,989,311 A | 11/1976 | Debrey |
| 3,989,931 A | 11/1976 | Phillips |
| 4,004,313 A | 1/1977 | Capra |
| 4,012,681 A | 3/1977 | Finger et al. |
| 4,070,170 A | 1/1978 | Leinfelt |
| 4,099,284 A | 7/1978 | Shinozaki et al. |
| 4,119,900 A | 10/1978 | Kremnitz |
| 4,175,589 A | 11/1979 | Nakamura et al. |
| 4,175,892 A | 11/1979 | De bray |
| 4,196,727 A | 4/1980 | Verkaart et al. |
| 4,198,727 A | 4/1980 | Farmer |
| 4,199,838 A | 4/1980 | Simonsson |
| 4,209,254 A | 6/1980 | Reymond et al. |
| D258,901 S | 4/1981 | Keyworth |
| 4,297,578 A | 10/1981 | Carter |
| 4,305,234 A | 12/1981 | Pichelman |
| 4,306,329 A | 12/1981 | Yokoi |
| 4,309,758 A | 1/1982 | Halsall et al. |
| 4,328,545 A | 5/1982 | Halsall et al. |
| 4,367,403 A | 1/1983 | Miller |
| 4,369,543 A | 1/1983 | Chen et al. |
| 4,401,909 A | 8/1983 | Gorsek |
| 4,416,033 A | 11/1983 | Specht |
| 4,445,245 A | 5/1984 | Lu |
| 4,465,370 A | 8/1984 | Yuasa et al. |
| 4,477,998 A | 10/1984 | You |
| 4,481,692 A | 11/1984 | Kurz |
| 4,482,960 A | 11/1984 | Pryor |
| 4,492,058 A | 1/1985 | Goldfarb et al. |
| 4,513,469 A | 4/1985 | Godfrey et al. |
| D278,732 S | 5/1985 | Ohkado |
| 4,518,437 A | 5/1985 | Sommer |
| 4,534,637 A | 8/1985 | Suzuki et al. |
| 4,556,313 A | 12/1985 | Miller et al. |
| 4,575,211 A | 3/1986 | Matsumura et al. |
| 4,580,311 A | 4/1986 | Kurz |
| 4,601,082 A | 7/1986 | Kurz |
| 4,618,213 A | 10/1986 | Chen |
| 4,620,285 A | 10/1986 | Perdue |
| 4,624,026 A | 11/1986 | Olson et al. |
| 4,626,995 A | 12/1986 | Lofgren et al. |
| 4,628,454 A | 12/1986 | Ito |
| 4,638,445 A | 1/1987 | Mattaboni |
| 4,644,156 A | 2/1987 | Takahashi et al. |
| 4,649,504 A | 3/1987 | Krouglicof et al. |
| 4,652,917 A | 3/1987 | Miller |
| 4,654,492 A | 3/1987 | Koerner et al. |
| 4,654,924 A | 4/1987 | Getz et al. |
| 4,660,969 A | 4/1987 | Sorimachi et al. |
| 4,662,854 A | 5/1987 | Fang |
| 4,674,048 A | 6/1987 | Okumura |
| 4,679,152 A | 7/1987 | Perdue |
| 4,680,827 A | 7/1987 | Hummel |
| 4,696,074 A | 9/1987 | Cavalli |
| D292,223 S | 10/1987 | Trumbull |
| 4,700,301 A | 10/1987 | Dyke |
| 4,700,427 A | 10/1987 | Knepper |
| 4,703,820 A | 11/1987 | Reinaud |
| 4,709,773 A | 12/1987 | Clement et al. |
| 4,710,020 A | 12/1987 | Maddox et al. |
| 4,712,740 A | 12/1987 | Duncan et al. |
| 4,716,621 A | 1/1988 | Zoni |
| 4,728,801 A | 3/1988 | O'Connor |
| 4,733,343 A | 3/1988 | Yoneda et al. |
| 4,733,430 A | 3/1988 | Westergren |
| 4,733,431 A | 3/1988 | Martin |
| 4,735,136 A | 4/1988 | Lee et al. |
| 4,735,138 A | 4/1988 | Gawler et al. |
| 4,748,336 A | 5/1988 | Fujie et al. |
| 4,748,833 A | 6/1988 | Nagasawa |
| 4,756,049 A | 7/1988 | Uehara |
| 4,767,213 A | 8/1988 | Hummel |
| 4,769,700 A | 9/1988 | Pryor |
| 4,777,416 A | 10/1988 | George et al. |
| D298,766 S | 11/1988 | Tanno et al. |
| 4,782,550 A | 11/1988 | Jacobs |
| 4,796,198 A | 1/1989 | Boultinghouse et al. |
| 4,806,751 A | 2/1989 | Abe et al. |
| 4,811,228 A | 3/1989 | Hyyppa |
| 4,813,906 A | 3/1989 | Matsuyama et al. |
| 4,815,157 A | 3/1989 | Tsuchiya |
| 4,817,000 A | 3/1989 | Eberhardt |
| 4,818,875 A | 4/1989 | Weiner |
| 4,818,978 A * | 4/1989 | Kurihara ............ G06F 3/03543 345/164 |
| 4,829,442 A | 5/1989 | Kadonoff et al. |
| 4,829,626 A | 5/1989 | Harkonen et al. |
| 4,832,098 A | 5/1989 | Palinkas et al. |
| 4,851,661 A | 7/1989 | Everett |
| 4,854,000 A | 8/1989 | Takimoto |
| 4,854,006 A | 8/1989 | Nishimura et al. |
| 4,855,915 A | 8/1989 | Dallaire |
| 4,857,912 A | 8/1989 | Everett et al. |
| 4,858,132 A | 8/1989 | Holmquist |
| 4,867,570 A | 9/1989 | Sorimachi et al. |
| 4,880,474 A | 11/1989 | Koharagi et al. |
| 4,887,415 A | 12/1989 | Martin |
| 4,891,762 A | 1/1990 | Chotiros |
| 4,893,025 A | 1/1990 | Lee |
| 4,901,394 A | 2/1990 | Nakamura et al. |
| 4,905,151 A | 2/1990 | Weiman et al. |
| 4,909,972 A | 3/1990 | Britz |
| 4,912,643 A | 3/1990 | Beirne |
| 4,918,441 A | 4/1990 | Bohman |
| 4,919,224 A | 4/1990 | Shyu et al. |
| 4,919,489 A | 4/1990 | Kopsco |
| 4,920,060 A | 4/1990 | Parrent et al. |
| 4,920,605 A | 5/1990 | Takashima |
| 4,933,864 A | 6/1990 | Evans et al. |
| 4,937,912 A | 7/1990 | Kurz |
| 4,953,253 A | 9/1990 | Fukuda et al. |
| 4,954,962 A | 9/1990 | Evans et al. |
| 4,955,714 A | 9/1990 | Stotler et al. |
| 4,956,891 A | 9/1990 | Wulff |
| 4,961,303 A | 10/1990 | McCarty et al. |
| 4,961,304 A | 10/1990 | Ovsborn et al. |
| 4,962,453 A | 10/1990 | Pong et al. |
| 4,967,862 A | 11/1990 | Pong et al. |
| 4,971,591 A | 11/1990 | Raviv et al. |
| 4,973,912 A | 11/1990 | Kaminski et al. |
| 4,974,283 A | 12/1990 | Holsten et al. |
| 4,977,618 A | 12/1990 | Allen |
| 4,977,639 A | 12/1990 | Takahashi et al. |
| 4,986,663 A | 1/1991 | Cecchi et al. |

(56) References Cited

U.S. PATENT DOCUMENTS

| | | |
|---|---|---|
| 5,001,635 A | 3/1991 | Yasutomi et al. |
| 5,002,145 A | 3/1991 | Wakaumi et al. |
| 5,012,886 A | 5/1991 | Jonas et al. |
| 5,018,240 A | 5/1991 | Holman |
| 5,020,186 A | 6/1991 | Lessig et al. |
| 5,022,812 A | 6/1991 | Coughlan et al. |
| 5,023,788 A | 6/1991 | Kitazume et al. |
| 5,024,529 A | 6/1991 | Svetkoff et al. |
| D318,500 S | 7/1991 | Malewicki et al. |
| 5,032,775 A | 7/1991 | Mizuno et al. |
| 5,033,151 A | 7/1991 | Kraft et al. |
| 5,033,291 A | 7/1991 | Podoloff et al. |
| 5,040,116 A | 8/1991 | Evans et al. |
| 5,045,769 A | 9/1991 | Everett |
| 5,049,802 A | 9/1991 | Mintus et al. |
| 5,051,906 A | 9/1991 | Evans et al. |
| 5,062,819 A | 11/1991 | Mallory |
| 5,070,567 A | 12/1991 | Holland |
| 5,084,934 A | 2/1992 | Lessig et al. |
| 5,086,535 A | 2/1992 | Grossmeyer et al. |
| 5,090,321 A | 2/1992 | Abouav |
| 5,093,955 A | 3/1992 | Blehert et al. |
| 5,094,311 A | 3/1992 | Akeel |
| 5,098,262 A | 3/1992 | Wecker et al. |
| 5,105,502 A | 4/1992 | Takashima |
| 5,105,550 A | 4/1992 | Shenoha |
| 5,109,566 A | 5/1992 | Kobayashi et al. |
| 5,111,401 A | 5/1992 | Everett, Jr. et al. |
| 5,115,538 A | 5/1992 | Cochran et al. |
| 5,127,128 A | 7/1992 | Lee |
| 5,136,675 A | 8/1992 | Hodson |
| 5,136,750 A | 8/1992 | Takashima et al. |
| 5,142,985 A | 9/1992 | Stearns et al. |
| 5,144,471 A | 9/1992 | Takanashi et al. |
| 5,144,714 A | 9/1992 | Mori et al. |
| 5,144,715 A | 9/1992 | Matsuyo et al. |
| 5,152,028 A | 10/1992 | Hirano |
| 5,152,202 A | 10/1992 | Strauss |
| 5,154,617 A | 10/1992 | Suman et al. |
| 5,155,684 A | 10/1992 | Burke et al. |
| 5,163,202 A | 11/1992 | Kawakami et al. |
| 5,163,320 A | 11/1992 | Goshima et al. |
| 5,164,579 A | 11/1992 | Pryor et al. |
| 5,165,064 A | 11/1992 | Mattaboni |
| 5,170,352 A | 12/1992 | McTamaney et al. |
| 5,173,881 A | 12/1992 | Sindle |
| 5,182,833 A | 2/1993 | Yamaguchi et al. |
| 5,187,662 A | 2/1993 | Kamimura et al. |
| 5,202,742 A | 4/1993 | Frank et al. |
| 5,204,814 A | 4/1993 | Noonan et al. |
| 5,206,500 A | 4/1993 | Decker et al. |
| 5,208,521 A | 5/1993 | Aoyama |
| 5,216,777 A | 6/1993 | Moro et al. |
| 5,222,786 A | 6/1993 | Sovis et al. |
| 5,227,985 A | 7/1993 | DeMenthon |
| 5,233,682 A | 8/1993 | Abe et al. |
| 5,239,720 A | 8/1993 | Wood et al. |
| 5,251,358 A | 10/1993 | Moro et al. |
| 5,261,139 A | 11/1993 | Lewis |
| 5,276,618 A | 1/1994 | Everett |
| 5,276,939 A | 1/1994 | Uenishi |
| 5,277,064 A | 1/1994 | Knigga et al. |
| 5,279,672 A | 1/1994 | Betker et al. |
| 5,284,452 A | 2/1994 | Corona |
| 5,284,522 A | 2/1994 | Kobayashi et al. |
| 5,293,955 A | 3/1994 | Lee |
| D345,707 S | 4/1994 | Alister |
| 5,303,448 A | 4/1994 | Hennessey et al. |
| 5,307,273 A | 4/1994 | Oh et al. |
| 5,309,592 A | 5/1994 | Hiratsuka |
| 5,310,379 A | 5/1994 | Hippely et al. |
| 5,315,227 A | 5/1994 | Pierson et al. |
| 5,319,827 A | 6/1994 | Yang |
| 5,319,828 A | 6/1994 | Waldhauser et al. |
| 5,321,614 A | 6/1994 | Ashworth |
| 5,323,483 A | 6/1994 | Baeg |
| 5,324,948 A | 6/1994 | Dudar et al. |
| 5,331,713 A | 7/1994 | Tipton |
| 5,341,186 A | 8/1994 | Kato |
| 5,341,540 A | 8/1994 | Soupert et al. |
| 5,341,549 A | 8/1994 | Wirtz et al. |
| 5,345,649 A | 9/1994 | Whitlow |
| 5,352,901 A | 10/1994 | Poorman |
| 5,353,224 A | 10/1994 | Lee et al. |
| 5,363,305 A | 11/1994 | Cox et al. |
| 5,363,935 A | 11/1994 | Schempf et al. |
| 5,369,347 A | 11/1994 | Yoo |
| 5,369,838 A | 12/1994 | Wood et al. |
| 5,386,862 A | 2/1995 | Glover et al. |
| 5,399,951 A | 3/1995 | Lavallee et al. |
| 5,400,244 A | 3/1995 | Watanabe et al. |
| 5,404,612 A | 4/1995 | Ishikawa |
| 5,410,479 A | 4/1995 | Coker |
| 5,435,405 A | 7/1995 | Schempf et al. |
| 5,440,216 A | 8/1995 | Kim |
| 5,442,358 A | 8/1995 | Keeler et al. |
| 5,444,965 A | 8/1995 | Colens |
| 5,446,356 A | 8/1995 | Kim |
| 5,446,445 A | 8/1995 | Bloomfield et al. |
| 5,451,135 A | 9/1995 | Schempf et al. |
| 5,454,129 A | 10/1995 | Kell |
| 5,455,982 A | 10/1995 | Armstrong et al. |
| 5,465,525 A | 11/1995 | Mifune et al. |
| 5,465,619 A | 11/1995 | Sotack et al. |
| 5,467,273 A | 11/1995 | Faibish et al. |
| 5,471,560 A | 11/1995 | Allard et al. |
| 5,491,670 A | 2/1996 | Weber |
| 5,497,529 A | 3/1996 | Boesi |
| 5,498,948 A | 3/1996 | Bruni et al. |
| 5,502,638 A | 3/1996 | Takenaka |
| 5,505,072 A | 4/1996 | Oreper |
| 5,507,067 A | 4/1996 | Hoekstra et al. |
| 5,510,893 A | 4/1996 | Suzuki |
| 5,511,147 A | 4/1996 | Abdel |
| 5,515,572 A | 5/1996 | Hoekstra et al. |
| 5,534,762 A | 7/1996 | Kim |
| 5,535,476 A | 7/1996 | Kresse et al. |
| 5,537,017 A | 7/1996 | Feiten et al. |
| 5,537,711 A | 7/1996 | Tseng |
| 5,539,953 A | 7/1996 | Kurz |
| 5,542,146 A | 8/1996 | Hoekstra et al. |
| 5,542,148 A | 8/1996 | Young |
| 5,546,631 A | 8/1996 | Chambon |
| 5,548,511 A | 8/1996 | Bancroft |
| 5,551,119 A | 9/1996 | Wörwag |
| 5,551,525 A | 9/1996 | Pack et al. |
| 5,553,349 A | 9/1996 | Kilstrom et al. |
| 5,555,587 A | 9/1996 | Guha |
| 5,560,077 A | 10/1996 | Crotchett |
| 5,568,589 A | 10/1996 | Hwang |
| D375,592 S | 11/1996 | Ljunggren |
| 5,608,306 A | 3/1997 | Rybeck et al. |
| 5,608,894 A | 3/1997 | Kawakami et al. |
| 5,608,944 A | 3/1997 | Gordon |
| 5,610,488 A | 3/1997 | Miyazawa |
| 5,611,106 A | 3/1997 | Wulff |
| 5,611,108 A | 3/1997 | Knowlton et al. |
| 5,613,261 A | 3/1997 | Kawakami et al. |
| 5,613,269 A | 3/1997 | Miwa |
| 5,621,291 A | 4/1997 | Lee |
| 5,622,236 A | 4/1997 | Azumi et al. |
| 5,634,237 A | 6/1997 | Paranjpe |
| 5,634,239 A | 6/1997 | Tuvin et al. |
| 5,636,402 A | 6/1997 | Kubo et al. |
| 5,642,299 A | 6/1997 | Hardin et al. |
| 5,646,494 A | 7/1997 | Han |
| 5,647,554 A | 7/1997 | Ikegami et al. |
| 5,650,702 A | 7/1997 | Azumi |
| 5,652,489 A | 7/1997 | Kawakami |
| 5,682,313 A | 10/1997 | Edlund et al. |
| 5,682,839 A | 11/1997 | Grimsley et al. |
| 5,696,675 A | 12/1997 | Nakamura et al. |
| 5,698,861 A | 12/1997 | Oh |
| 5,709,007 A | 1/1998 | Chiang |

(56) References Cited

U.S. PATENT DOCUMENTS

| | | |
|---|---|---|
| 5,710,506 A | 1/1998 | Broell et al. |
| 5,714,119 A | 2/1998 | Kawagoe et al. |
| 5,717,169 A | 2/1998 | Liang et al. |
| 5,717,484 A | 2/1998 | Hamaguchi et al. |
| 5,720,077 A | 2/1998 | Nakamura et al. |
| 5,732,401 A | 3/1998 | Conway |
| 5,735,017 A | 4/1998 | Barnes et al. |
| 5,735,959 A | 4/1998 | Kubo et al. |
| 5,742,975 A | 4/1998 | Knowlton et al. |
| 5,745,235 A | 4/1998 | Vercammen et al. |
| 5,752,871 A | 5/1998 | Tsuzuki |
| 5,756,904 A | 5/1998 | Oreper et al. |
| 5,761,762 A | 6/1998 | Kubo |
| 5,764,888 A | 6/1998 | Bolan et al. |
| 5,767,437 A | 6/1998 | Rogers |
| 5,767,960 A | 6/1998 | Orman |
| 5,770,936 A | 6/1998 | Hirai et al. |
| 5,777,596 A | 7/1998 | Herbert |
| 5,778,486 A | 7/1998 | Kim |
| 5,781,697 A | 7/1998 | Jeong |
| 5,781,960 A | 7/1998 | Kilstrom et al. |
| 5,784,755 A | 7/1998 | Karr et al. |
| 5,786,602 A | 7/1998 | Pryor et al. |
| 5,787,545 A | 8/1998 | Colens |
| 5,793,900 A | 8/1998 | Nourbakhsh et al. |
| 5,794,297 A | 8/1998 | Muta |
| 5,802,665 A | 9/1998 | Knowlton et al. |
| 5,812,267 A | 9/1998 | Everett et al. |
| 5,814,808 A | 9/1998 | Takada et al. |
| 5,815,880 A | 10/1998 | Nakanishi |
| 5,815,884 A | 10/1998 | Imamura et al. |
| 5,819,008 A | 10/1998 | Asama et al. |
| 5,819,360 A | 10/1998 | Fujii |
| 5,819,936 A | 10/1998 | Saveliev et al. |
| 5,820,821 A | 10/1998 | Kawagoe et al. |
| 5,821,730 A | 10/1998 | Drapkin |
| 5,825,981 A | 10/1998 | Matsuda |
| 5,828,770 A | 10/1998 | Leis et al. |
| 5,831,597 A | 11/1998 | West et al. |
| 5,836,045 A | 11/1998 | Anthony et al. |
| 5,839,156 A | 11/1998 | Park et al. |
| 5,839,532 A | 11/1998 | Yoshiji et al. |
| 5,841,259 A | 11/1998 | Kim et al. |
| 5,867,800 A | 2/1999 | Leif |
| 5,867,861 A | 2/1999 | Kasen et al. |
| 5,869,910 A | 2/1999 | Colens |
| 5,894,621 A | 4/1999 | Kubo |
| 5,896,611 A | 4/1999 | Haaga |
| 5,903,124 A | 5/1999 | Kawakami |
| 5,905,209 A | 5/1999 | Oreper |
| 5,907,886 A | 6/1999 | Buscher |
| 5,910,700 A | 6/1999 | Crotzer |
| 5,911,260 A | 6/1999 | Suzuki |
| 5,916,008 A | 6/1999 | Wong |
| 5,924,167 A | 7/1999 | Wright et al. |
| 5,926,909 A | 7/1999 | McGee |
| 5,933,102 A | 8/1999 | Miller et al. |
| 5,933,913 A | 8/1999 | Wright et al. |
| 5,935,179 A | 8/1999 | Kleiner et al. |
| 5,935,333 A | 8/1999 | Davis |
| 5,940,346 A | 8/1999 | Sadowsky et al. |
| 5,940,927 A | 8/1999 | Haegermarck et al. |
| 5,940,930 A | 8/1999 | Oh et al. |
| 5,942,869 A | 8/1999 | Katou et al. |
| 5,943,730 A | 8/1999 | Boomgaarden |
| 5,943,733 A | 8/1999 | Tagliaferri |
| 5,943,933 A | 8/1999 | Evans et al. |
| 5,947,225 A | 9/1999 | Kawakami et al. |
| 5,950,408 A | 9/1999 | Schaedler |
| 5,959,423 A | 9/1999 | Nakanishi et al. |
| 5,968,281 A | 10/1999 | Wright et al. |
| 5,974,348 A | 10/1999 | Rocks |
| 5,974,365 A | 10/1999 | Mitchell |
| 5,983,448 A | 11/1999 | Wright et al. |
| 5,984,880 A | 11/1999 | Lander et al. |
| 5,987,383 A | 11/1999 | Keller et al. |
| 5,989,700 A | 11/1999 | Krivopal |
| 5,991,951 A | 11/1999 | Kubo et al. |
| 5,995,883 A | 11/1999 | Nishikado |
| 5,995,884 A | 11/1999 | Allen et al. |
| 5,996,167 A | 12/1999 | Close |
| 5,998,953 A | 12/1999 | Nakamura et al. |
| 5,998,971 A | 12/1999 | Corbridge |
| 6,000,088 A | 12/1999 | Wright et al. |
| 6,009,358 A | 12/1999 | Angott et al. |
| 6,012,618 A | 1/2000 | Matsuo et al. |
| 6,021,545 A | 2/2000 | Delgado et al. |
| 6,023,813 A | 2/2000 | Thatcher et al. |
| 6,023,814 A | 2/2000 | Imamura |
| 6,025,687 A | 2/2000 | Himeda et al. |
| 6,026,539 A | 2/2000 | Mouw et al. |
| 6,030,464 A | 2/2000 | Azevedo |
| 6,030,465 A | 2/2000 | Marcussen et al. |
| 6,032,327 A | 3/2000 | Oka et al. |
| 6,032,542 A | 3/2000 | Warnick et al. |
| 6,036,572 A | 3/2000 | Sze |
| 6,038,501 A | 3/2000 | Kawakami |
| 6,040,669 A | 3/2000 | Hog |
| 6,041,471 A | 3/2000 | Charky et al. |
| 6,041,472 A | 3/2000 | Kasen et al. |
| 6,046,800 A | 4/2000 | Ohtomo et al. |
| 6,049,620 A | 4/2000 | Dickinson et al. |
| 6,050,648 A | 4/2000 | Keleny |
| 6,052,821 A | 4/2000 | Chouly et al. |
| 6,055,042 A | 4/2000 | Sarangapani |
| 6,055,702 A | 5/2000 | Imamura et al. |
| 6,061,868 A | 5/2000 | Moritsch et al. |
| 6,065,182 A | 5/2000 | Wright et al. |
| 6,070,290 A | 6/2000 | Schwarze et al. |
| 6,073,432 A | 6/2000 | Schaedler |
| 6,076,025 A | 6/2000 | Ueno et al. |
| 6,076,026 A | 6/2000 | Jambhekar et al. |
| 6,076,226 A | 6/2000 | Reed |
| 6,076,227 A | 6/2000 | Schallig et al. |
| 6,081,257 A | 6/2000 | Zeller |
| 6,088,020 A | 7/2000 | Mor |
| 6,094,775 A | 8/2000 | Behmer |
| 6,099,091 A | 8/2000 | Campbell |
| 6,101,670 A | 8/2000 | Song |
| 6,101,671 A | 8/2000 | Wright et al. |
| 6,108,031 A | 8/2000 | King et al. |
| 6,108,067 A | 8/2000 | Okamoto |
| 6,108,076 A | 8/2000 | Hanseder |
| 6,108,269 A | 8/2000 | Kabel |
| 6,108,597 A | 8/2000 | Kirchner et al. |
| 6,108,859 A | 8/2000 | Burgoon |
| 6,112,143 A | 8/2000 | Allen et al. |
| 6,112,996 A | 9/2000 | Matsuo |
| 6,119,057 A | 9/2000 | Kawagoe |
| 6,122,798 A | 9/2000 | Kobayashi et al. |
| 6,124,694 A | 9/2000 | Bancroft et al. |
| 6,125,498 A | 10/2000 | Roberts et al. |
| 6,131,237 A | 10/2000 | Kasper et al. |
| 6,138,063 A | 10/2000 | Himeda |
| 6,142,252 A | 11/2000 | Kinto et al. |
| 6,146,041 A | 11/2000 | Chen et al. |
| 6,146,278 A | 11/2000 | Kobayashi |
| 6,154,279 A | 11/2000 | Thayer |
| 6,154,694 A | 11/2000 | Aoki et al. |
| 6,160,479 A | 12/2000 | Ahlen et al. |
| 6,167,332 A | 12/2000 | Kurtzberg et al. |
| 6,167,587 B1 | 1/2001 | Kasper et al. |
| 6,192,548 B1 | 2/2001 | Huffman |
| 6,192,549 B1 | 2/2001 | Kasen et al. |
| 6,202,243 B1 | 3/2001 | Beaufoy et al. |
| 6,216,307 B1 | 4/2001 | Kaleta et al. |
| 6,220,865 B1 | 4/2001 | Macri et al. |
| 6,226,830 B1 | 5/2001 | Hendriks et al. |
| 6,230,362 B1 | 5/2001 | Kasper et al. |
| 6,237,741 B1 | 5/2001 | Guidetti |
| 6,240,342 B1 | 5/2001 | Fiegert et al. |
| 6,243,913 B1 | 6/2001 | Frank et al. |
| 6,255,793 B1 | 7/2001 | Peless et al. |
| 6,259,979 B1 | 7/2001 | Holmquist |

(56) References Cited

U.S. PATENT DOCUMENTS

| | | |
|---|---|---|
| 6,261,379 B1 | 7/2001 | Conrad et al. |
| 6,263,539 B1 | 7/2001 | Baig |
| 6,263,989 B1 | 7/2001 | Won |
| 6,272,936 B1 | 8/2001 | Oreper et al. |
| 6,276,478 B1 | 8/2001 | Hopkins et al. |
| 6,278,918 B1 | 8/2001 | Dickson et al. |
| 6,279,196 B2 | 8/2001 | Kasen et al. |
| 6,282,526 B1 | 8/2001 | Ganesh |
| 6,283,034 B1 | 9/2001 | Miles |
| 6,285,778 B1 | 9/2001 | Nakajima et al. |
| 6,285,930 B1 | 9/2001 | Dickson et al. |
| 6,286,181 B1 | 9/2001 | Kasper et al. |
| 6,300,737 B1 | 10/2001 | Bergvall et al. |
| 6,321,337 B1 | 11/2001 | Reshef et al. |
| 6,321,515 B1 | 11/2001 | Colens |
| 6,323,570 B1 | 11/2001 | Nishimura et al. |
| 6,324,714 B1 | 12/2001 | Walz et al. |
| 6,327,741 B1 | 12/2001 | Reed |
| 6,332,400 B1 | 12/2001 | Meyer |
| 6,339,735 B1 | 1/2002 | Peless et al. |
| 6,362,875 B1 | 3/2002 | Burkley |
| 6,370,453 B2 | 4/2002 | Sommer |
| 6,374,155 B1 | 4/2002 | Wallach et al. |
| 6,374,157 B1 | 4/2002 | Takamura |
| 6,381,802 B2 | 5/2002 | Park |
| 6,385,515 B1 | 5/2002 | Dickson et al. |
| 6,388,013 B1 | 5/2002 | Saraf et al. |
| 6,389,329 B1 | 5/2002 | Colens |
| 6,397,429 B1 | 6/2002 | Legatt et al. |
| 6,400,048 B1 | 6/2002 | Nishimura et al. |
| 6,401,294 B2 | 6/2002 | Kasper |
| 6,408,226 B1 | 6/2002 | Byrne et al. |
| 6,412,141 B2 | 7/2002 | Kasper et al. |
| 6,415,203 B1 | 7/2002 | Inoue et al. |
| 6,418,586 B2 | 7/2002 | Fulghum |
| 6,421,870 B1 | 7/2002 | Basham et al. |
| 6,427,285 B1 | 8/2002 | Legatt et al. |
| 6,430,471 B1 | 8/2002 | Kintou et al. |
| 6,431,296 B1 | 8/2002 | Won |
| 6,437,227 B1 | 8/2002 | Theimer |
| 6,437,465 B1 | 8/2002 | Nishimura et al. |
| 6,438,456 B1 | 8/2002 | Feddema et al. |
| 6,438,793 B1 | 8/2002 | Miner et al. |
| 6,442,476 B1 | 8/2002 | Poropat |
| 6,442,789 B1 | 9/2002 | Legatt et al. |
| 6,443,509 B1 | 9/2002 | Levin et al. |
| 6,444,003 B1 | 9/2002 | Sutcliffe |
| 6,446,302 B1 | 9/2002 | Kasper et al. |
| 6,454,036 B1 | 9/2002 | Airey et al. |
| D464,091 S | 10/2002 | Christianson |
| 6,457,206 B1 | 10/2002 | Judson |
| 6,459,955 B1 | 10/2002 | Bartsch et al. |
| 6,463,368 B1 | 10/2002 | Feiten et al. |
| 6,465,982 B1 | 10/2002 | Bergvall et al. |
| 6,473,167 B1 | 10/2002 | Odell |
| 6,480,762 B1 | 11/2002 | Uchikubo et al. |
| 6,481,515 B1 * | 11/2002 | Kirkpatrick ............ A47L 11/03 15/319 |
| 6,482,252 B1 | 11/2002 | Conrad et al. |
| 6,490,539 B1 | 12/2002 | Dickson et al. |
| 6,491,127 B1 | 12/2002 | Holmberg et al. |
| 6,493,612 B1 | 12/2002 | Bisset et al. |
| 6,493,613 B2 | 12/2002 | Peless et al. |
| 6,496,754 B2 | 12/2002 | Song et al. |
| 6,496,755 B2 | 12/2002 | Wallach et al. |
| 6,502,657 B2 | 1/2003 | Kerrebrock et al. |
| 6,504,610 B1 | 1/2003 | Bauer et al. |
| 6,507,773 B2 | 1/2003 | Parker et al. |
| 6,519,808 B2 | 2/2003 | Legatt et al. |
| 6,525,509 B1 | 2/2003 | Petersson et al. |
| D471,243 S | 3/2003 | Cioffi et al. |
| 6,530,102 B1 | 3/2003 | Pierce et al. |
| 6,530,117 B2 | 3/2003 | Peterson |
| 6,532,404 B2 | 3/2003 | Colens |
| 6,535,793 B2 | 3/2003 | Allard |
| 6,540,424 B1 | 4/2003 | Hall et al. |
| 6,540,607 B2 | 4/2003 | Mokris et al. |
| 6,548,982 B1 | 4/2003 | Papanikolopoulos et al. |
| 6,553,612 B1 | 4/2003 | Dyson et al. |
| 6,556,722 B1 | 4/2003 | Russell et al. |
| 6,556,892 B2 | 4/2003 | Kuroki et al. |
| 6,557,104 B2 | 4/2003 | Vu et al. |
| D474,312 S | 5/2003 | Stephens et al. |
| 6,563,130 B2 | 5/2003 | Dworkowski et al. |
| 6,571,415 B2 | 6/2003 | Gerber et al. |
| 6,571,422 B1 | 6/2003 | Gordon et al. |
| 6,572,711 B2 | 6/2003 | Sclafani et al. |
| 6,574,536 B1 | 6/2003 | Kawagoe et al. |
| 6,580,246 B2 | 6/2003 | Jacobs |
| 6,584,376 B1 | 6/2003 | Van Kommer |
| 6,586,908 B2 | 7/2003 | Petersson et al. |
| 6,587,573 B1 | 7/2003 | Stam et al. |
| 6,590,222 B1 | 7/2003 | Bisset et al. |
| 6,594,551 B2 | 7/2003 | McKinney et al. |
| 6,594,844 B2 | 7/2003 | Jones |
| 6,597,076 B2 | 7/2003 | Scheible et al. |
| D478,884 S | 8/2003 | Slipy et al. |
| 6,601,265 B1 | 8/2003 | Burlington |
| 6,604,021 B2 | 8/2003 | Imai et al. |
| 6,604,022 B2 | 8/2003 | Parker et al. |
| 6,605,156 B1 | 8/2003 | Clark et al. |
| 6,609,269 B2 | 8/2003 | Kasper |
| 6,611,120 B2 | 8/2003 | Song et al. |
| 6,611,734 B2 | 8/2003 | Parker et al. |
| 6,611,738 B2 | 8/2003 | Ruffner |
| 6,615,108 B1 | 9/2003 | Peless et al. |
| 6,615,434 B1 | 9/2003 | Davis et al. |
| 6,615,885 B1 | 9/2003 | Ohm |
| 6,622,465 B2 | 9/2003 | Jerome et al. |
| 6,624,744 B1 | 9/2003 | Wilson et al. |
| 6,625,843 B2 | 9/2003 | Kim et al. |
| 6,629,028 B2 | 9/2003 | Paromtchik et al. |
| 6,633,150 B1 | 10/2003 | Wallach et al. |
| 6,637,546 B1 | 10/2003 | Wang |
| 6,639,659 B2 | 10/2003 | Granger |
| 6,658,325 B2 | 12/2003 | Zweig |
| 6,658,354 B2 | 12/2003 | Lin |
| 6,658,692 B2 | 12/2003 | Lenkiewicz et al. |
| 6,658,693 B1 | 12/2003 | Reed |
| 6,661,239 B1 | 12/2003 | Ozick |
| 6,662,889 B2 | 12/2003 | De Fazio et al. |
| 6,668,951 B2 | 12/2003 | Won |
| 6,670,817 B2 | 12/2003 | Fournier et al. |
| 6,671,592 B1 | 12/2003 | Bisset et al. |
| 6,671,925 B2 | 1/2004 | Field et al. |
| 6,677,938 B1 | 1/2004 | Maynard |
| 6,687,571 B1 | 2/2004 | Byrne et al. |
| 6,690,134 B1 | 2/2004 | Jones et al. |
| 6,690,993 B2 | 2/2004 | Foulke et al. |
| 6,697,147 B2 | 2/2004 | Ko et al. |
| 6,705,332 B2 | 3/2004 | Field et al. |
| 6,711,280 B2 | 3/2004 | Stafsudd et al. |
| 6,732,826 B2 | 5/2004 | Song et al. |
| 6,735,811 B2 | 5/2004 | Field et al. |
| 6,735,812 B2 | 5/2004 | Hekman et al. |
| 6,737,591 B1 | 5/2004 | Lapstun et al. |
| 6,741,054 B2 | 5/2004 | Koselka et al. |
| 6,741,364 B2 | 5/2004 | Lange et al. |
| 6,748,297 B2 | 6/2004 | Song et al. |
| 6,756,703 B2 | 6/2004 | Chang |
| 6,760,647 B2 | 7/2004 | Nourbakhsh et al. |
| 6,764,373 B1 | 7/2004 | Osawa et al. |
| 6,769,004 B2 | 7/2004 | Barrett |
| 6,774,596 B1 | 8/2004 | Bisset |
| 6,779,380 B1 | 8/2004 | Nieuwkamp |
| 6,781,338 B2 | 8/2004 | Jones et al. |
| 6,809,490 B2 | 10/2004 | Jones et al. |
| 6,810,305 B2 | 10/2004 | Kirkpatrick |
| 6,810,350 B2 | 10/2004 | Blakley |
| 6,830,120 B1 | 12/2004 | Yashima et al. |
| 6,832,407 B2 | 12/2004 | Salem et al. |
| 6,836,701 B2 | 12/2004 | McKee |
| 6,841,963 B2 | 1/2005 | Song et al. |
| 6,845,297 B2 | 1/2005 | Allard |

(56) References Cited

U.S. PATENT DOCUMENTS

| | | |
|---|---|---|
| 6,848,146 B2 | 2/2005 | Wright et al. |
| 6,854,148 B1 | 2/2005 | Rief et al. |
| 6,856,811 B2 | 2/2005 | Burdue et al. |
| 6,859,010 B2 | 2/2005 | Jeon et al. |
| 6,859,682 B2 | 2/2005 | Naka et al. |
| 6,860,206 B1 | 3/2005 | Rudakevych et al. |
| 6,865,447 B2 | 3/2005 | Lau et al. |
| 6,870,792 B2 | 3/2005 | Chiappetta |
| 6,871,115 B2 | 3/2005 | Huang et al. |
| 6,883,201 B2 | 4/2005 | Jones et al. |
| 6,886,651 B1 | 5/2005 | Slocum et al. |
| 6,888,333 B2 | 5/2005 | Laby |
| 6,901,624 B2 | 6/2005 | Mori et al. |
| 6,906,702 B1 | 6/2005 | Tanaka et al. |
| 6,914,403 B2 | 7/2005 | Tsurumi |
| 6,917,854 B2 | 7/2005 | Bayer |
| 6,925,357 B2 | 8/2005 | Wang et al. |
| 6,925,679 B2 | 8/2005 | Wallach et al. |
| 6,929,548 B2 | 8/2005 | Wang |
| D510,066 S | 9/2005 | Hickey et al. |
| 6,938,298 B2 | 9/2005 | Aasen |
| 6,940,291 B1 | 9/2005 | Ozick |
| 6,941,199 B1 | 9/2005 | Bottomley et al. |
| 6,956,348 B2 | 10/2005 | Landry et al. |
| 6,957,712 B2 | 10/2005 | Song et al. |
| 6,960,986 B2 | 11/2005 | Asama et al. |
| 6,965,209 B2 | 11/2005 | Jones et al. |
| 6,965,211 B2 | 11/2005 | Tsurumi |
| 6,968,592 B2 | 11/2005 | Takeuchi et al. |
| 6,971,140 B2 | 12/2005 | Kim |
| 6,975,246 B1 | 12/2005 | Trudeau |
| 6,980,229 B1 | 12/2005 | Ebersole |
| 6,985,556 B2 | 1/2006 | Shanmugavel et al. |
| 6,993,954 B1 | 2/2006 | George et al. |
| 6,999,850 B2 | 2/2006 | McDonald |
| 7,013,527 B2 | 3/2006 | Thomas et al. |
| 7,024,278 B2 | 4/2006 | Chiappetta et al. |
| 7,024,280 B2 | 4/2006 | Parker et al. |
| 7,027,893 B2 | 4/2006 | Perry et al. |
| 7,030,768 B2 | 4/2006 | Wanie |
| 7,031,805 B2 | 4/2006 | Lee et al. |
| 7,032,469 B2 | 4/2006 | Bailey |
| 7,040,869 B2 | 5/2006 | Beenker |
| 7,041,029 B2 | 5/2006 | Fulghum et al. |
| 7,051,399 B2 | 5/2006 | Field et al. |
| 7,053,578 B2 | 5/2006 | Diehl et al. |
| 7,054,716 B2 | 5/2006 | McKee et al. |
| 7,055,210 B2 | 6/2006 | Keppler et al. |
| 7,057,120 B2 | 6/2006 | Ma et al. |
| 7,057,643 B2 | 6/2006 | Iida et al. |
| 7,059,012 B2 | 6/2006 | Song et al. |
| 7,065,430 B2 | 6/2006 | Naka et al. |
| 7,066,291 B2 | 6/2006 | Martins et al. |
| 7,069,124 B1 | 6/2006 | Whittaker et al. |
| 7,079,923 B2 | 7/2006 | Abramson et al. |
| 7,085,623 B2 | 8/2006 | Siegers |
| 7,085,624 B2 | 8/2006 | Aldred et al. |
| 7,113,847 B2 | 9/2006 | Chmura et al. |
| 7,133,746 B2 | 11/2006 | Abramson et al. |
| 7,142,198 B2 | 11/2006 | Lee |
| 7,148,458 B2 | 12/2006 | Schell et al. |
| 7,155,308 B2 | 12/2006 | Jones |
| 7,167,775 B2 | 1/2007 | Abramson et al. |
| 7,171,285 B2 | 1/2007 | Kim et al. |
| 7,173,391 B2 | 2/2007 | Jones et al. |
| 7,174,238 B1 | 2/2007 | Zweig |
| 7,188,000 B2 | 3/2007 | Chiappetta et al. |
| 7,193,384 B1 | 3/2007 | Norman et al. |
| 7,196,487 B2 | 3/2007 | Jones et al. |
| 7,201,786 B2 | 4/2007 | Wegelin et al. |
| 7,206,677 B2 | 4/2007 | Hulden |
| 7,211,980 B1 | 5/2007 | Bruemmer et al. |
| 7,225,500 B2 | 6/2007 | Diehl et al. |
| 7,246,405 B2 | 7/2007 | Yan |
| 7,248,951 B2 | 7/2007 | Hulden |
| 7,275,280 B2 | 10/2007 | Haegermarck et al. |
| 7,283,892 B1 | 10/2007 | Boillot et al. |
| 7,288,912 B2 | 10/2007 | Landry et al. |
| 7,318,248 B1 | 1/2008 | Yan et al. |
| 7,320,149 B1 | 1/2008 | Huffman et al. |
| 7,321,807 B2 | 1/2008 | Laski |
| 7,324,870 B2 | 1/2008 | Lee |
| 7,328,196 B2 | 2/2008 | Peters |
| 7,332,890 B2 | 2/2008 | Cohen et al. |
| 7,346,428 B1 | 3/2008 | Huffman et al. |
| 7,352,153 B2 | 4/2008 | Yan |
| 7,359,766 B2 | 4/2008 | Jeon et al. |
| 7,360,277 B2 | 4/2008 | Moshenrose et al. |
| 7,363,108 B2 | 4/2008 | Noda et al. |
| 7,388,879 B2 | 6/2008 | Sabe et al. |
| 7,389,156 B2 | 6/2008 | Ziegler et al. |
| 7,389,166 B2 | 6/2008 | Harwig et al. |
| 7,408,157 B2 | 8/2008 | Yan |
| 7,418,762 B2 | 9/2008 | Arai et al. |
| 7,430,455 B2 | 9/2008 | Casey et al. |
| 7,430,462 B2 | 9/2008 | Chiu et al. |
| 7,441,298 B2 | 10/2008 | Svendsen et al. |
| 7,444,206 B2 | 10/2008 | Abramson et al. |
| 7,448,113 B2 | 11/2008 | Jones et al. |
| 7,459,871 B2 | 12/2008 | Landry et al. |
| 7,467,026 B2 | 12/2008 | Sakagami et al. |
| 7,474,941 B2 | 1/2009 | Kim et al. |
| 7,503,096 B2 | 3/2009 | Lin |
| 7,515,991 B2 | 4/2009 | Egawa et al. |
| 7,539,557 B2 | 5/2009 | Yamauchi |
| 7,555,363 B2 | 6/2009 | Augenbraun et al. |
| 7,557,703 B2 | 7/2009 | Yamada et al. |
| 7,568,259 B2 | 8/2009 | Yan |
| 7,571,511 B2 | 8/2009 | Jones et al. |
| 7,578,020 B2 | 8/2009 | Jaworski et al. |
| 7,600,521 B2 | 10/2009 | Woo |
| 7,603,744 B2 | 10/2009 | Reindle |
| 7,611,583 B2 | 11/2009 | Buckley et al. |
| 7,617,557 B2 | 11/2009 | Reindle |
| 7,620,476 B2 | 11/2009 | Buckley et al. |
| 7,636,928 B2 | 12/2009 | Uno |
| 7,636,982 B2 | 12/2009 | Jones et al. |
| 7,647,144 B2 | 1/2010 | Haegermarck |
| 7,650,666 B2 | 1/2010 | Jang |
| 7,660,650 B2 | 2/2010 | Kawagoe et al. |
| 7,663,333 B2 | 2/2010 | Jones et al. |
| 7,693,605 B2 | 4/2010 | Park |
| 7,706,917 B1 | 4/2010 | Chiappetta et al. |
| 7,761,954 B2 | 7/2010 | Ziegler et al. |
| 7,765,635 B2 | 8/2010 | Park |
| 7,784,147 B2 | 8/2010 | Burkholder et al. |
| 7,801,645 B2 | 9/2010 | Taylor et al. |
| 7,805,220 B2 | 9/2010 | Taylor et al. |
| 7,809,944 B2 | 10/2010 | Kawamoto |
| 7,832,048 B2 | 11/2010 | Harwig et al. |
| 7,849,555 B2 | 12/2010 | Hahm et al. |
| 7,853,645 B2 | 12/2010 | Brown et al. |
| 7,860,680 B2 | 12/2010 | Arms et al. |
| 7,920,941 B2 | 4/2011 | Park et al. |
| 7,937,800 B2 | 5/2011 | Yan |
| 7,957,836 B2 | 6/2011 | Myeong et al. |
| 8,087,117 B2 | 1/2012 | Kapoor et al. |
| 2001/0004719 A1 | 6/2001 | Sommer |
| 2001/0013929 A1 | 8/2001 | Torsten |
| 2001/0020200 A1 | 9/2001 | Das et al. |
| 2001/0025183 A1 | 9/2001 | Shahidi |
| 2001/0037163 A1 | 11/2001 | Allard |
| 2001/0043509 A1 | 11/2001 | Green et al. |
| 2001/0045883 A1 | 11/2001 | Holdaway et al. |
| 2001/0047231 A1 | 11/2001 | Peless et al. |
| 2001/0047895 A1 | 12/2001 | De Fazio et al. |
| 2002/0011367 A1 | 1/2002 | Kolesnik |
| 2002/0011813 A1 | 1/2002 | Koselka et al. |
| 2002/0016649 A1 | 2/2002 | Jones |
| 2002/0021219 A1 | 2/2002 | Edwards |
| 2002/0027652 A1 | 3/2002 | Paromtchik et al. |
| 2002/0036779 A1 | 3/2002 | Kiyoi et al. |
| 2002/0081937 A1 | 6/2002 | Yamada et al. |
| 2002/0095239 A1 | 7/2002 | Wallach et al. |

(56) References Cited

U.S. PATENT DOCUMENTS

| | | |
|---|---|---|
| 2002/0097400 A1 | 7/2002 | Jung et al. |
| 2002/0099481 A1* | 7/2002 | Mori ............... G01C 21/12 701/23 |
| 2002/0104963 A1 | 8/2002 | Mancevski |
| 2002/0108209 A1 | 8/2002 | Peterson |
| 2002/0112742 A1 | 8/2002 | Bredo et al. |
| 2002/0113973 A1 | 8/2002 | Ge |
| 2002/0116089 A1 | 8/2002 | Kirkpatrick |
| 2002/0120364 A1 | 8/2002 | Colens |
| 2002/0124343 A1 | 9/2002 | Reed |
| 2002/0153185 A1 | 10/2002 | Song et al. |
| 2002/0156556 A1 | 10/2002 | Ruffner |
| 2002/0159051 A1 | 10/2002 | Guo |
| 2002/0166193 A1 | 11/2002 | Kasper |
| 2002/0169521 A1 | 11/2002 | Goodman et al. |
| 2002/0173877 A1 | 11/2002 | Zweig |
| 2002/0189871 A1 | 12/2002 | Won |
| 2003/0009259 A1 | 1/2003 | Hattori et al. |
| 2003/0015232 A1 | 1/2003 | Nguyen |
| 2003/0019071 A1 | 1/2003 | Field et al. |
| 2003/0023356 A1 | 1/2003 | Keable |
| 2003/0024986 A1 | 2/2003 | Mazz et al. |
| 2003/0025472 A1 | 2/2003 | Jones et al. |
| 2003/0028286 A1 | 2/2003 | Glenn et al. |
| 2003/0030399 A1 | 2/2003 | Jacobs |
| 2003/0058262 A1 | 3/2003 | Sato et al. |
| 2003/0060928 A1 | 3/2003 | Abramson et al. |
| 2003/0067451 A1 | 4/2003 | Tagg et al. |
| 2003/0097875 A1 | 5/2003 | Lentz et al. |
| 2003/0120389 A1 | 6/2003 | Abramson et al. |
| 2003/0124312 A1 | 7/2003 | Autumn |
| 2003/0126352 A1 | 7/2003 | Barrett |
| 2003/0137268 A1 | 7/2003 | Papanikolopoulos et al. |
| 2003/0146384 A1 | 8/2003 | Logsdon et al. |
| 2003/0159232 A1 | 8/2003 | Hekman et al. |
| 2003/0168081 A1 | 9/2003 | Lee et al. |
| 2003/0175138 A1 | 9/2003 | Beenker |
| 2003/0192144 A1 | 10/2003 | Song et al. |
| 2003/0193657 A1 | 10/2003 | Uomori et al. |
| 2003/0216834 A1 | 11/2003 | Allard |
| 2003/0221114 A1 | 11/2003 | Hino et al. |
| 2003/0229421 A1 | 12/2003 | Chmura et al. |
| 2003/0229474 A1 | 12/2003 | Suzuki et al. |
| 2003/0233171 A1 | 12/2003 | Heiligensetzer |
| 2003/0233177 A1 | 12/2003 | Johnson et al. |
| 2003/0233870 A1 | 12/2003 | Mancevski |
| 2003/0233930 A1 | 12/2003 | Ozick |
| 2004/0016077 A1 | 1/2004 | Song et al. |
| 2004/0020000 A1* | 2/2004 | Jones ............... G05D 1/0238 15/319 |
| 2004/0030448 A1 | 2/2004 | Solomon |
| 2004/0030449 A1 | 2/2004 | Solomon |
| 2004/0030450 A1 | 2/2004 | Solomon |
| 2004/0030451 A1 | 2/2004 | Solomon |
| 2004/0030570 A1 | 2/2004 | Solomon |
| 2004/0030571 A1 | 2/2004 | Solomon |
| 2004/0031113 A1 | 2/2004 | Wosewick et al. |
| 2004/0049877 A1 | 3/2004 | Jones et al. |
| 2004/0055163 A1 | 3/2004 | McCambridge et al. |
| 2004/0068351 A1 | 4/2004 | Solomon |
| 2004/0068415 A1 | 4/2004 | Solomon |
| 2004/0068416 A1 | 4/2004 | Solomon |
| 2004/0074038 A1 | 4/2004 | Im et al. |
| 2004/0074044 A1 | 4/2004 | Diehl et al. |
| 2004/0076324 A1 | 4/2004 | Burl et al. |
| 2004/0083570 A1 | 5/2004 | Song et al. |
| 2004/0085037 A1 | 5/2004 | Jones et al. |
| 2004/0088079 A1 | 5/2004 | Lavarec et al. |
| 2004/0093122 A1 | 5/2004 | Galibraith |
| 2004/0098167 A1 | 5/2004 | Yi et al. |
| 2004/0111184 A1 | 6/2004 | Chiappetta et al. |
| 2004/0111821 A1 | 6/2004 | Lenkiewicz et al. |
| 2004/0113777 A1 | 6/2004 | Matsuhira et al. |
| 2004/0117064 A1 | 6/2004 | McDonald |
| 2004/0117846 A1 | 6/2004 | Karaoguz et al. |
| 2004/0118998 A1* | 6/2004 | Wingett ............. G01D 5/363 250/231.13 |
| 2004/0128028 A1 | 7/2004 | Miyamoto et al. |
| 2004/0133316 A1 | 7/2004 | Dean |
| 2004/0134336 A1 | 7/2004 | Solomon |
| 2004/0134337 A1 | 7/2004 | Solomon |
| 2004/0143919 A1 | 7/2004 | Wilder |
| 2004/0148419 A1 | 7/2004 | Chen et al. |
| 2004/0148731 A1 | 8/2004 | Damman et al. |
| 2004/0153212 A1 | 8/2004 | Profio et al. |
| 2004/0156541 A1 | 8/2004 | Jeon et al. |
| 2004/0158357 A1 | 8/2004 | Lee et al. |
| 2004/0181706 A1 | 9/2004 | Chen et al. |
| 2004/0187249 A1 | 9/2004 | Jones et al. |
| 2004/0187457 A1 | 9/2004 | Colens |
| 2004/0196451 A1 | 10/2004 | Aoyama |
| 2004/0200505 A1 | 10/2004 | Taylor et al. |
| 2004/0201361 A1 | 10/2004 | Koh et al. |
| 2004/0204792 A1 | 10/2004 | Taylor et al. |
| 2004/0204804 A1 | 10/2004 | Lee et al. |
| 2004/0210345 A1 | 10/2004 | Noda et al. |
| 2004/0210347 A1 | 10/2004 | Sawada et al. |
| 2004/0211444 A1 | 10/2004 | Taylor et al. |
| 2004/0221790 A1 | 11/2004 | Sinclair et al. |
| 2004/0236468 A1 | 11/2004 | Taylor et al. |
| 2004/0244138 A1 | 12/2004 | Taylor et al. |
| 2004/0255425 A1 | 12/2004 | Arai et al. |
| 2005/0000543 A1 | 1/2005 | Taylor et al. |
| 2005/0010330 A1 | 1/2005 | Abramson et al. |
| 2005/0010331 A1 | 1/2005 | Taylor et al. |
| 2005/0015920 A1 | 1/2005 | Kim et al. |
| 2005/0021181 A1 | 1/2005 | Kim et al. |
| 2005/0028316 A1 | 2/2005 | Thomas et al. |
| 2005/0053912 A1 | 3/2005 | Roth et al. |
| 2005/0055796 A1 | 3/2005 | Wright et al. |
| 2005/0067994 A1 | 3/2005 | Jones et al. |
| 2005/0081782 A1 | 4/2005 | Buckley et al. |
| 2005/0085947 A1 | 4/2005 | Aldred et al. |
| 2005/0091782 A1 | 5/2005 | Gordon et al. |
| 2005/0091786 A1 | 5/2005 | Wright et al. |
| 2005/0137749 A1* | 6/2005 | Jeon ............... G05D 1/0225 700/245 |
| 2005/0144751 A1 | 7/2005 | Kegg et al. |
| 2005/0150074 A1 | 7/2005 | Diehl et al. |
| 2005/0150519 A1 | 7/2005 | Keppler et al. |
| 2005/0154795 A1 | 7/2005 | Kuz et al. |
| 2005/0156562 A1 | 7/2005 | Cohen et al. |
| 2005/0162119 A1 | 7/2005 | Landry et al. |
| 2005/0163119 A1 | 7/2005 | Ito et al. |
| 2005/0165508 A1 | 7/2005 | Kanda et al. |
| 2005/0166354 A1 | 8/2005 | Uehigashi |
| 2005/0166355 A1 | 8/2005 | Tani |
| 2005/0172445 A1 | 8/2005 | Diehl et al. |
| 2005/0183229 A1 | 8/2005 | Uehigashi |
| 2005/0183230 A1 | 8/2005 | Uehigashi |
| 2005/0187678 A1 | 8/2005 | Myeong et al. |
| 2005/0192707 A1 | 9/2005 | Park et al. |
| 2005/0204717 A1 | 9/2005 | Colens |
| 2005/0209736 A1 | 9/2005 | Kawagoe |
| 2005/0211880 A1 | 9/2005 | Schell et al. |
| 2005/0212929 A1 | 9/2005 | Schell et al. |
| 2005/0213082 A1 | 9/2005 | DiBernardo et al. |
| 2005/0213109 A1 | 9/2005 | Schell et al. |
| 2005/0217042 A1 | 10/2005 | Reindle |
| 2005/0218852 A1 | 10/2005 | Landry et al. |
| 2005/0222933 A1 | 10/2005 | Wesby |
| 2005/0229340 A1 | 10/2005 | Sawalski et al. |
| 2005/0229355 A1 | 10/2005 | Crouch et al. |
| 2005/0235451 A1 | 10/2005 | Yan |
| 2005/0251292 A1 | 11/2005 | Casey et al. |
| 2005/0255425 A1 | 11/2005 | Pierson |
| 2005/0258154 A1 | 11/2005 | Blankenship et al. |
| 2005/0273967 A1 | 12/2005 | Taylor et al. |
| 2005/0288819 A1 | 12/2005 | De Guzman |
| 2006/0000050 A1 | 1/2006 | Cipolla et al. |
| 2006/0009879 A1 | 1/2006 | Lynch et al. |
| 2006/0010638 A1 | 1/2006 | Shimizu et al. |
| 2006/0020369 A1 | 1/2006 | Taylor et al. |
| 2006/0020370 A1 | 1/2006 | Abramson |

(56) References Cited

U.S. PATENT DOCUMENTS

| | | |
|---|---|---|
| 2006/0021168 A1 | 2/2006 | Nishikawa |
| 2006/0025134 A1 | 2/2006 | Cho et al. |
| 2006/0037170 A1 | 2/2006 | Shimizu |
| 2006/0042042 A1 | 3/2006 | Mertes et al. |
| 2006/0044546 A1 | 3/2006 | Lewin et al. |
| 2006/0060216 A1 | 3/2006 | Woo |
| 2006/0061657 A1 | 3/2006 | Rew et al. |
| 2006/0064828 A1 | 3/2006 | Stein et al. |
| 2006/0087273 A1 | 4/2006 | Ko et al. |
| 2006/0089765 A1 | 4/2006 | Pack et al. |
| 2006/0100741 A1 | 5/2006 | Jung |
| 2006/0107894 A1 | 5/2006 | Buckley et al. |
| 2006/0119839 A1 | 6/2006 | Bertin et al. |
| 2006/0143295 A1 | 6/2006 | Costa-Requena et al. |
| 2006/0146776 A1 | 7/2006 | Kim |
| 2006/0150361 A1 | 7/2006 | Aldred et al. |
| 2006/0184293 A1 | 8/2006 | Konandreas et al. |
| 2006/0185690 A1 | 8/2006 | Song et al. |
| 2006/0190133 A1 | 8/2006 | Konandreas et al. |
| 2006/0190134 A1 | 8/2006 | Ziegler et al. |
| 2006/0190146 A1 | 8/2006 | Morse et al. |
| 2006/0196003 A1 | 9/2006 | Song et al. |
| 2006/0200281 A1 | 9/2006 | Ziegler et al. |
| 2006/0220900 A1 | 10/2006 | Ceskutti et al. |
| 2006/0229774 A1 | 10/2006 | Park et al. |
| 2006/0259194 A1 | 11/2006 | Chiu |
| 2006/0259494 A1 | 11/2006 | Watson et al. |
| 2006/0278161 A1 | 12/2006 | Burkholder et al. |
| 2006/0288519 A1 | 12/2006 | Jaworski et al. |
| 2006/0293787 A1 | 12/2006 | Kanda et al. |
| 2006/0293808 A1* | 12/2006 | Qian ............... B25J 5/007 701/23 |
| 2007/0004311 A1* | 1/2007 | Trageser ............. A63H 17/32 446/93 |
| 2007/0006404 A1 | 1/2007 | Cheng et al. |
| 2007/0016328 A1 | 1/2007 | Ziegler et al. |
| 2007/0017061 A1 | 1/2007 | Yan |
| 2007/0028574 A1 | 2/2007 | Yan |
| 2007/0032904 A1 | 2/2007 | Kawagoe et al. |
| 2007/0042716 A1 | 2/2007 | Goodall et al. |
| 2007/0043459 A1 | 2/2007 | Abbott et al. |
| 2007/0061041 A1 | 3/2007 | Zweig |
| 2007/0061403 A1 | 3/2007 | Seaburg |
| 2007/0114975 A1 | 5/2007 | Cohen et al. |
| 2007/0142964 A1 | 6/2007 | Abramson |
| 2007/0150096 A1 | 6/2007 | Yeh et al. |
| 2007/0156286 A1 | 7/2007 | Yamauchi |
| 2007/0157415 A1 | 7/2007 | Lee et al. |
| 2007/0157420 A1 | 7/2007 | Lee et al. |
| 2007/0179670 A1 | 8/2007 | Chiappetta et al. |
| 2007/0226949 A1 | 10/2007 | Hahm et al. |
| 2007/0234492 A1 | 10/2007 | Svendsen et al. |
| 2007/0244610 A1 | 10/2007 | Ozick et al. |
| 2007/0245511 A1 | 10/2007 | Hahm et al. |
| 2007/0250212 A1 | 10/2007 | Halloran et al. |
| 2007/0261193 A1 | 11/2007 | Gordon et al. |
| 2007/0266508 A1 | 11/2007 | Jones et al. |
| 2008/0007203 A1 | 1/2008 | Cohen et al. |
| 2008/0039974 A1 | 2/2008 | Sandin et al. |
| 2008/0052846 A1 | 3/2008 | Kapoor et al. |
| 2008/0091304 A1 | 4/2008 | Ozick et al. |
| 2008/0109126 A1 | 5/2008 | Sandin et al. |
| 2008/0134458 A1 | 6/2008 | Ziegler et al. |
| 2008/0140255 A1 | 6/2008 | Ziegler et al. |
| 2008/0155768 A1 | 7/2008 | Ziegler et al. |
| 2008/0184518 A1 | 8/2008 | Taylor et al. |
| 2008/0266748 A1 | 10/2008 | Lee |
| 2008/0276407 A1 | 11/2008 | Schnittman et al. |
| 2008/0281470 A1 | 11/2008 | Gilbert et al. |
| 2008/0282494 A1 | 11/2008 | Won et al. |
| 2008/0294288 A1 | 11/2008 | Yamauchi |
| 2008/0302586 A1 | 12/2008 | Yan |
| 2008/0307590 A1 | 12/2008 | Jones et al. |
| 2009/0007366 A1 | 1/2009 | Svendsen et al. |
| 2009/0038089 A1 | 2/2009 | Landry et al. |
| 2009/0048727 A1 | 2/2009 | Hong et al. |
| 2009/0049640 A1 | 2/2009 | Lee et al. |
| 2009/0055022 A1 | 2/2009 | Casey et al. |
| 2009/0102296 A1 | 4/2009 | Greene et al. |
| 2009/0292393 A1 | 11/2009 | Casey et al. |
| 2010/0006028 A1 | 1/2010 | Buckley et al. |
| 2010/0011529 A1 | 1/2010 | Won et al. |
| 2010/0049365 A1 | 2/2010 | Jones et al. |
| 2010/0063628 A1 | 3/2010 | Landry et al. |
| 2010/0082193 A1 | 4/2010 | Chiappetta |
| 2010/0107355 A1 | 5/2010 | Won et al. |
| 2010/0257690 A1 | 10/2010 | Jones et al. |
| 2010/0257691 A1 | 10/2010 | Jones et al. |
| 2010/0263158 A1 | 10/2010 | Jones et al. |
| 2010/0268384 A1 | 10/2010 | Jones et al. |
| 2010/0293742 A1 | 11/2010 | Chung et al. |
| 2010/0312429 A1 | 12/2010 | Jones et al. |

FOREIGN PATENT DOCUMENTS

| | | |
|---|---|---|
| DE | 3536907 C2 | 2/1989 |
| DE | 3404202 C2 | 12/1992 |
| DE | 199311014 U1 | 10/1993 |
| DE | 4338841 A1 | 5/1995 |
| DE | 4414683 A1 | 10/1995 |
| DE | 19849978 | 2/2001 |
| DE | 102004038074 | 6/2005 |
| DE | 10357636 | 7/2005 |
| DE | 102004041021 B3 | 8/2005 |
| DE | 102005046813 A1 | 4/2007 |
| DK | 338988 A | 12/1988 |
| EP | 0265542 A1 | 5/1988 |
| EP | 0281085 A2 | 9/1988 |
| EP | 0286328 A1 | 10/1988 |
| EP | 0294101 A2 | 12/1988 |
| EP | 0352045 A2 | 1/1990 |
| EP | 0433697 A2 | 6/1991 |
| EP | 0437024 A1 | 7/1991 |
| EP | 0554978 A2 | 8/1993 |
| EP | 0615719 A1 | 9/1994 |
| EP | 0792726 A1 | 9/1997 |
| EP | 0930040 A2 | 7/1999 |
| EP | 0845237 B1 | 4/2000 |
| EP | 0861629 B1 | 9/2001 |
| EP | 1228734 A2 | 8/2002 |
| EP | 1380245 A1 | 1/2004 |
| EP | 1380246 A2 | 1/2004 |
| EP | 1018315 B1 | 11/2004 |
| EP | 1553472 A1 | 7/2005 |
| EP | 1557730 A1 | 7/2005 |
| EP | 1642522 A2 | 4/2006 |
| EP | 1836941 A2 | 9/2007 |
| ES | 2238196 A1 | 8/2005 |
| FR | 722755 | 3/1932 |
| FR | 2601443 A1 | 1/1988 |
| FR | 2828589 A1 | 2/2003 |
| GB | 702426 | 1/1954 |
| GB | 2128842 A | 5/1984 |
| GB | 2213047 | 8/1989 |
| GB | 2225221 A | 5/1990 |
| GB | 2267360 A | 12/1993 |
| GB | 2283838 A | 5/1995 |
| GB | 2284957 A | 6/1995 |
| GB | 2300082 A | 10/1996 |
| GB | 2404330 A | 2/2005 |
| GB | 2417354 A | 2/2006 |
| JP | 53021869 | 2/1978 |
| JP | 53110257 A2 | 9/1978 |
| JP | 57064217 | 4/1982 |
| JP | 59005315 | 2/1984 |
| JP | 59033511 U | 3/1984 |
| JP | 59094005 | 5/1984 |
| JP | 59099308 | 6/1984 |
| JP | 59112311 | 6/1984 |
| JP | 59120124 | 7/1984 |
| JP | 59131668 | 9/1984 |
| JP | 59164973 | 9/1984 |
| JP | 59184917 A | 10/1984 |
| JP | 2283343 A2 | 11/1984 |

(56) References Cited

FOREIGN PATENT DOCUMENTS

| | | |
|---|---|---|
| JP | 59212924 | 12/1984 |
| JP | 59226909 | 12/1984 |
| JP | 60089213 A | 5/1985 |
| JP | 60211510 A | 10/1985 |
| JP | 60259895 | 12/1985 |
| JP | 61023221 | 1/1986 |
| JP | 61097712 A | 5/1986 |
| JP | 61160366 | 7/1986 |
| JP | 62070709 | 4/1987 |
| JP | 62074018 A | 4/1987 |
| JP | 62120510 A | 6/1987 |
| JP | 62154008 | 7/1987 |
| JP | 62164431 | 7/1987 |
| JP | 62263507 A | 11/1987 |
| JP | 62263508 A | 11/1987 |
| JP | 62189057 U | 12/1987 |
| JP | 63079623 A | 4/1988 |
| JP | 63158032 | 7/1988 |
| JP | 63203483 A | 8/1988 |
| JP | 63241610 A | 10/1988 |
| JP | 1118752 | 8/1989 |
| JP | 206312 U | 1/1990 |
| JP | 3051023 A | 3/1991 |
| JP | 4019586 | 1/1992 |
| JP | 4074285 A | 3/1992 |
| JP | 4084921 A | 3/1992 |
| JP | 5023269 A | 2/1993 |
| JP | 5042076 A | 2/1993 |
| JP | 5046246 | 2/1993 |
| JP | 5091604 A | 4/1993 |
| JP | 5095879 A | 4/1993 |
| JP | 5150827 A | 6/1993 |
| JP | 5150829 A | 6/1993 |
| JP | 5054620 U | 7/1993 |
| JP | 5040519 Y2 | 10/1993 |
| JP | 05257527 A | 10/1993 |
| JP | 5257533 | 10/1993 |
| JP | 05285861 A | 11/1993 |
| JP | 5302836 A | 11/1993 |
| JP | 5312514 A | 11/1993 |
| JP | 05046239 Y2 | 12/1993 |
| JP | 5341904 A | 12/1993 |
| JP | 05341904 A * | 12/1993 |
| JP | 6003251 U | 1/1994 |
| JP | 6038912 | 2/1994 |
| JP | 6137828 A | 5/1994 |
| JP | 6154143 A | 6/1994 |
| JP | 6293095 A | 10/1994 |
| JP | 06327598 A | 11/1994 |
| JP | 6105781 A | 12/1994 |
| JP | 7047046 A | 2/1995 |
| JP | 07129239 A | 5/1995 |
| JP | 7059702 B | 6/1995 |
| JP | 07222705 A2 | 8/1995 |
| JP | 7270518 A | 10/1995 |
| JP | 7281742 | 10/1995 |
| JP | 7313417 A | 12/1995 |
| JP | 8016776 A | 1/1996 |
| JP | 8084696 A | 4/1996 |
| JP | 8089449 A | 4/1996 |
| JP | 08089451 A | 4/1996 |
| JP | 8123548 A | 5/1996 |
| JP | 8152916 A | 6/1996 |
| JP | 8263137 A | 10/1996 |
| JP | 8335112 A | 12/1996 |
| JP | 8339297 A | 12/1996 |
| JP | 9044240 A | 2/1997 |
| JP | 9066855 A | 3/1997 |
| JP | 9145309 A | 6/1997 |
| JP | 09160644 A | 6/1997 |
| JP | 09179625 A | 7/1997 |
| JP | 9179685 | 7/1997 |
| JP | 09185410 | 7/1997 |
| JP | 9192069 A | 7/1997 |
| JP | 2555263 Y2 | 8/1997 |
| JP | 09206258 A | 8/1997 |
| JP | 09233712 A | 9/1997 |
| JP | 9265319 A | 10/1997 |
| JP | 9269807 A | 10/1997 |
| JP | 9269810 A | 10/1997 |
| JP | 9319431 A1 | 12/1997 |
| JP | 9319432 A | 12/1997 |
| JP | 9319434 A | 12/1997 |
| JP | 9325812 A | 12/1997 |
| JP | 10055215 A | 2/1998 |
| JP | 10117973 A | 5/1998 |
| JP | 10118963 A | 5/1998 |
| JP | 10165738 A | 6/1998 |
| JP | 10177414 A | 6/1998 |
| JP | 10295595 A | 11/1998 |
| JP | 10314088 | 12/1998 |
| JP | 11015941 A | 1/1999 |
| JP | 11085269 | 3/1999 |
| JP | 11102220 A | 4/1999 |
| JP | 11162454 A | 6/1999 |
| JP | 11174145 A | 7/1999 |
| JP | 11175149 A | 7/1999 |
| JP | 11178764 A | 7/1999 |
| JP | 11178765 A | 7/1999 |
| JP | 11212642 A | 8/1999 |
| JP | 11213157 A | 8/1999 |
| JP | 11282532 A | 10/1999 |
| JP | 11282533 A | 10/1999 |
| JP | 11295412 A | 10/1999 |
| JP | 2000047728 | 2/2000 |
| JP | 2000056006 A | 2/2000 |
| JP | 2000056831 A | 2/2000 |
| JP | 2000060782 A | 2/2000 |
| JP | 2000066722 A | 3/2000 |
| JP | 2000075925 A | 3/2000 |
| JP | 2000102499 A | 4/2000 |
| JP | 2000275321 | 10/2000 |
| JP | 2000279353 A | 10/2000 |
| JP | 2000353014 A | 12/2000 |
| JP | 2001022443 A | 1/2001 |
| JP | 2001067588 | 3/2001 |
| JP | 2001087182 | 4/2001 |
| JP | 2001121455 | 5/2001 |
| JP | 2001125641 | 5/2001 |
| JP | 2001508572 A | 6/2001 |
| JP | 2001197008 A | 7/2001 |
| JP | 3197758 B2 | 8/2001 |
| JP | 3201903 B2 | 8/2001 |
| JP | 2001216482 A | 8/2001 |
| JP | 2001258807 | 9/2001 |
| JP | 2001265437 A | 9/2001 |
| JP | 2001275908 A | 10/2001 |
| JP | 2001289939 | 10/2001 |
| JP | 2001306170 A | 11/2001 |
| JP | 2002073170 A | 3/2002 |
| JP | 2002078650 A | 3/2002 |
| JP | 2002204768 A | 7/2002 |
| JP | 2002204769 A | 7/2002 |
| JP | 2002247510 A | 8/2002 |
| JP | 2002532180 A | 10/2002 |
| JP | 2002323925 | 11/2002 |
| JP | 2002333920 A | 11/2002 |
| JP | 2002355206 | 12/2002 |
| JP | 2002360471 A | 12/2002 |
| JP | 2002360482 A | 12/2002 |
| JP | 2002366227 | 12/2002 |
| JP | 2002369778 | 12/2002 |
| JP | 2003005296 A | 1/2003 |
| JP | 2003010076 A | 1/2003 |
| JP | 2003010088 A | 1/2003 |
| JP | 2003028528 A | 1/2003 |
| JP | 2003036116 A | 2/2003 |
| JP | 2003038401 A | 2/2003 |
| JP | 2003038402 A | 2/2003 |
| JP | 2003047579 | 2/2003 |
| JP | 2003061882 A | 3/2003 |
| JP | 2003084994 | 3/2003 |
| JP | 2003167628 A | 6/2003 |
| JP | 2003180586 A | 7/2003 |

(56) References Cited

FOREIGN PATENT DOCUMENTS

| | | |
|---|---|---|
| JP | 2003180587 A | 7/2003 |
| JP | 2003186539 A | 7/2003 |
| JP | 2003190064 A | 7/2003 |
| JP | 2003241836 A | 8/2003 |
| JP | 2003262520 A | 9/2003 |
| JP | 2003304992 A | 10/2003 |
| JP | 2003310509 A | 11/2003 |
| JP | 2003330543 A | 11/2003 |
| JP | 2004123040 A | 4/2004 |
| JP | 2004148021 A | 5/2004 |
| JP | 2004160102 A | 6/2004 |
| JP | 2004166968 A | 6/2004 |
| JP | 2004198330 A | 7/2004 |
| JP | 2004219185 | 8/2004 |
| JP | 2004351234 A | 12/2004 |
| JP | 2005118354 A | 5/2005 |
| JP | 2005211360 A | 8/2005 |
| JP | 2005224265 A | 8/2005 |
| JP | 2005230032 A | 9/2005 |
| JP | 2005245916 A | 9/2005 |
| JP | 2005352707 A | 12/2005 |
| JP | 2006043071 A | 2/2006 |
| JP | 2006155274 A | 6/2006 |
| JP | 2006164223 A | 6/2006 |
| JP | 2006227673 A | 8/2006 |
| JP | 2006247467 A | 9/2006 |
| JP | 2006260161 A | 9/2006 |
| JP | 2006293662 A | 10/2006 |
| JP | 2006296697 A | 11/2006 |
| JP | 2007034866 A | 2/2007 |
| JP | 2007213180 A | 8/2007 |
| JP | 2009015611 A | 1/2009 |
| JP | 2010198552 A | 9/2010 |
| WO | WO9526512 A1 | 10/1995 |
| WO | WO9530887 A1 | 11/1995 |
| WO | WO9617258 A1 | 6/1996 |
| WO | WO9715224 A1 | 5/1997 |
| WO | WO9740734 A1 | 11/1997 |
| WO | WO9741451 A1 | 11/1997 |
| WO | WO9853456 A1 | 11/1998 |
| WO | WO9905580 A2 | 2/1999 |
| WO | WO9916078 A1 | 4/1999 |
| WO | WO9938056 A1 | 7/1999 |
| WO | WO9938237 A1 | 7/1999 |
| WO | WO9943250 A1 | 9/1999 |
| WO | WO0038026 A1 | 6/2000 |
| WO | WO0038028 A1 | 6/2000 |
| WO | WO0038029 A1 | 6/2000 |
| WO | WO0004430 A1 | 10/2000 |
| WO | WO0078410 A1 | 12/2000 |
| WO | WO0106904 A1 | 2/2001 |
| WO | WO0106905 A1 | 2/2001 |
| WO | WO0180703 A1 | 11/2001 |
| WO | WO0191623 A2 | 12/2001 |
| WO | WO0224292 A1 | 3/2002 |
| WO | WO0239864 A1 | 5/2002 |
| WO | WO0239868 A1 | 5/2002 |
| WO | WO02058527 A1 | 8/2002 |
| WO | WO02062194 A1 | 8/2002 |
| WO | WO02067744 A1 | 9/2002 |
| WO | WO02067745 A1 | 9/2002 |
| WO | WO02067752 A1 | 9/2002 |
| WO | WO02069774 A1 | 9/2002 |
| WO | WO02069775 A2 | 9/2002 |
| WO | WO02071175 A1 | 9/2002 |
| WO | WO02074150 A1 | 9/2002 |
| WO | WO02075350 A1 | 9/2002 |
| WO | WO02075356 A1 | 9/2002 |
| WO | WO02075469 A1 | 9/2002 |
| WO | WO02075470 A1 | 9/2002 |
| WO | WO02081074 A1 | 10/2002 |
| WO | WO02101477 A2 | 12/2002 |
| WO | WO03015220 A1 | 2/2003 |
| WO | WO03024292 A2 | 3/2003 |
| WO | WO03040546 A1 | 5/2003 |
| WO | WO03040845 A1 | 5/2003 |
| WO | WO03040846 A1 | 5/2003 |
| WO | WO03062850 A2 | 7/2003 |
| WO | WO03062852 A1 | 7/2003 |
| WO | WO2004004533 A1 | 1/2004 |
| WO | WO2004004534 A1 | 1/2004 |
| WO | WO2004006034 A2 | 1/2004 |
| WO | WO2004025947 A2 | 3/2004 |
| WO | WO2004058028 A2 | 7/2004 |
| WO | WO2004059409 A1 | 7/2004 |
| WO | WO2005006935 A1 | 1/2005 |
| WO | WO2005037496 A1 | 4/2005 |
| WO | WO 2005037496 A1 * | 4/2005 | ............... B25J 5/007 |
| WO | WO2005055795 A1 | 6/2005 |
| WO | WO2005055796 A2 | 6/2005 |
| WO | WO2005076545 A1 | 8/2005 |
| WO | WO2005077243 A1 | 8/2005 |
| WO | WO2005077244 A1 | 8/2005 |
| WO | WO2005081074 A1 | 9/2005 |
| WO | WO2005082223 A1 | 9/2005 |
| WO | WO2005083541 A1 | 9/2005 |
| WO | WO2005098475 A1 | 10/2005 |
| WO | WO2005098476 A1 | 10/2005 |
| WO | WO2006046400 A1 | 5/2006 |
| WO | WO2006061133 A1 | 6/2006 |
| WO | WO2006068403 A1 | 6/2006 |
| WO | WO2006073248 A1 | 7/2006 |
| WO | 2006089307 A2 | 8/2006 |
| WO | 2007028049 A2 | 3/2007 |
| WO | WO2007036490 A2 | 4/2007 |
| WO | WO2007065033 A2 | 6/2007 |
| WO | WO2007137234 A2 | 11/2007 |

OTHER PUBLICATIONS

Ascii, Mar. 25, 2002, http://ascii.jp/elem/000/000/330/330024/ accessed Nov. 1, 2011. 7 pages.

Becker et al., "Reliable Navigation Using Landmarks," IEEE International Conference on Robotics and Automation, 0-7803-1965-6, pp. 401-406, 1995.

Benayad-Cherif et al., "Mobile Robot Navigation Sensors," SPIE vol. 1831 Mobile Robots, VII, pp. 378-387, 1992.

Bison et al., "Using a structured beacon for cooperative position estimation," *Robotics and Autonomous Systems*, 29(1):33-40, Oct. 1999.

Blaasvaer et al., "AMOR—An Autonomous Mobile Robot Navigation System," Proceedings of the IEEE International Conference on Systems, Man, and Cybernetics, pp. 2266-2271, 1994.

Borges et al., "Optimal Mobile Robot Pose Estimation Using Geometrical Maps," IEEE Transactions on Robotics and Automation, 18(1): 87-94, Feb. 2002.

Braunstingl et al., "Fuzzy Logic Wall Following of a Mobile Robot Based on the Concept of General Perception," ICAR '95, 7th International Conference on Advanced Robotics, Sant Feliu De Guixols, Spain, pp. 367-376, Sep. 1995.

Bulusu et al., "Self Configuring Localization systems: Design and Experimental Evaluation," *ACM Transactions on Embedded Computing Systems*, 3(1):24-60, 2003.

Caccia et al., "Bottom-Following for Remotely Operated Vehicles," 5th IFAC Conference, Alaborg, Denmark, pp. 245-250, Aug. 2000.

Certified copy of U.S. Appl. No. 60/605,066 as provided to WIPO in PCT/US2005/030422, corresponding to U.S. Appl. No. 11/574,290, U.S.publication 2008/0184518, filed Aug. 27, 2004.

Certified copy of U.S. Appl. No. 60/605,181 as provided to WIPO in PCT/US2005/030422, corresponding to U.S. Appl. No. 11/574,290, U.S.publication 2008/0184518, filed Aug. 27, 2004.

Chae et al., "StarLITE: A new artificial landmark for the navigation of mobile robots," http://www.irc.atr.jp/jk-nrs2005/pdf/Starlite.pdf, 4 pages, 2005.

Chamberlin et al., "Team 1: Robot Locator Beacon System, " NASA Goddard SFC, Design Proposal, 15 pages, Feb. 2006.

Champy, "Physical management of IT assets in Data Centers using RFID technologies," RFID 2005 University, Oct. 12-14, 2005 , 19 pages.

(56) References Cited

OTHER PUBLICATIONS

Chin, "Joystick Control for Tiny OS Robot," http://www.eecs.berkeley.edu/Programs/ugrad/superb/papers2002/chiri.pdf. 12 pages, Aug. 2002.

Christensen et al. "Theoretical Methods for Planning and Control in Mobile Robotics," 1997 First International Conference on Knowledge-Based Intelligent Electronic Systems, Adelaide, Australia, pp. 81-86, May 1997.

Clerentin et al., "A localization method based on two omnidirectional perception systems cooperation," *Proc of IEEE International Conference on Robotics & Automation*, San Francisco, CA vol. 2, pp. 1219-1224, Apr. 2000.

Corke, "High Performance Visual serving for robots end-point control," SPIE vol. 2056, Intelligent Robots and Computer Vision, 1993, 10 pages.

Cozman et al., "Robot Localization using a Computer Vision Sextant," IEEE International Midwest Conference on Robotics and Automation, pp. 106-111, 1995.

D'Orazio et al., "Model based Vision System for mobile robot position estimation", *SPIE*, vol. 2058 Mobile Robots VIII, pp. 38-49, 1992.

De Bakker et al., "Smart PSD-array for sheet of light range imaging", Proc. of *SPIE*, vol. 3965, pp. 1-12, May 2000.

Denning Roboscrub image (1989), 1 page.

Desaulniers et al., "An Efficient Algorithm to find a shortest path for a car-like Robot," *IEEE Transactions on robotics and Automation*, 11(6):819-828, Dec. 1995.

Dorfmüller-Ulhaas, "Optical Tracking From User Motion to 3D Interaction," http://www.cg.tuwien.ac.at/research/publications/2002/Dorfmueller-Ulhaas-thesis, 182 pages, 2002.

Dorsch et al., "Laser Triangulation: Fundamental uncertainty in distance measurement," *Applied Optics*, 33(7):1306-1314, Mar. 1994.

Doty et al., "Sweep Strategies for a Sensory-Driven, Behavior-Based Vacuum Cleaning Agent," AAAI 1993 Fall Symposium Series, Instantiating Real-World Agents, pp. 1-6, Oct. 22-24, 1993.

Dudek et al., "Localizing a Robot with Minimum Travel" *Proceedings of the sixth annual ACM-SIAM symposium on Discrete Algorithms*, 27(2):583-604, Apr. 1998.

Dulimarta et al., "Mobile Robot Localization in Indoor Environment", *Pattern Recognition*, 30(1):99-111, 1997.

Dyson's Robot Vacuum Cleaner—the DC06, May 2004, Retrieved from the Internet: URL< http://www.gizmag.com/go/1282/>. Accessed Nov. 2011, 3 pages.

EBay, "Roomba Timer—> Timed Cleaning—Floorvac Robotic Vacuum," Retrieved from the Internet: URL Cgi.ebay.com/ws/eBaylSAPI.dll?viewitem&category=43526&item=4375198387&rd=1, 5 pages, Apr. 2005.

Electrolux Trilobite, "Time to enjoy life," Retrieved from the Internet: URL<http://www.robocon.co.kr/trilobite/Presentation_Trilobite_Kor_030104.ppt, 26 pages, accessed Dec. 2011.

Electrolux Trilobite, Jan. 12, 2001, http://www.electroluxui.com:8080/2002%5C822%5C833102EN.pdf, accessed Jul. 2, 2012, 10 pages.

Electrolux, "Designed for the well-lived home," Retrieved from the Internet: URL<http://www.electroluxusa.com/node57.as[?currentURL=node142.asp%3F >. Accessed Mar. 2005, 5 pages.

Electrolux, "Welcome to the Electrolux trilobite," Retrieved from the Internet: URL<www.electroluxusa.com/node57.asp?currentURL=node142.asp%3F>. 2 pages, Mar. 2005.

Eren et al., "Accuracy in position estimation of mobile robots based on coded infrared signal transmission," Proceedings: Integrating Intelligent Instrumentation and Control, Instrumentation and Measurement Technology Conference, 1995, IMTC/95. pp. 548-551, 1995.

Eren et al., "Operation of Mobile Robots in a Structured Infrared Environment," Proceedings 'Sensing, Processing, Networking', IEEE Instrumentation and Measurement Technology Conference, 1997 (IMTC/97), Ottawa, Canada vol. 1, pp. 20-25, May 1997.

Euroflex, Jan. 2006, Retrieved from the Internet: URL<http://www.euroflex.tv/novita_dett.php?id=15, 1 page, accessed Nov. 2011.

eVac Robotic Vacuum S1727 Instruction Manual, Sharper Image Corp, Copyright 2004, 16 pages.

Everyday Robots, "Everyday Robots: Reviews, Discussion and News for Consumers," Retrieved from the Internet: URL< www.everydayrobots.com/index.php?option=content&task=view&id=9>. 7 pages, Apr. 2005.

Evolution Robotics, "NorthStar—Low-cost Indoor Localiztion—How it Works," E Evolution Robotics , 2 pages, 2005.

Facchinetti Claudio et al., "Self-Positioning Robot Navigation Using Ceiling Images Sequences," ACCV '95, 5 pages, Dec. 1995.

Facchinetti Claudio et al., "Using and Learning Vision-Based Self-Positioning for Autonomous Robot Navigation," ICARCV '94, vol. 3, pp. 1694-1698, 1994.

Facts on the Trilobite, Retrieved from the Internet: URL< http://www.frc.ri.cmu.edu/~hpm/talks/Extras/trilobite.desc.html >. 2 pages, accessed Nov. 2011.

Facts on Trilobite, webpage, Retrieved from the Internet: URL< http://trilobiteelectroluxse/presskit_en/mode111335asp?print=yes&pressID=>. 2 pages, accessed Dec. 2003.

Fairfield et al., "Mobile Robot Localization with Sparse Landmarks," SPIE vol. 4573, pp. 148-155, 2002.

Favre-Bulle, "Efficient tracking of 3D—Robot Position by Dynamic Triangulation," IEEE Instrumentation and Measurement Technology Conference IMTC 98 Session on Instrumentation and Measurement in Robotics, vol. 1, pp. 446-449, May 1998.

Fayman, "Exploiting Process Integration and Composition in the context of Active Vision," IEEE Transactions on Systems, Man, and Cybernetics—Part C: Application and reviews, vol. 29, No. 1, pp. 73-86, Feb. 1999.

Florbot GE Plastics, 1989-1990, 2 pages, available at http://www.fuseid.com/, accessed Sep. 27, 2012.

Franz et al., "Biomimetric robot navigation", Robotics and Autonomous Systems, vol. 30 pp. 133-153, 2000.

Friendly Robotics, "Friendly Robotics—Friendly Vac, Robotic Vacuum Cleaner," Retrieved from the Internet: URL< www.friendlyrobotics.com/vac.htm > 5 pages, Apr. 2005.

Friendly Robotics, Retrieved from the Internet: URL<http://www.robotsandrelax.com/PDFs/RV400Manual.pdf>. 18 pages, accessed Dec. 2011.

Fuentes et al., "Mobile Robotics 1994," University of Rochester. Computer Science Department, TR 588, 44 pages, Dec. 1994.

Fukuda et al., "Navigation System based on Ceiling Landmark Recognition for Autonomous mobile robot," 1995 IEEE/RSJ International Conference on Intelligent Robots and Systems 95. 'Human Robot Interaction and Cooperative Robots', Pittsburgh, PA, pp. 1466/1471, Aug. 1995.

Gat, "Robust Low-Computation Sensor-driven Control for Task-Directed Navigation," Proc of IEEE International Conference on Robotics and Automation , Sacramento, CA pp. 2484-2489, Apr. 1991.

Gionis, "A hand-held optical surface scanner for environmental Modeling and Virtual Reality," Virtual Reality World, 16 pages, 1996.

Goncalves et al., "A Visual Front-End for Simultaneous Localization and Mapping", Proceedings of the 2005 IEEE International Conference on Robotics and Automation, Barcelona, Spain, pp. 44-49, Apr. 2005.

Gregg et al., "Autonomous Lawn Care Applications," 2006 Florida Conference on Recent Advances in Robotics, Miami, Florida, May 25-26, 2006, Florida International University, 5 pages.

Grumet, "Robots Clean House," Popular Mechanics, Nov. 2003, 3 pages.

Hamamatsu "SI PIN Diode S5980, S5981 S5870—Multi-element photodiodes for surface mounting," Hamatsu Photonics, 2 pages, Apr. 2004.

Hammacher Schlemmer , "Electrolux Trilobite Robotic Vacuum," Retrieved from the Internet: URL< www.hammacher.com/publish/71579.asp?promo=xsells>. 3 pages, Mar. 2005.

Haralick et al. "Pose Estimation from Corresponding Point Data", *IEEE Transactions on Systems, Man, and Cybernetics*, 19(6):1426-1446, Nov. 1989.

(56) References Cited

OTHER PUBLICATIONS

Hausler, "About the Scaling Behaviour of Optical Range Sensors," Fringe '97, Proceedings of the 3rd International Workshop on Automatic Processing of Fringe Patterns, Bremen, Germany, pp. 147-155, Sep. 1997.
Hitachi 'Feature', http://kadenfan.hitachi.co.jp/robot/feature/feature.html, 1 page, Nov. 19, 2008.
Hitachi, http://www.hitachi.co.jp/New/cnews/hi__030529__hi__030529.pdf , 8 pages, May 29, 2003.
Hitachi: News release: "The home cleaning robot of the autonomous movement type (experimental machine)," Retrieved from the Internet: URL< www.i4u.com./japanreleases/hitachirobot.htm>. 5 pages, Mar. 2005.
Hoag et al., "Navigation and Guidance in interstellar space," ACTA Astronautica, vol. 2, pp. 513-533 , Feb. 1975.
Home Robot—UBOT; Microbotusa.com, retrieved from the WWW at www.microrobotusa.com, accessed Dec. 2, 2008, 2 pages.
Huntsberger et al., "CAMPOUT: A Control Architecture for Tightly Coupled Coordination of Multirobot Systems for Planetary Surface Exploration," *IEEE Transactions on Systems, Man, and Cybernetics—Part A: Systems and Humans*, 33(5):550-559, Sep. 2003.
Iirobotics.com, "Samsung Unveils Its Multifunction Robot Vacuum," Retrieved from the Internet: URL<.www.iirobotics.com/webpages/hotstuff.php?ubre=111>. 3 pages, Mar. 2005.
InMach "Intelligent Machines," Retrieved from the Internet: URL<www.inmach.de/inside.html>. 1 page , Nov. 2008.
Innovation First, "2004 EDU Robot Controller Reference Guide," Retrieved from the Internet: URL<http://www.ifirobotics.com>. 13 pages, Mar. 2004.
IT media, Retrieved from the Internet: URL<http://www.itmedia.co.jp/news/0111/16/robofesta_m.html>. Accessed Nov. 1, 2011, 4 pages.
It's eye, Retrieved from the Internet: URL< www.hitachi.co.jp/rd/pdf/topics/hitac2003__10.pdf>. 2 pages, 2003.
Jarosiewicz et al., "Final Report—Lucid," University of Florida, Departmetn of Electrical and Computer Engineering, EEL 5666—Intelligent Machine Design Laboratory, 50 pages, Aug. 1999.
Jensfelt et al., "Active Global Localization for a mobile robot using multiple hypothesis tracking," *IEEE Transactions on Robots and Automation*, 17(5): 748-760, Oct. 2001.
Jeong et al., "An intelligent map-building system for indoor mobile robot using low cost photo sensors," *SPIE*, vol. 6042, 6 pages, 2005.
Kahney, "Robot Vacs are in the House," Retrieved from the Internet: URL<www.wired.com/news/technology/o,1282,59237,00.html>. 6 pages, Jun. 2003.
Karcher "Karcher RoboCleaner RC 3000," Retrieved from the Internet: URL<www.robocleaner.de/english/screen3.html>. 4 pages, Dec. 2003.
Karcher Product Manual Download webpage: Retrieved from the Internet: URL<http://www.karcher.com/bta/download.en.shtml?ACTION=SELECTTEILENR&ID=rc3000 &submitButtonName=Select+Product+Manual and associated .pdf file "5959-915en.pdf (4.7 MB) English/English," 16 pages, accessed Jan. 2004.
Karcher RC 3000 Cleaning Robot-user manual Manufacturer: Alfred-Karcher GmbH & Co, Cleaning Systems, Alfred Karcher-Str 28-40, PO Box 160, D-71349 Winnenden, Germany, Dec. 2002.
Karcher USA "RC 3000 Robotics cleaner," : Retrieved from the Internet: URL<www.karcher-usa.com, 3 pages, Mar. 2005.
Karcher USA, RC3000 Robotic Cleaner, website: http://www.karcher-usa.com/showproducts.php?op=view prod¶ml=143 ¶m2=&param3=, 6 pages, accessed Mar. 2005.
Karcher, "Product Manual Download Karch", available at www.karcher.com, 17 pages, 2004.
Karlsson et al, "Core Technologies for service Robotics," IEEE/RSJ International Conference on Intelligent Robots and Systems (IROS 2004), vol. 3, pp. 2979-2984, Sep. 2004.
Karlsson et al., The vSLAM Algorithm for Robust Localization and Mapping, Proceedings of the 2005 IEEE International Conference on Robotics and Automation, Barcelona, Spain, pp. 24-29, Apr. 2005.

King and Weiman, "HelpmateTM Autonomous Mobile Robots Navigation Systems," SPIE vol. 1388 Mobile Robots, pp. 190-198, 1990.
Kleinberg, The Localization Problem for Mobile Robots, Laboratory for Computer Science, Massachusetts Institute of Technology, 1994 IEEE, pp. 521-531, 1994.
Knights, et al., "Localization and Identification of Visual Landmarks," *Journal of Computing Sciences in Colleges*, 16(4):312-313, May 2001.
Kolodko et al., "Experimental System for Real-Time Motion Estimation," Proceedings of the 2003 IEEE/ASME International Conference on Advanced Intelligent Mechatronics (AIM 2003), pp. 981-986, 2003.
Komoriya et al., "Planning of Landmark Measurement for the Navigation of a Mobile Robot," Proceedings of the 1992 IEEE/RSJ International Cofnerence on Intelligent Robots and Systems, Raleigh, NC pp. 1476-1481, Jul. 1992.
Krotov et al., "Digital Sextant," Downloaded from the internet at: http://www.cs.cmu.edu/~epk/ , 1 page, 1995.
Krupa et al., "Autonomous 3-D Positioning of Surgical Instruments in Robotized Laparoscopic Surgery Using Visual Servoin," *IEEE Transactions on Robotics and Automation*, 19(5):842-853, Oct. 2003.
Kuhl et al., "Self Localization in Environments using Visual Angles," VRCAI '04 Proceedings of the 2004 ACM SIGGRAPH international conference on Virtual Reality continuum and its applications in industry, pp. 472-475, 2004.
Kurs et al, Wireless Power transfer via Strongly Coupled Magnetic Resonances, Downloaded from www.sciencemag.org, Aug. 2007, 5 pages.
Kurth, "Range-Only Robot Localization and SLAM with Radio", http://www.ri.cmu.edu/pub__files/pub4/kurth__derek__2004__1/kurth__derek__2004__1.pdf. 60 pages, May, 2004, accessed Jul. 27, 2012.
Kwon et al., "Table Recognition through Range-based Candidate Generation and Vision based Candidate Evaluation," ICAR 2007, The 13th International Conference on Advanced Robotics Aug. 21-24, 2007, Jeju, Korea, pp. 918-923, 2007.
Lambrinos et al., "A mobile robot employing insect strategies for navigation," Retrieved from the Internat: URL<http://www8.cs.umu.se/kurser/TDBD17/VT04/dl/Assignment%20Papers/lambrinos-RAS-2000.pdf>. 38 pages, Feb. 1999.
Lang et al., "Visual Measurement of Orientation Using Ceiling Features", 1994 IEEE, pp. 552-555, 1994.
Lapin, "Adaptive position estimation for an automated guided vehicle," *SPIE*, vol. 1831 Mobile Robots VII, pp. 82-94, 1992.
LaValle et al., "Robot Motion Planning in a Changing, Partially Predictable Environment," 1994 IEEE International Symposium on Intelligent Control, Columbus, OH, pp. 261-266, Aug. 1994.
Lee et al., "Development of Indoor Navigation system for Humanoid Robot Using Multi-sensors Integration", ION NTM, San Diego, CA pp. 798-805, Jan. 2007.
Lee et al., "Localization of a Mobile Robot Using the Image of a Moving Object," *IEEE Transaction on Industrial Electronics*, 50(3):612-619, Jun. 2003.
Leonard et al., "Mobile Robot Localization by tracking Geometric Beacons," *IEEE Transaction on Robotics and Automation*, 7(3):376-382, Jun. 1991.
Li et al. "Robust Statistical Methods for Securing Wireless Localization in Sensor Networks," Information Processing in Sensor Networks, 2005, Fourth International Symposium on, pp. 91-98, Apr. 2005.
Li et al., "Making a Local Map of Indoor Environments by Swiveling a Camera and a Sonar," Proceedings of the 1999 IEEE/RSJ International Conference on Intelligent Robots and Systems, pp. 954-959, 1999.
Lin et al., "Mobile Robot Navigation Using Artificial Landmarks," *Journal of robotics System*, 14(2): 93-106, 1997.
Linde, Dissertation—"On Aspects of Indoor Localization," Available at: https://eldorado.tu-dortmund.de/handle/2003/22854, University of Dortmund, 138 pages, Aug. 2006.
Lumelsky et al., "An Algorithm for Maze Searching with Azimuth Input", 1994 IEEE International Conference on Robotics and Automation, San Diego, CA vol. 1, pp. 111-116, 1994.

(56) References Cited

OTHER PUBLICATIONS

Luo et al., "Real-time Area-Covering Operations with Obstacle Avoidance for Cleaning Robots," IEEE, pp. 2359-2364, 2002.
Ma, Thesis—"Documentation on Northstar," California Institute of Technology, 14 pages, May 2006.
Madsen et al., "Optimal landmark selection for triangulation of robot position," Journal of Robotics and Autonomous Systems, vol. 13 pp. 277-292, 1998.
Malik et al., "Virtual Prototyping for Conceptual Design of a Tracked Mobile Robot," Electrical and Computer Engineering, Canadian Conference on, IEEE, PI. pp. 2349-2352, May 2006.
Martishevcky, "The Accuracy of point light target coordinate determination by dissectoral tracking system", SPIE vol. 2591, pp. 25-30, Oct. 23, 2005.
Maschinemarkt Würzburg 105, Nr. 27, pp. 3, 30, Jul. 5, 1999.
Matsumura Camera Online Shop: Retrieved from the Internet: URL< http://www.rakuten.co.jp/matsucame/587179/711512/>. Accessed Nov. 2011, 7 pages.
Matsutek Enterprises Co. Ltd, "Automatic Rechargeable Vacuum Cleaner," http://matsutek.manufacturer.globalsources.com/si/6008801427181/pdtl/Home-vacuum/10 . . . , Apr. 2007, 3 pages.
McGillem et al., "Infra-red Lacation System for Navigation and Autonomous Vehicles," 1988 IEEE International Conference on Robotics and Automation, vol. 2, pp. 1236-1238, Apr. 1988.
McGillem, et al. "A Beacon Navigation Method for Autonomous Vehicles," *IEEE Transactions on Vehicular Technology*, 38(3):132-139, Aug. 1989.
McLurkin "Stupid Robot Tricks: A Behavior-based Distributed Algorithm Library for Programming Swarms of Robots," Paper submitted for requirements of BSEE at MIT, May 2004, 127 pages.
McLurkin, "The Ants: A community of Microrobots," Paper submitted for requirements of BSEE at MIT, May 1995, 60 pages.
Miro et al., "Towards Vision Based Navigation in Large Indoor Environments," Proceedings of the IEEE/RSJ International Conference on Intelligent Robots and Systems, Beijing, China, pp. 2096-2102, Oct. 2006.
Miwako Doi "Using the symbiosis of human and robots from approaching Research and Development Center," Toshiba Corporation, 16 pages, available at http://warp.ndl.go.jp/info:ndljp/pid/258151/www.soumu.go.jp/joho_isusin/policyreports/chousa/netrobot/pdf/030214_1_33_a.pdf, Feb. 26, 2003.
MobileMag, "Samsung Unveils High-tech Robot Vacuum Cleaner," Retrieved from the Internet: URL<http://www.mobilemag.com/content/100/102/C2261/>. 4 pages, Mar. 2005.
Monteiro et al., "Visual Servoing for Fast Mobile Robot: Adaptive Estimation of Kinematic Parameters," Proceedings of the IECON '93., International Conference on Industrial Electronics, Maui, HI, pp. 1588-1593, Nov. 1993.
Moore et al., "A simple Map-bases Localization strategy using range measurements," *SPIE*, vol. 5804 pp. 612-620, 2005.
Morland,"Autonomous Lawnmower Control", Downloaded from the internet at: http://cns.bu.edu/~cjmorlan/robotics/lawnmower/report.pdf, 10 pages, Jul. 2002.
Munich et al., "ERSP: A Software Platform and Architecture for the Service Robotics Industry," Intelligent Robots and Systems, 2005. (IROS 2005), pp. 460-467, Aug. 2005.
Munich et al., "SIFT-ing Through Features with ViPR", IEEE Robotics & Automation Magazine, pp. 72-77, Sep. 2006.
Nam et al., "Real-Time Dynamic Visual Tracking Using PSD Sensors and extended Trapezoidal Motion Planning", Applied Intelligence 10, pp. 53-70, 1999.
Nitu et al., "Optomechatronic System for Position Detection of a Mobile Mini-Robot," *IEEE Ttrransactions on Industrial Electronics*, 52(4):969-973, Aug. 2005.
On Robo, "Robot Reviews Samsung Robot Vacuum (VC-RP30W)," Retrieved from the Internet: URL <www.onrobo.com/reviews/AT_Home/vacuum_cleaners/on00vcrb30rosam/index.htm>. 2 pages, 2005.
OnRobo "Samsung Unveils Its Multifunction Robot Vacuum," Retrieved from the Internet: URL <www.onrobo.com/enews/0210/samsung_vacuum.shtml>. 3 pages, Mar. 2005.
Pages et al., "A camera-projector system for robot positioning by visual serving," Proceedings of the 2006 Conference on Computer Vision and Pattern Recognition Workshop (CVPRW06), 8 pages, Jun. 2006.
Pages et al., "Optimizing Plane-to-Plane Positioning Tasks by Image-Based Visual Servoing and Structured Light," *IEEE Transactions on Robotics*, 22(5):1000-1010, Oct. 2006.
Pages et al., "Robust decoupled visual servoing based on structured light," 2005 IEEE/RSJ, Int. Conf. on Intelligent Robots and Systems, pp. 2676-2681, 2005.
Park et al., "A Neural Network Based Real-Time Robot Tracking Controller Using Position Sensitive Detectors," IEEE World Congress on Computational Intelligence., 1994 IEEE International Conference on Neutral Networks, Orlando, Florida pp. 2754-2758, Jun./Jul. 1994.
Park et al., "Dynamic Visual Servo Control of Robot Manipulators using Neutral Networks," *The Korean Institute Telematics and Electronics*, 29-B(10):771-779, Oct. 1992.
Paromtchik "Toward Optical Guidance of Mobile Robots," Proceedings of the Fourth World Multiconference on Systemics, Cybermetics and Informatics, Orlando, FL, USA, Jul. 23, 2000, vol. IX, pp. 44-49, available at http://emotion.inrialpes.fr/~paromt/infos/papers/paromtchik:asama:sci:2000.ps.gz, accessed Jul. 3, 2012, 6 pages.
Paromtchik et al., "Optical Guidance System for Multiple mobile Robots," Proceedings 2001 ICRA. IEEE International Conference on Robotics and Automation, vol. 3, pp. 2935-2940, May 2001.
Penna et al., "Models for Map Building and Navigation", IEEE Transactions on Systems. Man. and Cybernetics., 23(5):1276-1301, Sep./Oct. 1993.
Pirjanian et al. "Representation and Execution of Plan Sequences for Multi-Agent Systems," Proceedings of the 2001 IEEE/RSJ International Conference on Intelligent Robots and Systems, Maui, Hawaii, pp. 2117-2123, Oct. 2001.
Pirjanian et al., "A decision-theoretic approach to fuzzy behavior coordination", 1999 IEEE International Symposium on Computational Intelligence in Robotics and Automation, 1999. CIRA '99., Monterey, CA, pp. 101-106, Nov. 1999.
Pirjanian et al., "Distributed Control for a Modular, Reconfigurable Cliff Robot," Proceedings of the 2002 IEEE International Conference on Robotics & Automation, Washington, D.C. pp. 4083-4088, May 2002.
Pirjanian et al., "Improving Task Reliability by Fusion of Redundant Homogeneous Modules Using Voting Schemes," Proceedings of the 1997 IEEE International Conference on Robotics and Automation, Albuquerque, NM, pp. 425-430, Apr. 1997.
Pirjanian et al., "Multi-Robot Target Acquisition using Multiple Objective Behavior Coordination," Proceedings of the 2000 IEEE International Conference on Robotics & Automation, San Francisco, CA, pp. 2696-2702, Apr. 2000.
Pirjanian, "Challenges for Standards for consumer Robotics," IEEE Workshop on Advanced Robotics and its Social impacts, pp. 260-264, Jun. 2005.
Pirjanian, "Reliable Reaction," Proceedings of the 1996 IEEE/SICE/RSJ International Conference on Multisensor Fusion and Integration for Intelligent Systems, pp. 158-165, 1996.
Popco.net, "Make your digital life," Retrieved from the Internet: URL<http://www.popco.net/zboard/view.php?id=tr_review &no=40>. 14 pages, Accessed Nov. 2011.
Prassler et al., "A Short History of Cleaning Robots," Autonomous Robots 9, 211-226, 2000, 16 pages.
Put Your Roomba . . . On, Automatic webpages: http://www.acomputeredge.com/roomba, 5 pages, accessed Apr. 2005.
Remazeilles et al., "Image based robot navigation in 3D environments," Proc. of *SPIE*, vol. 6052, pp. 1-14, Dec. 2005.
Retrieved from the Internet: URL<. http://www.karcher.de/versions/intg/assets/video/2_4_robo_en.swf>. Accessed Sep. 2009, 2 pages.
Rives et al., "Visual servoing based on ellipse features," *SPIE*, vol. 2056 Intelligent Robots and Computer Vision pp. 356-367, 1993.

(56) References Cited

OTHER PUBLICATIONS

Roboking—not just a vacuum cleaner, a robot!, Jan. 21, 2004, infocom.uz/2004/01/21/robokingne-prosto-pyilesos-a-robot/, accessed Oct. 10, 2011, 7 pages.
RoboMaid Sweeps Your Floors So You Won't Have to, the Official Site, website: Retrieved from the Internet: URL<http://therobomaid.com>. 2 pages, accessed Mar. 2005.
Robot Buying Guide, "LG announces the first robotic vacuum cleaner for Korea," Retrieved from the Internet: URL<http://robotbg.corn/news/2003/04/22/lg_announces_the_first_robotic_vacu>. 1 page, Apr. 2003.
Robotics World, "A Clean Sweep," 5 pages, Jan. 2001.
Ronnback, "On Methods for Assistive Mobile Robots," Retrieved from the Internet: URL<http://www.openthesis.org/documents/methods-assistive-mobile-robots-595019.html>. 218 pages, Jan. 2006.
Roth-Tabak et al., "Environment Model for mobile Robots Indoor Navigation," *SPIE*, vol. 1388 Mobile Robots, pp. 453-463, 1990.
Sahin et al., "Development of a Visual Object Localization Module for Mobile Robots," 1999 Third European Workshop on Advanced Mobile Robots, (Eurobot '99), pp. 65-72, 1999.
Salomon et al., "Low-Cost Optical Indoor Localization system for Mobile Objects without Image Processing," IEEE Conference on Emerging Technologies and Factory Automation, 2006. (ETFA '06), pp. 629-632, Sep. 2006.
Sato, "Range Imaging Based on Moving Pattern Light and Spatio-Temporal Matched Filter," Proceedings International Conference on Image Processing, vol. 1., Lausanne, Switzerland, pp. 33-36, Sep. 1996.
Schenker et al., "Lightweight rovers for Mars science exploration and sample return," Intelligent Robots and Computer Vision XVI, *SPIE* Proc. 3208, pp. 24-36, 1997.
Schofield, "Neither Master nor slave—A Practical Study in the Development and Employment of Cleaning Robots, Emerging Technologies and Factory Automation," 1999 Proceedings ETFA '99 1999 7th IEEE International Conference on Barcelona, Spain, pp. 1427-1434, Oct. 1999.
Shimoga et al., "Touch and Force Reflection for Telepresence Surgery," Engineering in Medicine and Biology Society, 1994. Engineering Advances: New Opportunities for Biomedical Engineers. Proceedings of the 16th Annual International Conference of the IEEE, Baltimore, MD, pp. 1049-1050, 1994.
Sim et al, "Learning Visual Landmarks for Pose Estimation," IEEE International Conference on Robotics and Automation, vol. 3, Detroit, MI, pp. 1972-1978, May 1999.
Sobh et al., "Case Studies in Web-Controlled Devices and Remote Manipulation," Automation Congress, 2002 Proceedings of the 5th Biannual World, pp. 435-440, Dec. 2002.
Special Reports, "Vacuum Cleaner Robot Operated in Conjunction with 3G Celluar Phone," 59(9): 3 pages, Retrieved from the Internet: URL<http://www.toshiba.co.jp/tech/review/2004/09/59_0>. 2004.
Stella et al., "Self-Location for Indoor Navigation of Autonomous Vehicles," Part of the SPIE conference on Enhanced and Synthetic Vision SPIE vol. 3364, pp. 298-302, 1998.
Summet, "Tracking Locations of Moving Hand-held Displays Using Projected Light," Pervasive 2005, LNCS 3468, pp. 37-46, 2005.
Svedman et al., "Structure from Stereo Vision using Unsynchronized Cameras for Simultaneous Localization and Mapping," 2005 IEEE/RSJ International Conference on Intelligent Robots and Systems, pp. 2993-2998, 2005.
SVET Computers—New Technologies—Robot Vacuum Cleaner, Oct. 1999, available at http://www.sk.rs/1999/10/sknt01.html, 1 page, accessed Nov. 1, 2011.
Taipei Times, "Robotic vacuum by Matsuhita about to undergo testing," Retrieved from the Internet: URL<http://www.taipeitimes.com/News/worldbiz/archives/2002/03/26/0000129338>. accessed Mar. 2002, 2 pages.
Takio et al., "Real-Time Position and Pose Tracking Method of Moving Object Using Visual Servo System," 47th IEEE International Symposium on Circuits and Systems, pp. 167-170, 2004.

Tech-on!, Retrieved from the Internet: URL<http://techon.nikkeibp.co.jp/members/01db/200203/1006501/>. 4 pages, accessed Nov. 2011.
Teller, "Pervasive pose awareness for people, Objects and Robots," http://www.ai.mit.edu/lab/dangerous-ideas/Spring2003/teller-pose.pdf, 6 pages, Apr. 2003.
Terada et al., "An Acquisition of the Relation between Vision and Action using Self-Organizing Map and Reinforcement Learning," 1998 Second International Conference on Knowledge-Based Intelligent Electronic Systems, Adelaide, Australia, pp. 429-434, Apr. 1998.
The Sharper Image, eVac Robotic Vacuum—Product Details, www.sharperiamge.com/us/en/templates/products/pipmorework1printable.jhtml, 1 page, Mar. 2005.
TheRobotStore.com, "Friendly Robotics Robotic Vacuum RV400—The Robot Store," www.therobotstore.com/s.nl/sc.9/category.-109/it.A/id.43/.f, 1 page, Apr. 2005.
Thrun, Sebastian, "Learning Occupancy Grid Maps With Forward Sensor Models," Autonomous Robots 15, 28 pages, Sep. 1, 2003.
TotalVac.com, RC3000 RoboCleaner website, Mar. 2005, 3 pages.
Trebi-Ollennu et al., "Mars Rover Pair Cooperatively Transporting a Long Payload," Proceedings of the 2002 IEEE International Conference on Robotics & Automation, Washington, D.C. pp. 3136-3141, May 2002.
Tribelhorn et al., "Evaluating the Roomba: A low-cost, ubiquitous platform for robotics research and education," *IEEE*, pp. 1393-1399, 2007.
Tse et al., "Design of a Navigation System for a Household Mobile Robot Using Neural Networks," Department of Manufacturing Engg. & Engg. Management, City University of Hong Kong, pp. 2151-2156, 1998.
UAMA (Asia) Industrial Co., Ltd., "RobotFamily," 2005, 1 page.
UBOT, cleaning robot capable of wiping with a wet duster, Retrieved from the Internet: URL<http://us.aving.net/news/view.php?articleId=23031>. 4 pages, accessed Nov. 2011.
Watanabe et al., "Position Estimation of Mobile Robots With Internal and External Sensors Using Uncertainty Evolution Technique," 1990 IEEE International Conference on Robotics and Automation, Cincinnati, OH, pp. 2011-2016, May 1990.
Watts, "Robot, boldly goes where no man can," The Times—pp. 20, Jan. 1985.
Wijk et al., "Triangulation-Based Fusion of Sonar Data with Application in Robot Pose Tracking," *IEEE Transactions on Robotics and Automation*, 16(6):740-752, Dec. 2000.
Wolf et al., "Robust Vision-Based Localization by Combining an Image-Retrieval System with Monte Carol Localization,", *IEEE Transactions on Robotics*, 21(2):208-216, Apr. 2005.
Wolf et al., "Robust Vision-based Localization for Mobile Robots Using an Image Retrieval System Based on Invariant Features," Proceedings of the 2002 IEEE International Conference on Robotics & Automation, Washington, D.C., pp. 359-365, May 2002.
Wong, "EIED Online>> Robot Business", ED Online ID# 13114, 17 pages, Jul. 2006.
Yamamoto et al., "Optical Sensing for Robot Perception and Localization," 2005 IEEE Workshop on Advanced Robotics and its Social Impacts, pp. 14-17, 2005.
Yata et al., "Wall Following Using Angle Information Measured by a Single Ultrasonic Transducer," Proceedings of the 1998 IEEE, International Conference on Robotics & Automation, Leuven, Belgium, pp. 1590-1596, May 1998.
Yujin Robotics,"An intelligent cleaning robot," Retrieved from the Internet: URL<http://us.aving.net/news/view.php?articleId=7257>. 8 pages, accessed Nov. 2011.
Yun et al., "Image-Based Absolute Positioning System for Mobile Robot Navigation," IAPR International Workshops SSPR, Hong Kong, pp. 261-269, Aug. 2006.
Yun et al., "Robust Positioning a Mobile Robot with Active Beacon Sensors," *Lecture Notes in Computer Science*, 2006, vol. 4251, pp. 890-897, 2006.
Yuta et al., "Implementation of an Active Optical Range sensor Using Laser Slit for In-Door Intelligent Mobile Robot," IEE/RSJ International Workshop on Intelligent Robots and Systems (IROS 91) vol. 1, Osaka, Japan, pp. 415-420, Nov. 3-5, 1991.

(56) References Cited

OTHER PUBLICATIONS

Zha et al., "Mobile Robot Localization Using Incomplete Maps for Change Detection in a Dynamic Environment," Advanced Intelligent Mechatronics '97. Final Program and Abstracts., IEEE/ASME International Conference, pp. 110, Jun. 1997.

Zhang et al., "A Novel Mobile Robot Localization Based on Vision," *SPIE* vol. 6279, 6 pages, Jan. 2007.

* cited by examiner

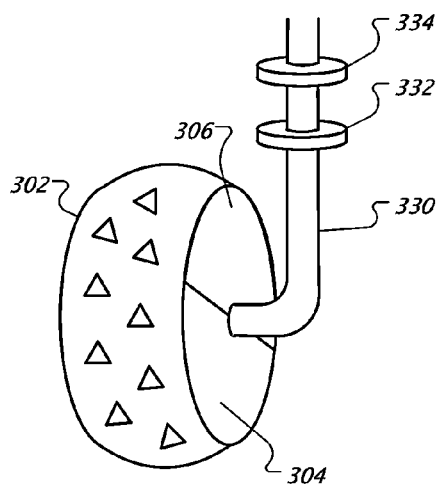
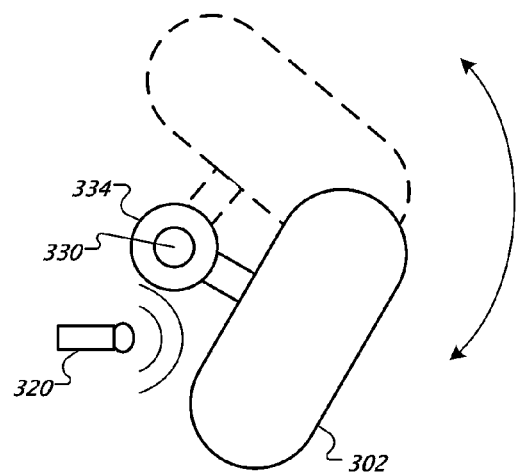
FIG. 5
FIG. 7
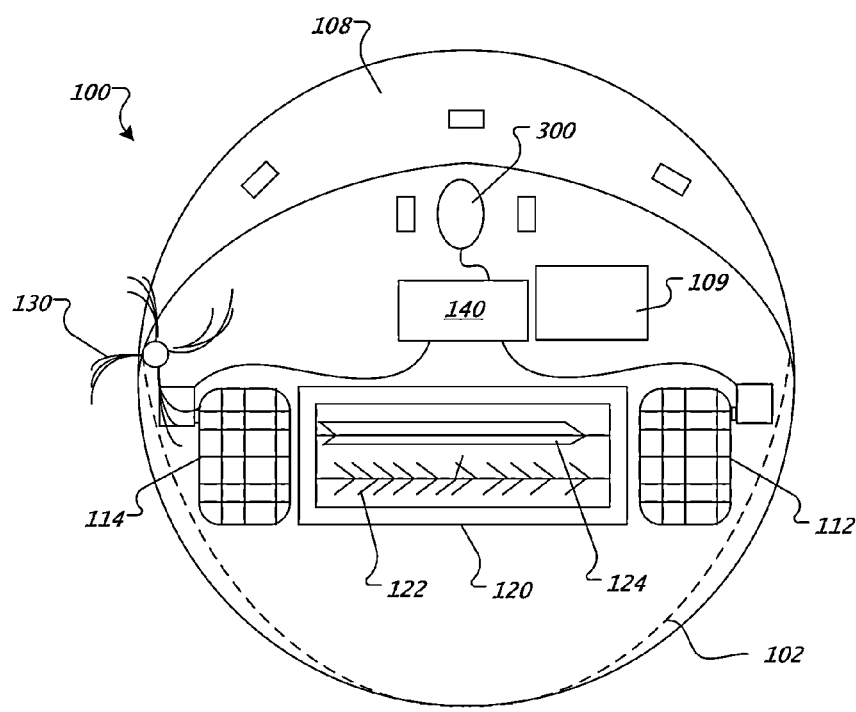
FIG. 6

DETECTING ROBOT STASIS

CROSS-REFERENCE TO RELATED APPLICATIONS

This application is a continuation of and claims priority from U.S. non-provisional patent application Ser. No. 11/756,262, filed May 31, 2007, which claims priority under 35 U.S.C. §119(e) to U.S. provisional patent application Ser. No. 60/803,608, filed on May 31, 2006. The entire contents of these related applications are hereby incorporated by reference.

TECHNICAL FIELD

This disclosure relates to detecting a stasis condition of a coverage robot.

BACKGROUND

In the field of home, office, and/or consumer-oriented robotics, mobile robots performing household functions involving traversing a floor or other surface to vacuum cleaning, floor wash, patrol, or cut a lawn, have become commercially available. Machines for clearing debris from carpet or hard floors, for example, may traverse a carpet or hard floor surface, for example. In the course of moving over the floor or other such surface, these robots may odometrically monitor the distance they travel, or determine whether they are in fact moving, by counting the number of, or monitoring, revolutions made by a rotatable wheel that remains in frictional contact with the surface while the robot moves over the surface.

SUMMARY

In one aspect, a coverage robot includes a drive configured to maneuver the robot as directed by a controller in communication with the drive, a stasis indication wheel rotatable about a first axis perpendicular to a direction of forward travel, and a suspension supporting the wheel. The stasis indication wheel defines a first reflective portion and a second reflective portion. The second reflective portion is substantially less reflective than the first reflective portion. The suspension permits movement of the wheel in a direction other than rotation about the first axis. A signal emitter is disposed remotely from the wheel and positioned to direct a signal that sequentially is intercepted by the first and second reflective portions of the wheel. A signal receiver is positioned to receive the signal as reflected by the wheel as the wheel rotates with respect to the emitter and as the suspension permits movement of the wheel in a direction other than rotation about the first axis. Communication between the emitter and the receiver is affected by rolling transitions between the first reflective portion and the second reflective portion of the wheel in multiple positions about the first axis and along permitted movement in a direction other than rotation about the first axis.

In another aspect, a coverage robot includes a drive configured to maneuver the robot as directed by a controller in communication with the drive, a stasis indication wheel rotatable about a first axis perpendicular to a direction of forward travel, and a suspension supporting the wheel. The stasis indication wheel includes a hub and multiple spokes extending outwardly from the hub. The stasis indication wheel defines a first reflective portion and a second reflective portion. The second reflective portion is substantially less reflective than the first reflective portion. A signal emitter is disposed remotely from the wheel and positioned to direct a signal that sequentially is intercepted by the first and second reflective portions of the wheel. A signal receiver is positioned to receive the signal as reflected by the wheel as the wheel rotates with respect to the emitter and as the suspension permits movement of the wheel in a direction other than rotation about the first axis. Communication between the emitter and the receiver is affected by rolling transitions between the first reflective portion and the second reflective portion of the wheel in multiple positions about the first axis and along permitted movement in a direction other than rotation about the first axis.

Implementations of the disclosure may include one or more of the following features. In some examples, the permitted direction of wheel movement other than rotation about the first axis includes vertical displacement of the wheel. The coverage robot may include a drop wheel sensor arranged to detect vertical displacement of the wheel. The permitted direction of wheel movement other than rotation about the first axis may also include tilting away from a vertical second axis perpendicular to the first axis, rotation about a vertical second axis perpendicular to the first axis, and translation parallel to an underside of the robot. In some implementations, the coverage robot includes a wheel housing secured to the suspension and shrouding the wheel. The wheel housing defines an aperture in a top portion of the wheel housing, exposing the wheel to the signal emitter and the signal receiver. The wheel housing is configured to minimize an entry of ambient light into the aperture of the housing.

In some examples, the reflective portion of the wheel reflects light of a first infrared wavelength and the non-reflective portion reflects light of a second infrared wavelength different from the first wavelength. The emitter and receiver may be arranged above the wheel, the emitter emitting the signal onto a top portion of the wheel, and the receiver responsive to reflected emissions.

In some implementations, the coverage robot includes a cliff signal emitter and a cliff signal receiver. The cliff signal emitter is aligned to emit a cliff detection signal onto a floor surface adjacent the wheel. The cliff signal receiver is configured to receive the cliff detection signal reflected from the floor surface. The cliff signal emitter and cliff signal receiver are arranged with respect to the floor surface such that communication between the cliff signal emitter and the cliff signal receiver is affected by vertical movement of the floor surface with respect to the robot.

In some implementations, the controller monitors a drive current of the drive to determine a presence of a stasis condition. For example, if the drive current increases significantly, it may be indicative of a robot stuck condition. If the drive current drops significantly, it may be indicative of a free wheeling condition, as when a drive wheel is off a cliff edge.

In some examples, the stasis indication wheel comprises a hub and multiple spokes extending outwardly from the hub. The stasis indication wheel may include a magnet disposed on one of the spokes. The magnet interacts with a reed switch in communication with the controller to provide wheel rotation or traction feedback. In some examples, the spokes of the stasis indication wheel are compliant. The stasis indication wheel may be disposed adjacent a drive wheel.

The details of one or more implementations of the disclosure are set fourth in the accompanying drawings and the description below. Other features, objects, and advantages will be apparent from the description and drawings, and from the claims.

DESCRIPTION OF DRAWINGS

FIG. 5 is a perspective view of an axle arm assembly for mounting a wheel.

FIG. 6 is a bottom schematic view of a robot incorporating a caster wheel assembly.

FIG. 7 is a top view of the axle arm assembly for mounting a wheel, illustrating the swiveling ability of the axle arm assembly about a Z-axis.

Like reference symbols in the various drawings indicate like elements.

DETAILED DESCRIPTION

A cleaning robot may, for example, include a front wheel which is not motor driven, but instead spins freely as robot drive wheels (or other powered drive system, such as treads, legs, or directed air jets, inter alia) propel the robot. Such a free-spinning wheel may be used as part of a robot stasis detection system (and/or distance, motion or speed detection system), in which the spinning of the wheel is used to gauge whether or not the robot is in fact moving. Such a distance, motion, speed, or stasis detector may be used to detect if the robot is jammed against an obstacle or if the drive wheels are disengaged from the floor, for example, as when the robot is tilted or becomes stranded on an object. In such circumstances, the drive wheels may spin when the mobile robot applies power to them, but the robot is not moving.

Figure 1A:
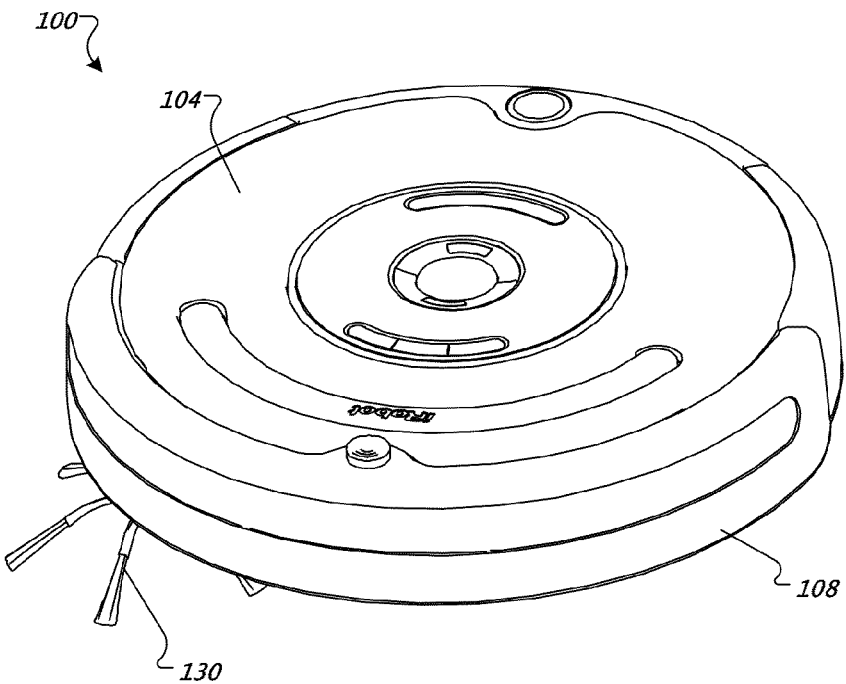
FIG. 1A is an above-perspective view of a coverage robot.

FIG. 1A is a top perspective view showing an example of a coverage robot 100. The coverage robot 100 may be used to clean a work surface, such as a floor or wall by vacuuming debris brushed from the work surface. The robot 100 includes a chassis 102 which carries an outer shell 104, a drive system 110, a main cleaning head 120, an edge cleaning head 130, and a controller 140. Drive system 110 is mounted on the chassis 102, and is a differential drive (left and right wheels near to or on the center diameter of the robot 100 and independently speed controllable) configured to maneuver the robot 100. The main cleaning head 120 is carried by the chassis 102 and includes a main brush 122 and a flapper roller 124, both rotatably coupled the housing of the main cleaning head 120. The edge cleaning head 130 is mounted to extend past the side edge of the chassis 102 for removing dirt and debris below and immediately adjacent to the robot 100, and more particularly to sweep dirt and debris into the cleaning path of the main cleaning head 120 as the robot 100 cleans in a forward direction. In some implementations, the main or edge cleaning heads 120, 130 may also be used to apply surface treatments. A front bumper 108 is secured to the chassis 102 and may contain contact sensors. The controller 140 (also depicted in FIG. 6) is carried by chassis 102 and is controlled by behavior based robotics to provide commands to the components of robot 100 based on sensor readings or directives to clean or treat floors in an autonomous fashion. A battery 109 may provide a source of power for robot 100 and its subsystems.

Figure 1B:
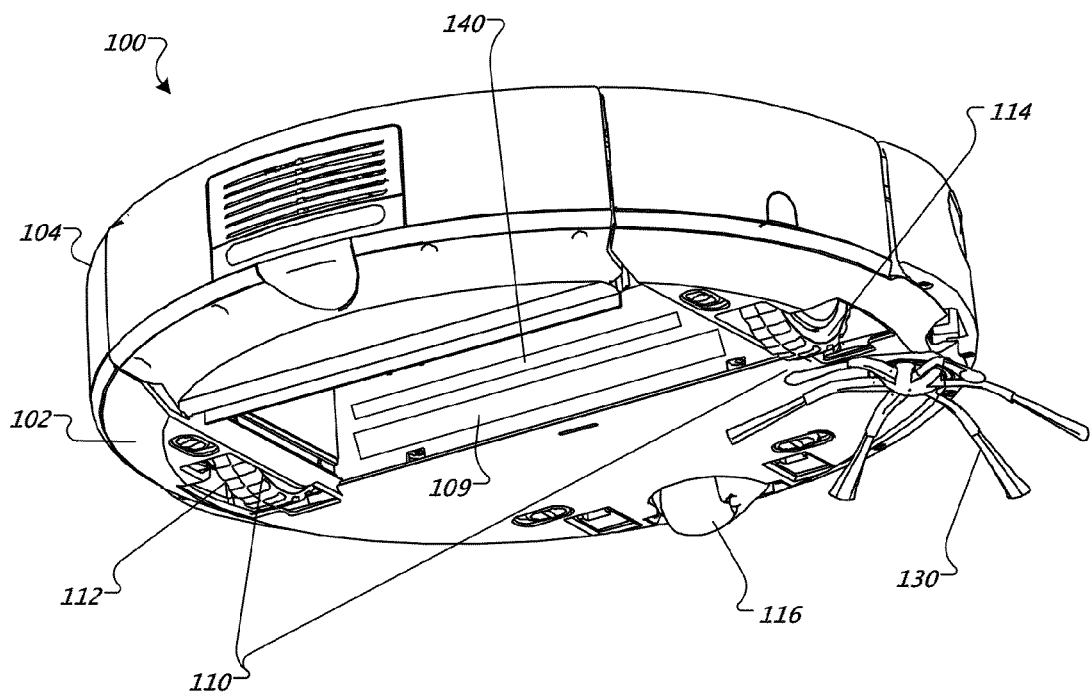
FIG. 1B is a below-perspective view of a coverage robot.

FIG. 1B is a bottom perspective view showing an example of the coverage robot 100. The drive system 110 includes a left drive wheel assembly 112, a right drive wheel assembly 114 and a caster wheel assembly 116. The drive wheel assemblies 112, 114 and the caster wheel assembly 116 are connected to the chassis 102 and provide support to the robot 100. The controller 140 may provide commands to the drive system 110 to drive wheels 112 and 114 forward or backwards to maneuver robot 100. For instance, a command may be issued by the controller 140 to engage both wheel assemblies 112, 114 in a forward direction, resulting in forward motion of robot 100. In another instance, a command may be issued for a left turn that causes the left wheel assembly 112 to be engaged in the forward direction while the right wheel assembly 114 is driven in the rear direction, resulting in the robot 100 making a clockwise turn when viewed from above.

Figure 2:
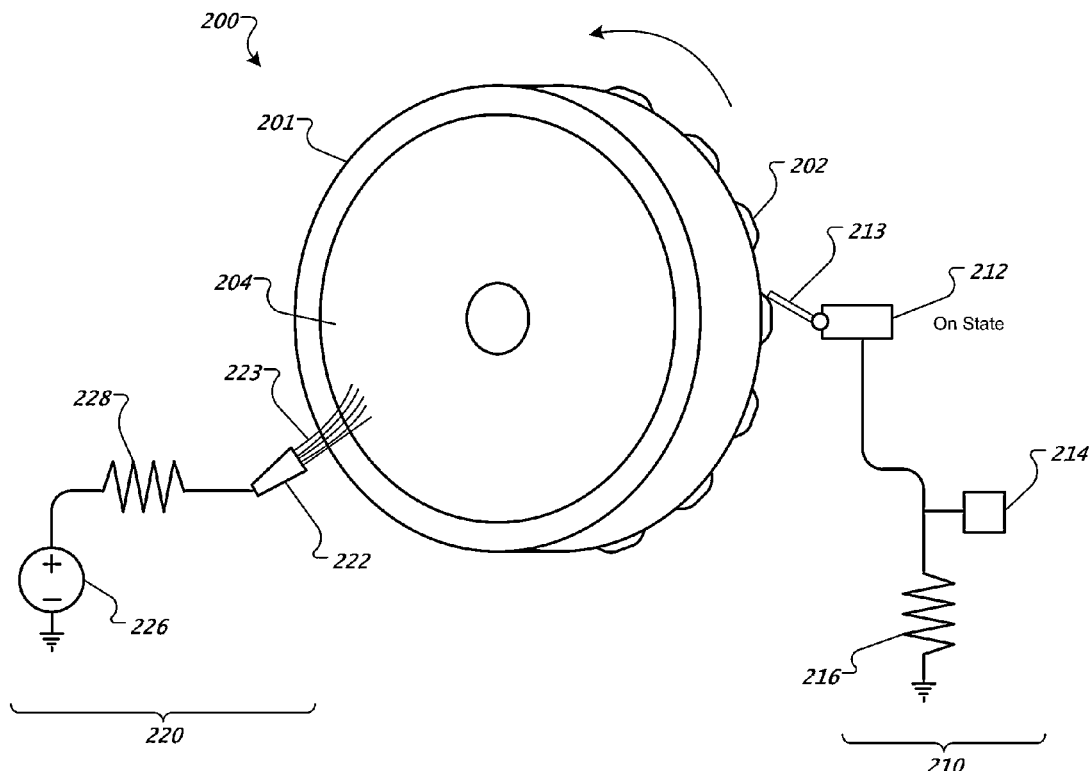
FIG. 2 is a perspective view of a wheel having cams, illustrating a cam engaging the leaf switch.

Referring to FIG. 2, in some implementations, a wheel stasis detector system 200 includes a cammed wheel 201 having cams 202 disposed about a periphery of the cammed wheel 201. The cams 202 repeatedly engage and disengage a leaf contact 213 of a leaf switch 212 of a sensor circuit 210. An electrically conducting portion 204 of the cammed wheel 201 may provided a voltage via a rotating electrical connector (e.g. a brush contact 222 which has electrically conductive contact fibers 223 that brush against a metallic surface 204 of the cammed wheel 201). A constant-voltage DC power supply 226 forms a brush circuit 220 with the conductive portion 204 and the wheel 201 in combination with a resistance 228, for example.

As the cammed wheel 201 spins during robot movement across a floor, the cams 202 repeatedly trigger the leaf switch 212. The leaf switch 212 in turn may be connected to ground through a second resistance 218 which shares a common node with the output of the leaf switch 212, for example, and to which a monitor or control circuit 214 may also be connected. As the cammed wheel 201 rotates and the leaf switch 212 is repeatedly triggered, a train of electrical pulse signals is generated, which the monitor 216 can interpret as evidence of ongoing motion of the robot 100.

Figure 3:
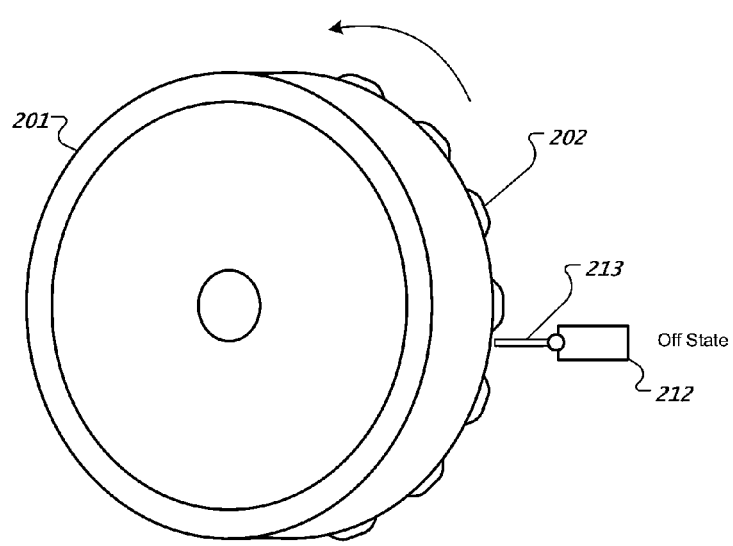
FIG. 3 is a perspective view of a wheel having cams, illustrating the leaf switch in the non-engaged state.

The arrangement shown in FIGS. 2-3 may involve complex wire routing and may encounter difficulty in placing switches in sufficient proximity to the cams 202 of the cammed wheel 201, for example. The leaf switch 212 employs a delicate leaf contact 213, which is rapidly and repeatedly physically deformed numerous times as the cammed wheel 201 spins, making it prone to wear and breakage (and may be particularly vulnerable to damage if debris contacts the leaf contact 213). The cammed wheel 201 is typically rigidly fixed in a set alignment, resisting rotation about a Z axis, thereby not contributing to directional stability of the robot 100 through swiveling. Deviation from its fixed alignment would generally removes the cams 201 from contact with the leaf contact 213 (and therefore trigger a "false positive" detection of stasis).

Figure 4:
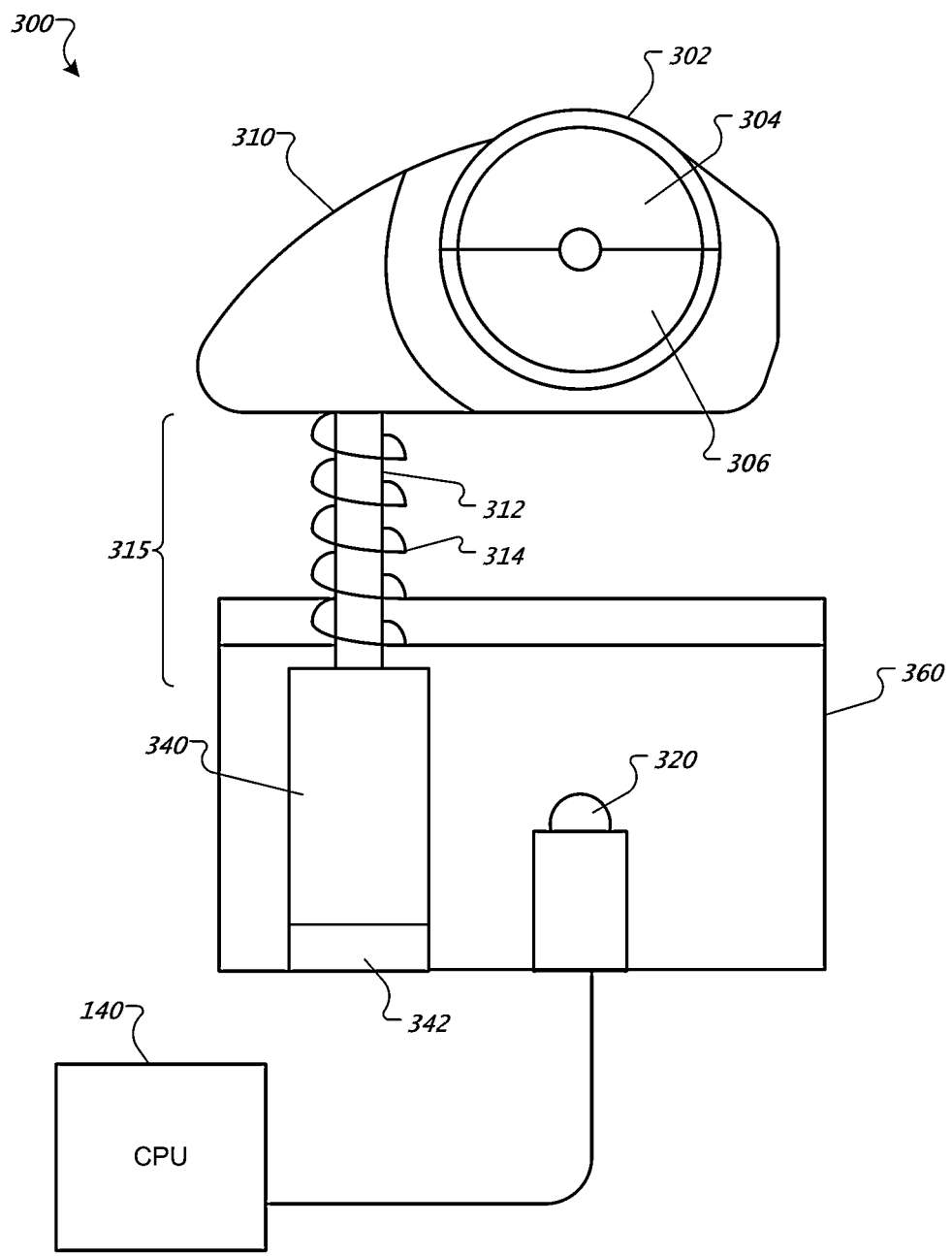
FIG. 4 is a schematic view of a caster wheel assembly with a bi-colored wheel.

FIG. 4 illustrates a caster wheel assembly 300 including a stasis indication wheel 302, which may be a load-bearing wheel for supporting the weight of the robot 100; or, alternatively, the stasis wheel 302 may be a trailing or non-load-bearing wheel. The assembly shown in FIG. 4 is "upside-down," i.e., the wheel 302 would ordinarily be suspended from the caster frame 360 (held within or integral with the robot 100 body or chassis 102. The stasis indicating wheel 302 is rotatably coupled to a wheel housing 310 and may spin freely in response to frictional contact with a surface or floor during robot movement. The stasis wheel 302 includes at least one lightly colored (or reflective) section 304 and at least one darkly colored (or non-reflective) section 306. The wheel housing 310 is supported by a suspension 315. The suspension 315 may be any device from which a mechanical part is suspended (in this context, the mechanical parts including a wheel on the underside or undercarriage of a robot 100), that optionally permits one additional degree of freedom (rotational or translational, "additional" meaning in addition to driving or driven rotation of the wheel for movement along a surface) for the robot 100 and/or for the suspended part; and/or a system of springs and/or other devices that transmits, attenuates, or cushions vibration or shock between a vehicle and its wheels. In the present case, the suspension 315 can permit one additional degree of freedom in the form of steering rotation of the wheel 302 about the Z-axis (with the wheel 302 rotating in a driven or driving rotation about an arbitrary X-axis) without having any cushioning function, but may also have a cushioning function (damped or resilient translation along z axis) or wheel drop functions (translation biased down along z axis) or additional degrees of freedom as described herein. In some implementations, the suspension includes a shaft/spindle 312 carrying a spring 314. The shaft 312 is rotatably and slidably connected to a wheel mount 340 secured to the robot chassis 102. The shaft 312 can rotate about and slide along its longitudinal axis. The spring 314 biases the wheel 302 and wheel housing 310 away from the chassis 102. A wheel drop sensor 342 carried by the wheel mount 340 (as shown) or arranged near the wheel to detect vertical wheel displacement. Examples of the wheel drop sensor 342 include a switch activated by the shaft 314 and/or an infrared emitter and detector pair arranged to detect vertical wheel displacement (which may be the optical sensor 320, if the field of view and emission of the sensor 320 are arranged to terminate in a manner that prevents signal returns, e.g., if the wheel 302 has a light section 304 and dark section 306 darker than the light section 304 and providing contrast therewith, yet the absence of a dropped wheel 302 from the field of view and/or emission of the optical sensor 320 appears with an even lower IR reflection than the dark section 306—i.e., three decreasing levels of reflectivity—a first level from the light section 304, a lower second level from the dark section 306, and a yet lower third level, including a null level, from the absence of a dropped wheel 302). The robot 100 includes an optical sensor 320 having a field of vision (i.e. a field of view if the optical sensor 320 depends on ambient light; or both a field of view and field of emission if the optical sensor 320 includes an illuminating emitter) trained on the stasis wheel 302. The optical sensor 320 detects a contrast transition or a transition from the light section 304 to the dark section 306 (or vice versa) within the field of vision of the optical sensor 320. When the optical sensor 320 detects such a transition, a signal is transmitted to the controller 140, which can perform an appropriate analysis on the received data. Alternatively, the controller 140 itself can interpret the time-dependent signal from the optical sensor 320 and perceive either contrast transition or discrete level changes.

In some examples, the controller 140 calculates the number of transitions detected by the optical sensor 320 during a period of time and determines based on pre-set or dynamically calculated parameters whether or not the robot 100 is moving (and/or a robot speed). When no transitions are detected, the controller 140 concludes that the robot 100 has ceased moving relative to the floor. If the diameter of the stasis wheel 302 is fixed and known to the controller 140, the controller 140 may calculate a distance traversed by the robot 100 by multiplying the number of transitions detected by the wheel diameter and a transformation constant (similarly, the robot speed may be calculated by dividing a particular period of time by the distance calculated for that period of time).

Referring to FIG. 5, in some implementations, the stasis wheel 302 is connected to an axle or axle arm 330, about which the wheel 302 can spin (e.g. one suspension discussed herein). The axle arm 330 may include a portion for mounting to the chassis 102 of the robot 100. In one example, the axle arm 330 includes an upper cap 332 and lower cap 334 for holding the axle arm 330 to the wheel mount 340.

FIG. 6 provides a schematic view of the robot 100 including the caster wheel assembly 300 mounted near the front of the robot 100. The stasis wheel 302 serves as a swiveling caster wheel positioned under the front portion of the robot 100. By mounting the stasis wheel 302 to the robot 100 as a caster, the directional and/or steering stability of the mobile robot 100 may be enhanced. The stasis wheel 302 (also referred to hereinafter as a "bi-colored wheel") may be a non-powered follower wheel, which can spin freely as the robot 100 is propelled by the drive system 110, which may be separate from the caster wheel assembly 300.

In some implementations, the caster wheel assembly 300 includes a motor to drive the stasis wheel 302, for example, when the weight of the robot 100 generates sufficient frictional force with surface being traversed that the wheel 302 cannot spin if the robot 100 is not actually moving, even when the wheel 302 is being actively powered by a motor or other drive system.

The transitions between the light section 304 and the dark section 306 of the wheel 302 can be detected by the optical sensor 320 despite swiveling of the wheel 302. Therefore, the wheel 302 may serve both as an enhanced load-bearing wheel of the robot 100 and simultaneously as part of the motion, speed, or stasis detection system 300 of the robot 100.

In some implementations, the optical sensor 320 includes a laser-based or mouse-like optical camera (which may have a resolution of about 100 pixels, for example) in which the focal length of the camera is selected to span from substantially ground level to the camera, with a depth of field within the a limited range of travel or the full range the robot suspension (e.g., 1-2 cm). The field of vision of the optical sensor 320 may include both the bi-colored wheel 302 and a portion of the ground over which the robot 100 traverses. Output from the optical sensor 320 may be used by the robot controller 140 to determine the rate at which the wheel 302 is rotating (e.g. by counting the number of black/white transitions within a particular period of time) and also track actual movement of the robot 100 with respect to the cleaning surface by analyzing and reckoning a rate and/or direction of travel based on the image of the ground recorded by the optical sensor 320. The robot 100 can therefore compare wheel movement to actual surface-relative movement and detect whether the wheel 302 has lost effective contact with the surface (e.g. when the robot 100 determines a discrepancy between the actual rate of travel and a wheel speed).

FIG. 7 illustrates the stasis wheel 302 swiveling and a field of vision of the optical sensor 320. The optical sensor 320 has a field of vision which extends over a wide area, allowing the optical sensor 320 to detect transitions as the stasis wheel 302 spins even while swiveling about a Z-axis (i.e., the vertical axis orthogonal to the plane of the floor or surface to be swept) across a wide angular range. The permissible range of swivel for the stasis wheel 302 can be set as wide as the field of vision of the optical sensor 320 can detect. Alternatively, for example, two or more optical sensors 320 may be positioned at different angles surrounding the range of swivel of the stasis wheel 302, such that the colored portions 304, 306 of the stasis wheel 302 are within the useful field of vision of at least one of the optical sensors 320, permitting a swivel range as wide as 360 degrees.

Figures 8, 9:
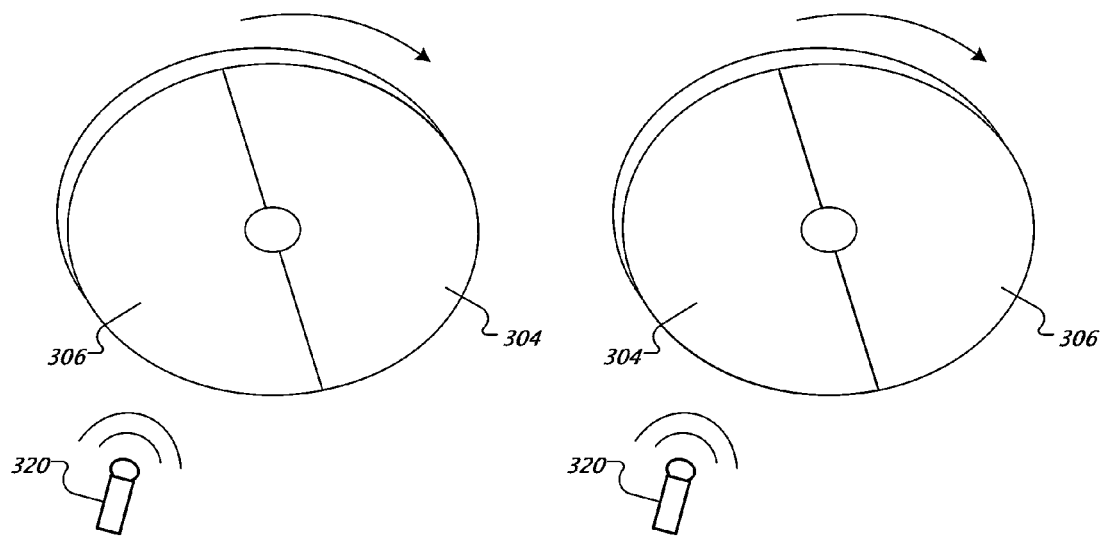
FIG. 8 is an oblique view of a bi-colored wheel and optical sensor, with the optical sensor facing a darkened portion of the bi-colored wheel.
FIG. 9 is an oblique view of a bi-colored wheel and optical sensor, with the optical sensor facing a lightened portion of the bi-colored wheel.

Referring to FIGS. 8-9, when the stasis wheel 302 spins so as to transition from the dark section 306 to the light section 304 within the field of vision of the optical sensor 320, an output signal sent from the optical sensor 850 may transition from a first voltage level to a second voltage level. An edge transition between the first and second voltage states may be detected by the controller 140; or, as an alternative, the optical sensor 320 may perform the edge detection and only output a pulse signal to the controller 140 when the transition is detected. Although FIGS. 8-9 show a solid-circle stasis indicating wheel 302, the term "wheel" includes spoked, perforated, armed, pinwheel, or other wheels as discussed herein.

Figures 10, 11:
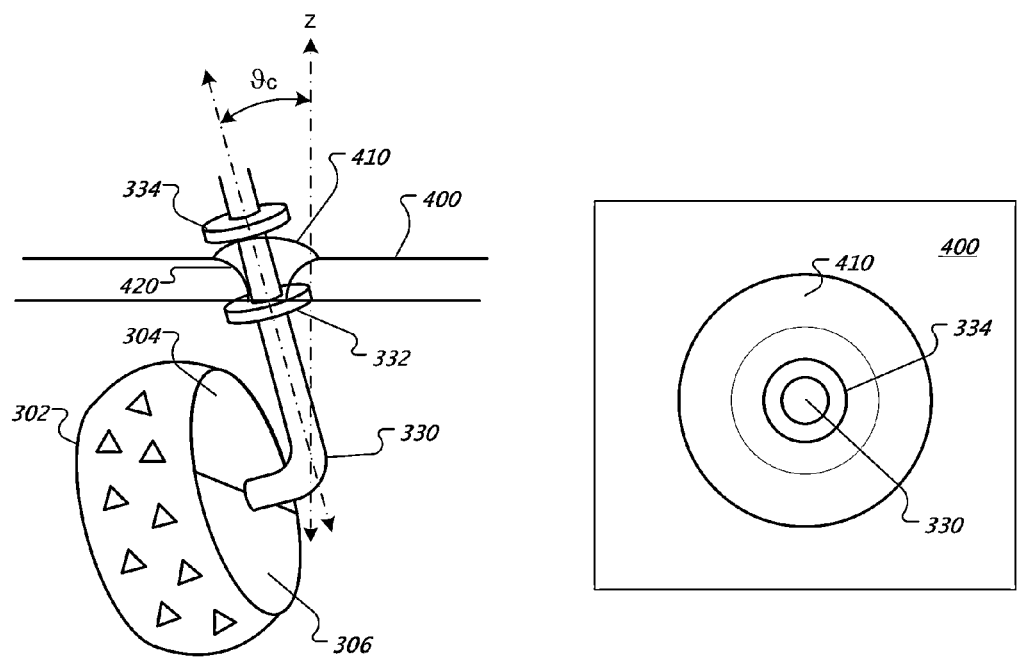
FIG. 10 is a schematic perspective view of an axle arm assembly for mounting a wheel retained by an axle arm base.
FIG. 11 is a top view of an axle arm base.
Figure 12A:
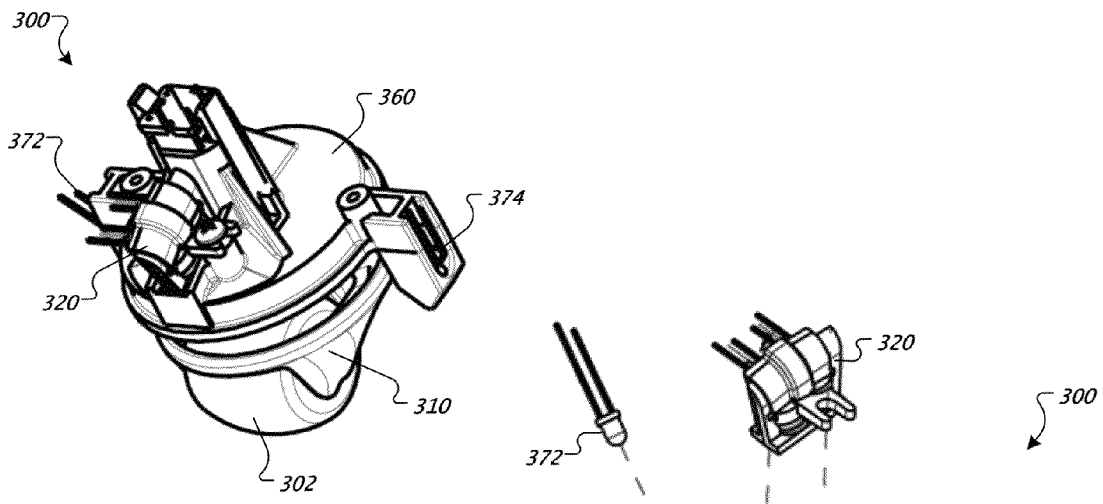
FIG. 12A is a perspective view of a caster wheel assembly having an optical stasis detection system.
Figure 12B:
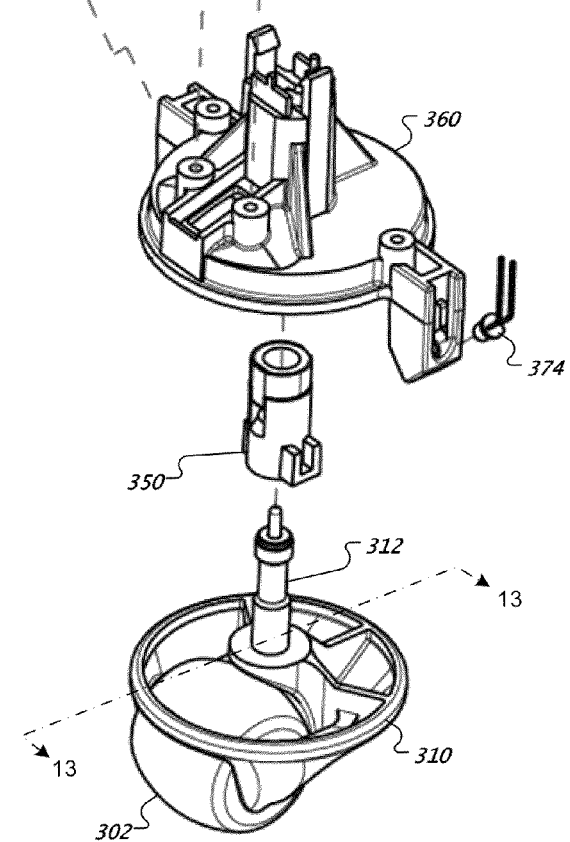
FIG. 12B is an exploded view of a caster wheel assembly having an optical stasis detection system.

Referring to FIGS. 10-11, in some implementations, the wheel 302 is mounted to an axle arm base 400 via the axle arm 330. The axle arm base 400 is secured to the chassis 102 and includes a rounded hub 410 (and, in some examples, a corresponding bottom hub (not shown)) over which the top cap 334 of the axle arm 330 is placed. A concavity 420 (shown to have a generally parabolic profile) defined by the hub 410 allows the axle arm 330 to swing/tilt in relation to the axle arm base 400. The tiltable axle arm 330 can affect a castered orientation (i.e., tilted or deviating from the vertical Z-axis by an angle θc) relative to the axle arm base 400. The stasis wheel assembly 300 provides stability to the robot 100 by virtue of having a caster wheel 302 that swivels and tilts, allowing the wheel 302 to trail the front of the moving robot 100. A second hub (not shown), inverted relative to the hub 410 on the top side of the base 400, may also be positioned on the bottom side of the base 400 and interact with the lower cap 332 to provide a similar effect.

Referring to FIGS. 12A-13B, in some implementations, the caster wheel assembly 300 includes a bi-colored wheel 302 mounted to a caster hub 350, which in turn is mounted to a caster frame 360. The stasis wheel 302 is rotatably coupled to a wheel housing 310 and may spin freely in response to frictional contact with a floor surface during robot movement. The wheel housing 310 may have a rounded shape (e.g. a half-teardrop shape), permitting it to slide over obstacles. The wheel housing 310 defines a wheel cavity 311 which houses the bi-colored wheel 302. The stasis wheel 302 includes at least one lightly colored section 304 and at least one darkly colored section 306. The wheel housing 310 is supported by a shaft/spindle 312 carrying a spring 314. The shaft 312 is rotatably and slidably connected to a wheel mount 340 secured to the robot chassis 102. The shaft 312 can rotate about and slide along its longitudinal axis in the caster hub 350, allowing the wheel 302 to swivel freely and be displaced in the vertical direction. When the stasis wheel 302 is positioned in the wheel housing 310, a locking piece (or any other suitable retaining structure) may secure the stasis wheel 302 for rotation in the wheel housing 310.

As shown, the wheel housing 310 defines a leading rounded ramp or slope that intersects the surface of the stasis wheel 302 at less than an angle of 45 degrees from a tangent to the stasis wheel 302 at a point of intersection. Specifically, in the direction of forward travel, a leading slope or ramp of the housing, extending from a point lower than the center axis of the wheel 302 to approximately the full wheel height readily seen in FIGS. 13A-13B as a gentle slope 20-40 degrees from horizontal (including curved slopes that transition from to a steeper slope from bottom to top), encounters obstacles before the wheel 302 and may overcome them, including obstacles of higher than ½ the wheel height. Alternatively, any suitable profile and corresponding wheel cavity 311 may be used. The wheel housing 310 may be substantially opaque to prevent external light from illuminating a sampling portion 303 of the stasis wheel 302 exposed outside the wheel housing 310 and facing the optical sensor 320.

In some examples, the caster frame 360 is configured to allow the received caster hub 350 to tilt away from a vertical position within the caster frame 360. A hub spring may bias the caster hub 350 to a neutral vertical position. The spring 314 on the shaft 312 compresses when the stasis wheel 302 bears the weight of the robot 100, thereby pressing the wheel housing 310 toward the caster frame 360. If the wheel housing 310 abuts the caster frame 360 under the weight of the robot 100, the wheel housing 310 (and therefore also the wheel 302) can still swivel about the longitudinal axis 313 defined by the shaft/spindle 312.

If the robot 100 encounters a cliff or overhang (or steep grade) in the surface it is traversing, the stasis wheel 302 may drop and eventually lose contact with the surface. When such a situation occurs, the spring 314, normally partially compressed by the weight of the robot 100 above, urges the wheel housing 310 and wheel 302 away from the caster frame 360. A wheel- or hub-distance sensor (e.g. a mechanical switch or a break-beam sensor) may then signal to the controller 140 that the robot 100 has encountered a drop-off and trigger an appropriate behavioral reaction, such as causing the robot 100 to attempt to back up, for example. In some examples, the caster frame 360 houses a cliff sensor 370 including an infrared emitter 372 and corresponding detector 374. The cliff sensor pair 370 is arranged to sense a surface presence adjacent the stasis wheel 302. The cliff sensor pair 370 detects an encountered cliff, steep down grade, or some other edge when infrared light emitted by the emitter 372 is no longer reflected off a ground surface back to the detector 374. The cliff sensor pair 370 may also be configured to detect vertical wheel movement.

Figure 13B:
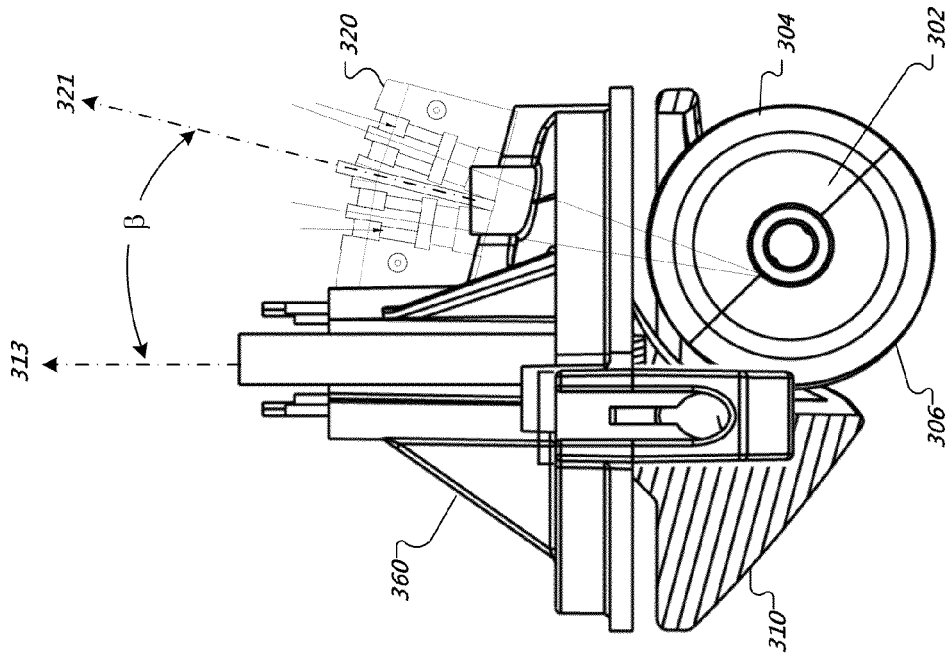
FIG. 13B is a side view of the caster wheel and an optical stasis sensor assembly.
Figure 13A:
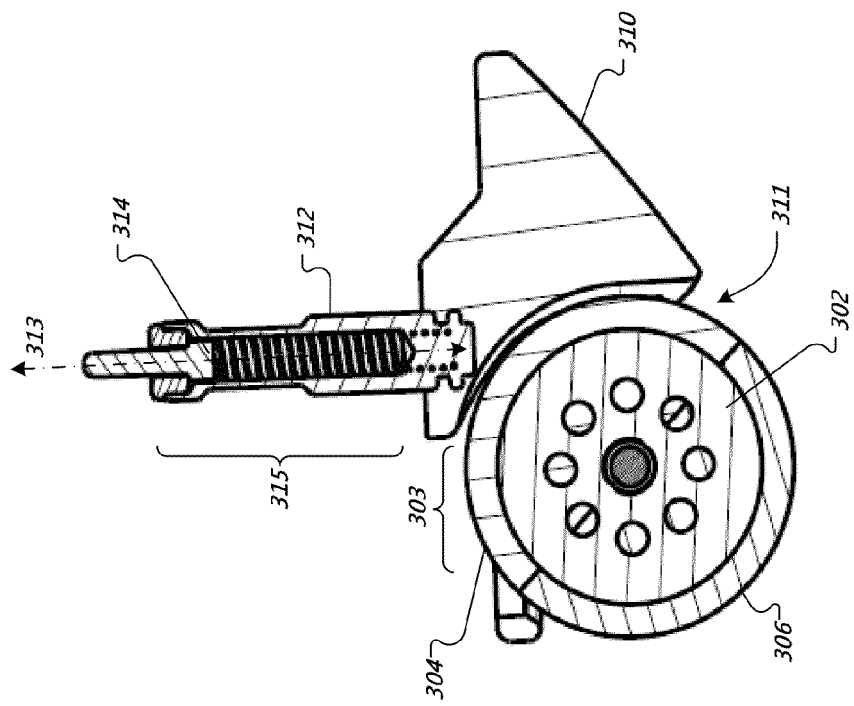
FIG. 13A is a section view of the caster wheel of FIG. 12, view along line 13-13.

As shown in FIGS. 13A-13B, light provided by the optical sensor 320 strikes the sampling portion 303 of the wheel 302, thereby reducing undesirable interference or false signals from external light sources and increasing the reliability of the optical sensor 320 in detecting transitions between the light area 304 and the dark area 306 as the wheel 302 spins. The optical sensor 320 sensor is attached to the caster frame 360 at an angle β of about 10-40 degrees between longitudinal axis 321 defined by a sensor housing 326 of the sensor 320 and a longitudinal axis 313 defined by the shaft/spindle 312, allowing the emitter to 322 to be positioned forward or behind of the yaw/z axis of the caster wheel 302 and/or forward or behind the wheel 302 itself, yet direct a field of view and emission substantially at top dead center of the wheel 302 to emit a signal (e.g. infrared light) onto the sampling portion 303 of the stasis wheel 302 and receive a reflection therefrom. If the wheel 302 is configured to as a compliant suspension with a full range of loaded travel below 1 cm and above ⅕ cm, and/or additionally or alternatively configured to unloaded, drop a predetermined distance (e.g. about 1 to 2 cm for detecting cliff edges), emissions from the emitter 322 are still incident on the sampling portion 303 and reflected emissions are still received by the receiver 324 over the range of ordinary suspension travel and/or in some cases when the wheel 302 has dropped.

Figure 14A:
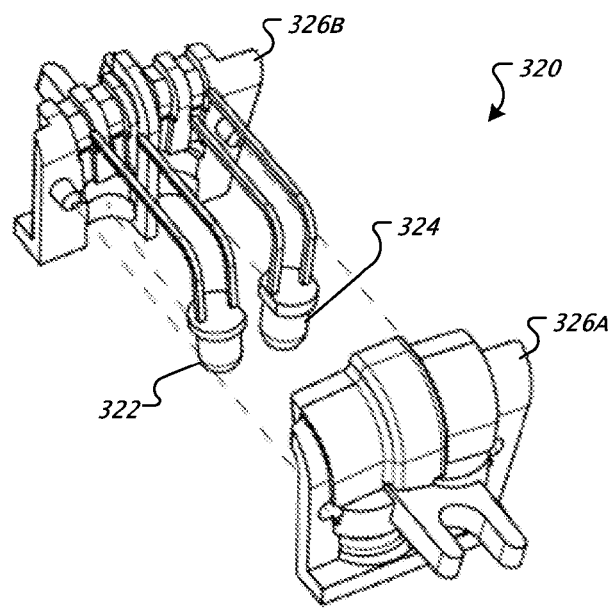
FIG. 14A is an exploded perspective view of an optical stasis sensor assembly.
Figure 14B:
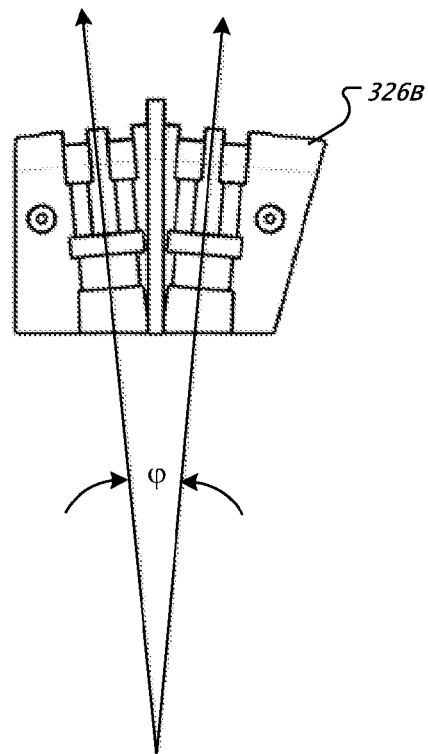
FIG. 14B is a front view of a back housing of an optical stasis sensor assembly.

Referring to FIGS. 13B and 14A-14B, in some implementations, the optical sensor 320 includes a housing 326 having front and back portions, 326A and 326B respectively, configured to house a light source 322 that emits light and an optical receiver 324 that detects light emitted by the light source 322 and reflected by the light area 304 of the wheel 302. The housings 326A and 326 are preferably opaque to light.

The receiver 324 is positioned to precede the emitter 322 in the direction of travel, and as shown in FIG. 13B is directed toward a field of view encompassing top dead center of the wheel 302, in a direction less than 15 degrees from perpendicular to the wheel 302 tangent at that position. The front and back portions, 326A and 326B respectively (in this context not "front" and "back" in the direction of robot travel), of the sensor housing 326 are configured to hold the emitter 322 and receiver 324 angled with respect to each other at an angle φ of about 10+/−5 degrees, preferably about 10 degrees. The emission path of the emitter 322 and the receiving path of the receiver 324 meet in a field of view/overlap zone about 1-4 cm, preferably about 1 cm from the emitter 322 and/or receiver 324. The view/overlap zone encompasses the region of the wheel 302 top dead center surface when the robot 100 is on the floor, and this zone is sized (i.e., depth of effective detection) to be about at least ½ to 2 times, the loaded ordinary suspension travel of the caster wheel 302 (e.g., loaded travel being about ⅕ to 1 cm, preferably less than 2 cm) and vertically centered in an idle loaded position. Within the ordinary range of vertical wheel travel and/or when a wheel drop occurs, the wheel 302 remains in the view/overlap zone for stasis detection. If stasis detection is to be performed for a dropped or nearly dropped wheel but there is little or no ordinary suspension travel (e.g., for a vertically fixed caster), the zone depth may be ½ to 2 times the maximum wheel drop amount, vertically centered in the middle of the drop range. The principle of operation with respect to reflectivity detection, noise rejection, field of view and emission may be that disclosed in U.S. Pat. No. 7,155,308, herein incorporated by reference in its entirety.

The dark area 306 of the wheel 302 absorbs the light when facing the optical sensor 320, thereby preventing light from reflecting back to the optical sensor 320. The caster frame 360 is configured to permits the light from the light source 322 to reflect off of the light area 304 of the wheel 302 and be detected by the optical receiver 324 over a range of swivel angles of the wheel 302. The optical receiver 324 may be aimed or positioned so as to face a side-face of the wheel 302 (that is, facing either of the two broad circular sides of the wheel 302), or to face the wheel 302 edge-on (that is, facing the narrow area of the outer edge of the wheel 302 without either broad side of the wheel 302 being within the "field of vision" of the optical receiver 324, for example). As another alternative, the optical receiver 324 may be obliquely aimed toward the wheel 302.

In some examples, the optical sensor 320 may function to detect transitions between the light area 304 and the dark area 306 of the wheel 302 as the wheel 302 spins, even over a range of 40 degrees of hub swivel away from a straight wheel alignment (i.e., when the robot is moving forward without turning), by keeping the wheel 302 within the effective line of sight the optical sensor 320. The wheel housing 310 can prevent outside light from reflecting off the wheel 302 and reaching the optical receiver 324, improving the reliability of the optical receiver 324.

Figure 15:
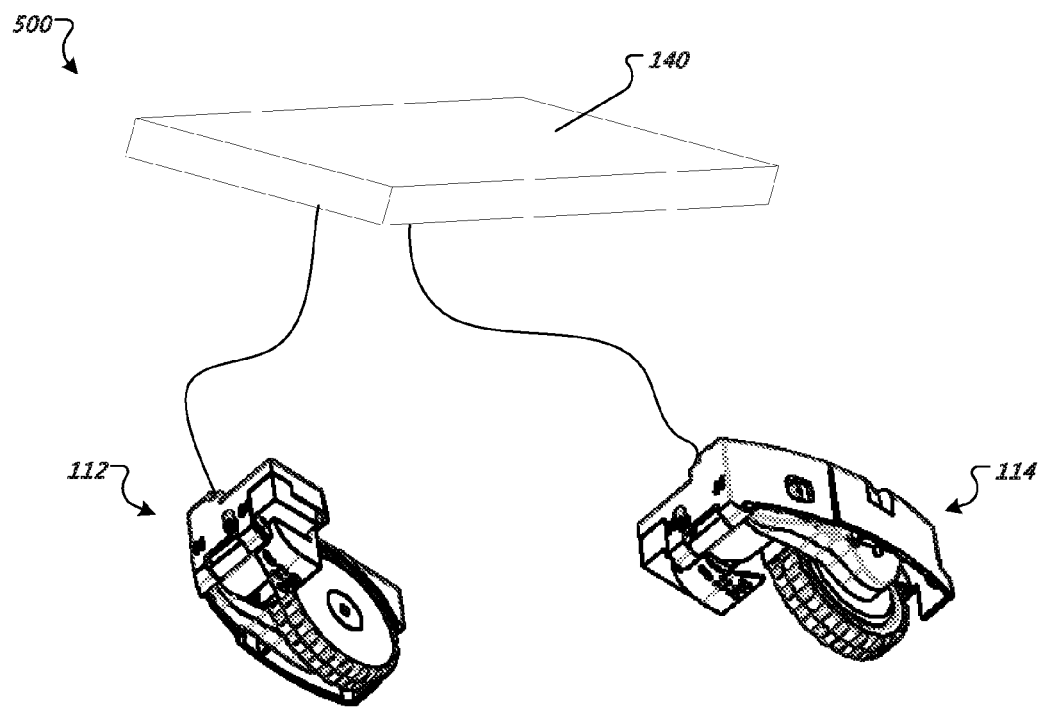
FIG. 15 is a schematic view of a drive motor current stasis detection system.
Figure 16:
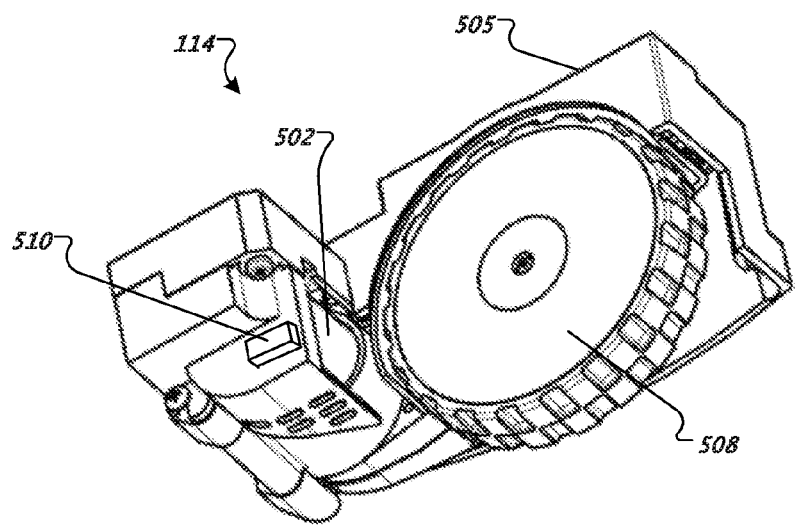
FIG. 16 is a perspective view of a drive wheel assembly.

Referring to FIGS. 15-16, a transition algorithm may be employed by the controller 140 to transition from a first stasis detection system to a second stasis detection system, when the efficacy of the first stasis detection system degrades below a threshold level. In some examples, the robot 100 is equipped with a first stasis detection system 300, as described above, having a bi-colored swiveling caster wheel 302 with light sections 304 and dark sections 306, in which an optical sensor 320 detects transitions from the light section 304 to the dark section 306 (and vice versa) as the bi-colored wheel 302 spins. In addition, the robot 100 includes a second stasis detection system 500 for detecting motion, speed, or stasis of the robot 100. The second stasis detection system 500 includes a drive motor current sensor 510 which monitors the current (herein the "drive current") drawn by a drive motor 502 that turns one or more drive wheels 508 for propelling the robot 100. The drive motor current sensor 510 and the drive motor 502 are both carried by a drive wheel assembly housing 505. When the drive current is higher than a threshold value, the second stasis detection system 500 determines that the robot 100 is in a stasis condition (e.g. a condition typically occurring when the drive wheels are spinning, but the robot 100 is not moving because it is blocked by an obstacle, or mired in some other way). By monitoring the contrast between the detection of the light and dark sections, 304 and 306 respectively, of the bi-colored wheel 302, the optical sensor 320 can output a signal to the controller 140 indicating that the bi-colored wheel 302 has become too dirty or obscured to be useful in motion, speed, or stasis detection, for example.

The robot controller 140 may use an algorithm to transition from the first stasis detection system 300 (the bi-colored wheel 302 and optical sensor 320) as the primary sensor used for motion, speed, or stasis detection to the second stasis detection system 500 (the drive current sensor 510). The transition may be unitary (i.e., switching entirely and immediately), or it may be gradual in degree and/or time (e.g. by applying a confidence coefficient for the first stasis detection systems 300 and/or the second stasis detection system 500). The robot controller 140 may evaluate the inputs from both stasis detection systems 300, 500 simultaneously, integrating the evaluated inputs according to an integration equation, in accordance with the nature of the first and second stasis detection systems.

Figure 17:
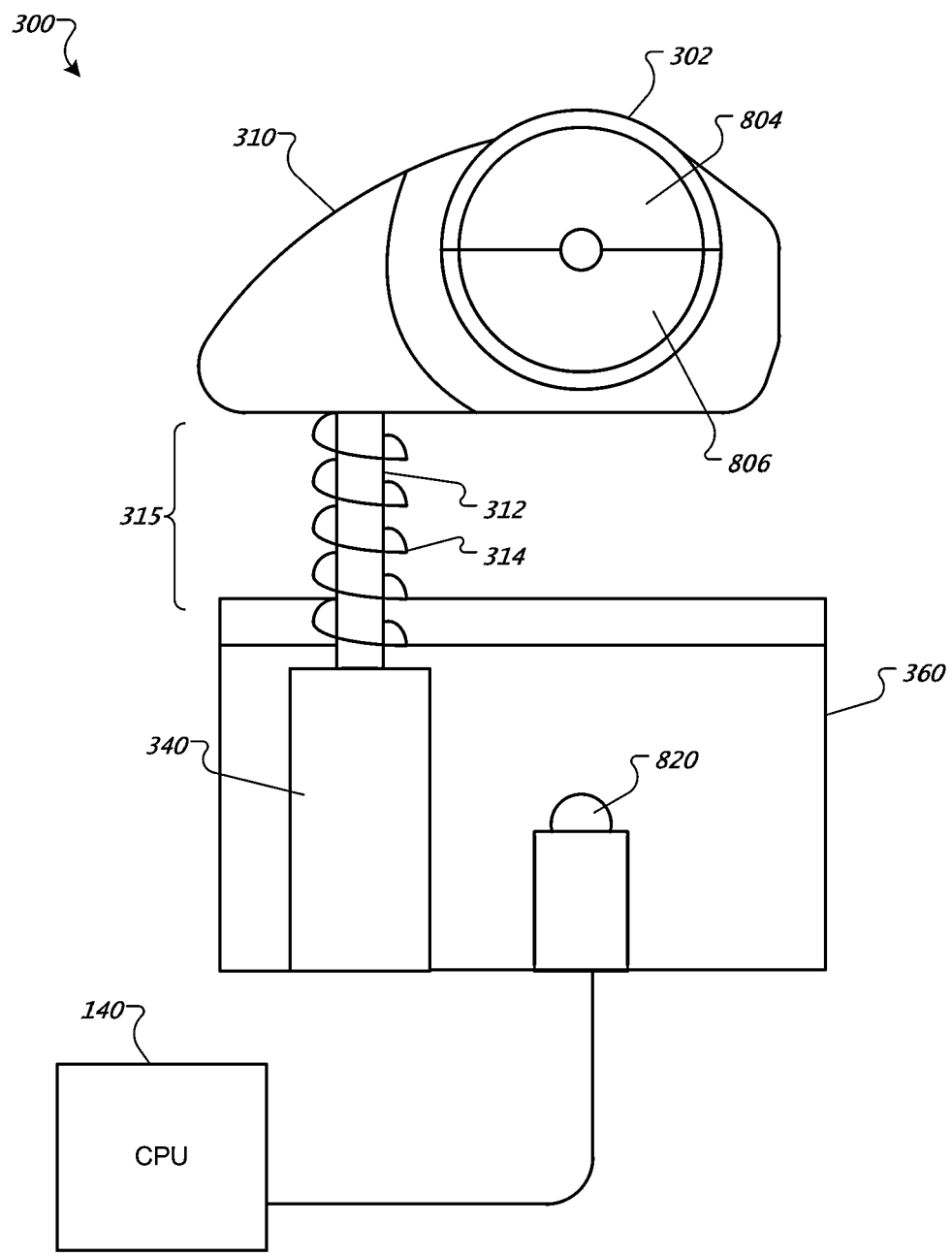
FIG. 17 is a schematic view of a magnet/electrically biased wheel stasis detection system.

Referring to FIG. 17, in some implementations, the wheel 302 includes a magnetic marking 804 on one half, the other half 806 being not magnetized. A reed switch, or Hall effect detector 820 detects the proximity of the magnetized half 804 of the wheel 302 as the wheel 302 rotates, in a manner generally similar to the optical detector 320 discussed above. As an alternative, the magnetized portion 804 of the wheel 302 may cover less than one half of the wheel 302. The magnetic marking 804 may include a small dot of magnetized resin covering a 1 cm area positioned toward the edge of the wheel 302. In another example, the wheel 302 includes an electrode portion 804 positioned on the wheel 302, in which an electrical charge is applied to the electrode 804 when the robot 100 is in operation. In this configuration, a detector 820 (e.g. an inductive, capacitive electrical detector) is positioned such that the charged electrode 804 on the wheel 302 passes by the detector 820, generating a signal received by the controller 140.

Figure 18A:
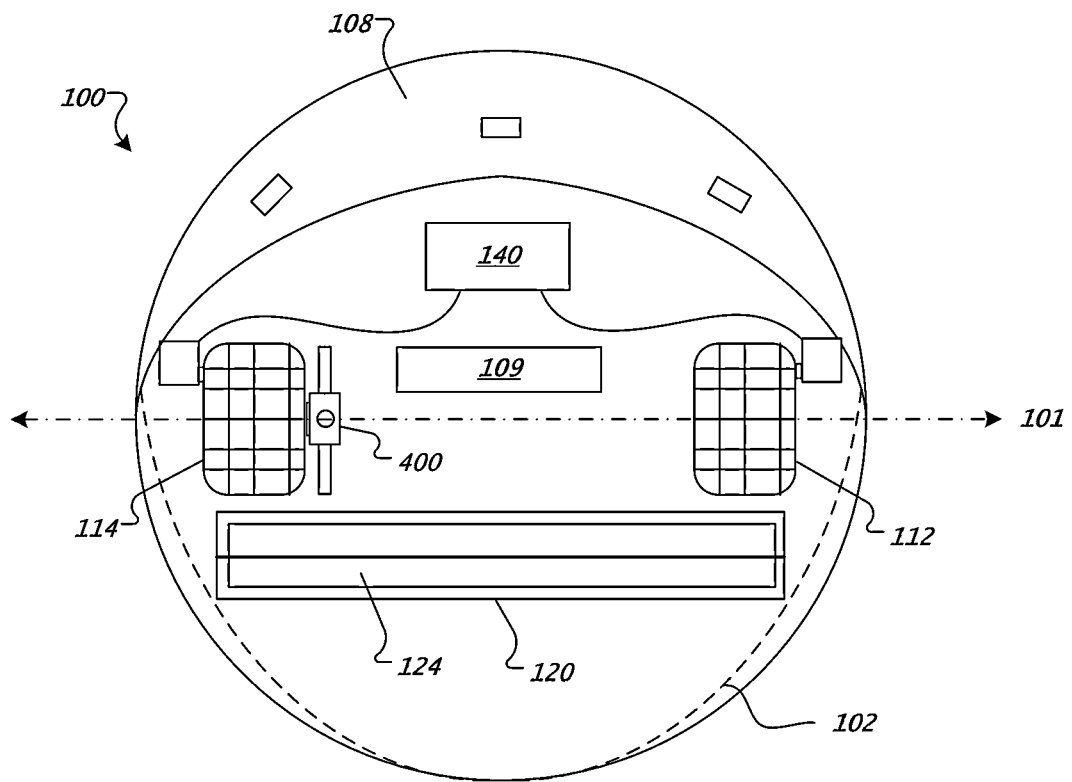
FIG. 18A-18B are bottom schematic views of robots incorporating a stasis indicator wheel assembly.
Figure 19A:
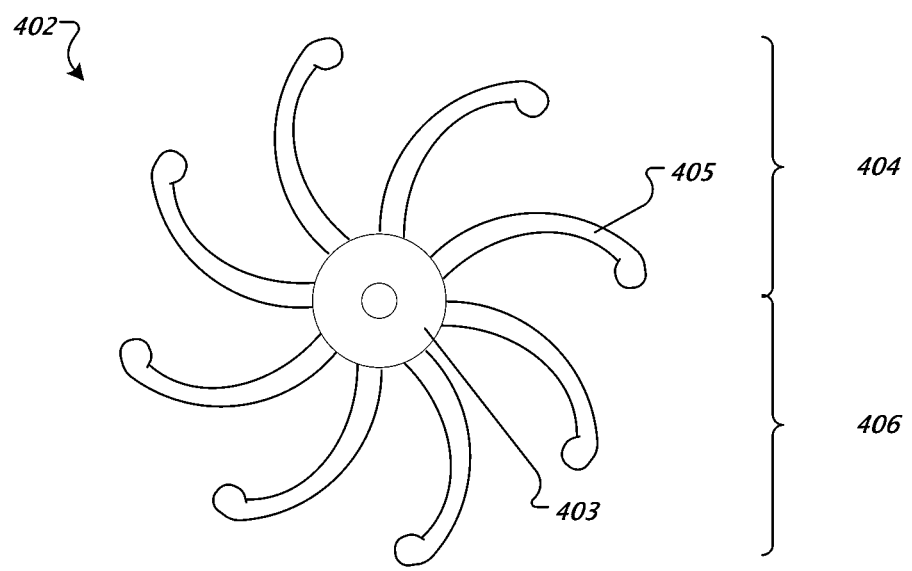
FIG. 19A-19B are perspective views of stasis indicator wheels.

Referring to FIGS. 18A-20, in some implementations, the robot 100 includes a stasis indicator assembly 400 including a stasis indication wheel 402. FIG. 18A-18B are bottom schematic views of robots 100 incorporating a stasis indicator wheel assembly 400. FIG. 19A-19B are perspective views of stasis indicator wheels 402. The stasis indication wheel 402 may be a load-bearing wheel for supporting the weight of the robot 100; or, alternatively, the wheel 402 may be a non-load-bearing wheel. The stasis indication wheel 402 includes a rotatably hub 403 and spokes/arms 405 extending outwardly from the hub 403. In some examples, the spokes 405 spiral outward from the hub 403. The spokes 405 may be compliant in order to generate enough traction to turn the wheel 402 but not take away from traction of a driven wheel 113 of the drive wheel assembly 112, 114. The wheel 402 is rotatably coupled to a wheel housing 410 and may spin freely in response to frictional contact with a surface or floor during robot movement. The wheel 402 includes at least one lightly colored (or reflective) section 404 and at least one darkly colored (or non-reflective) section 406. In some implementations, the wheel 402 defines a pinwheel shape and is formed as a half (or quarters, or eighths, or per spoke) reflective solid, from compliant rubber or the like, and is snapped past a rim and onto a stationary axle of the wheel housing 410 with a loose slip fit, to rotate freely on the axle. The spokes 405 are spirals or helixes ending in an inwardly pointing distal elbow tip at about 90%, which limits the compliance/travel range of the spokes 405 (more rigid materials would use longer distal elbow portions). A spring effect/constant of each spokes 405 is cumulative when one spoke elbow abuts the next spoke 405. In order to bend further, both spokes 405 must bend against increasing resistance. This effect is limited to two or three successive spokes 405. Most of the spoke bending of takes place in the middle.

Figure 18B:
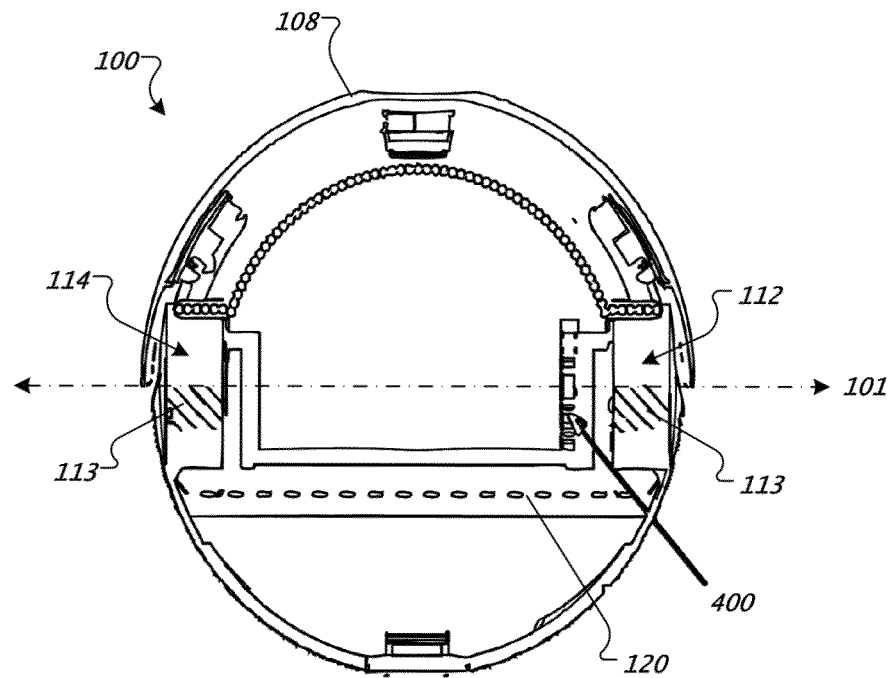
Figure 19B:
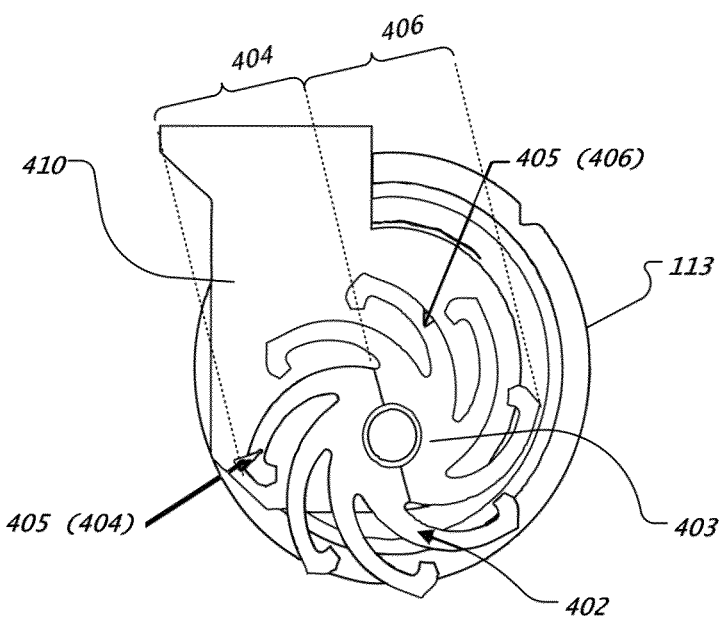

The robot 100 shown in FIG. 18B includes only two driven wheels 113, lacks a trailing or leading caster, and uses a cleaning head 120 as a third point of contact for stable mobility. The robot 100 includes an optical odometer/stasis "pinwheel" 400 substantially aligned with and adjacent one of the two differential driven wheels 113, all on a center axis 101 defined by the robot 100. This configuration may be used with robots lacking a leading and/or trailing caster (because there is no caster to monitor for stasis) or with a leading and/or trailing caster (in order to avoid adding instrumentation to the caster).

Figure 20:
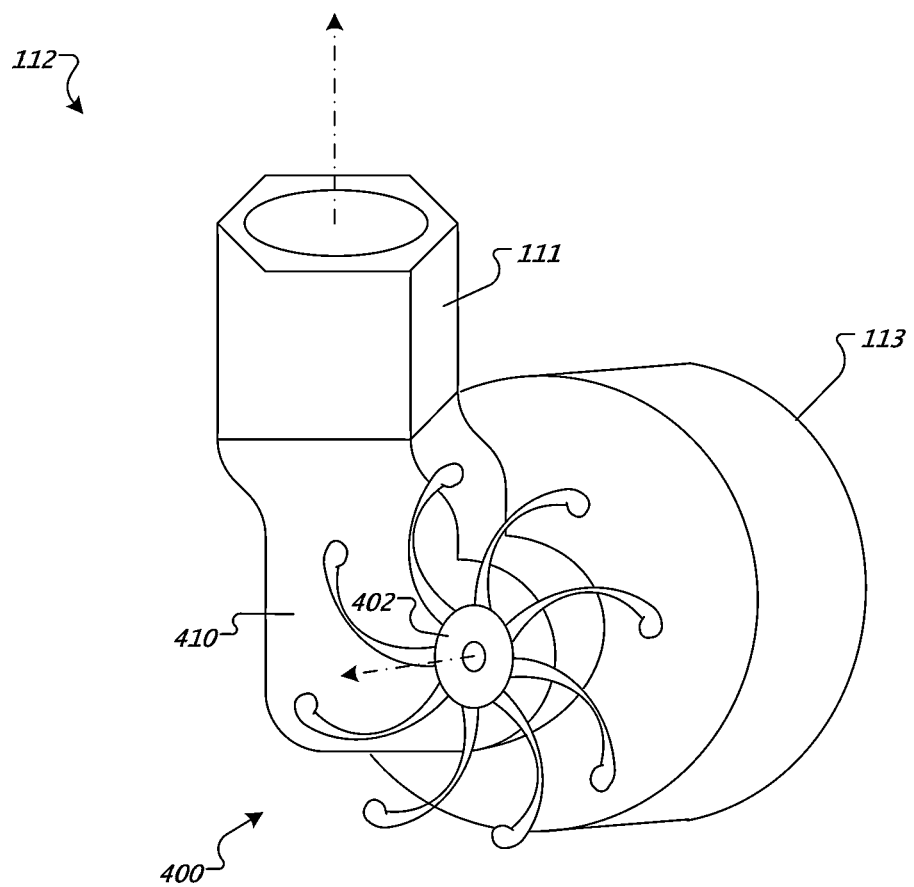
FIG. 20 is a perspective view of a stasis indicator wheel assembly and a drive wheel assembly.

In some implementations, the wheel 402 and associated wheel housing 410 are disposed adjacent one of the left and right drive wheel assemblies, 112 and 114 respectively. In one example, the wheel housing 410 may supported by a suspension 315. The suspension may include a shaft/spindle 312 carrying a spring 314. The shaft 312 is rotatably and slidably connected to a wheel mount 340 secured to the robot chassis 102. The shaft 312 can rotate about and slide along its longitudinal axis. The spring 314 biases the wheel 402 and wheel housing 410 away from the chassis 102. In another example, as shown in FIG. 20, the wheel housing 410 is integral with a housing 111 of the drive wheel assembly 112, 114 and the stasis indication wheel 402 moves in unison with the driven wheel 113 of the drive wheel assembly 112, 114, which may include a suspension. Having the wheel 402 coupled to each driven wheel 113 of both drive wheel assemblies 112, 114 allows software on the controller 140 to compensate for wheel slippage and provide traction feedback for generating advanced escape behaviors of the robot 100. In some implementations, the stasis indicator assembly 400 includes a magnet placed within one of the spokes 405 to generate rotational feedback the controller 140 via a reed switch.

A number of implementations have been described. Nevertheless, it will be understood that various modifications may be made without departing from the spirit and scope of the disclosure. Although reference has been made to cleaning and/or vacuuming robot by way of examples, it is nonetheless understood that any of the features set forth may also apply to any suitable type of robot or mobile machine which utilizes a free-turning wheel as part of a motion, speed, or stasis-detection system. Accordingly, other implementations are within the scope of the following claims.

What is claimed is:

1. A coverage robot comprising:
   a body;
   a wheeled-drive that maneuvers the body over a surface according to drive commands from a controller in communication with the drive;
   a first stasis sensor carried on the body, and responsive to surface-relative movement of the body, the first stasis sensor comprising:
      a swivel caster assembly comprising a stasis indication wheel freely rotatable about a horizontal axis parallel to the surface and freely rotatable about a second axis at an angle relative to the horizontal axis such that rotation about the second axis causes the wheel to swivel on the surface; and
      a non-contact wheel sensor defining an area of detection around the stasis indication wheel as the wheel freely rotates about the horizontal axis and as the wheel swivels on the surface; and
   a second stasis sensor carried separately on the body from the first stasis sensor, and responsive to surface-relative movement of the body,
   wherein the controller is configured to:
      concurrently monitor sensory output from each of the first and second stasis sensors; and
      determine whether the robot is in a substantially stuck condition or at least partially disengaged from the surface as a function of the drive commands and sensory output from each of the first and second stasis sensors.

2. The coverage robot of claim 1, wherein the controller is further configured to transition from the first stasis sensor to the second stasis sensor as a primary sensor.

3. The coverage robot of claim 2, wherein the controller comprises a transition algorithm to cause a unitary transition from the first stasis sensor to the second stasis sensor.

4. The coverage robot of claim 2, wherein the controller comprises a transition algorithm to cause a progressive transition over time from the first stasis sensor to the second stasis sensor.

5. The coverage robot of claim 2, wherein the controller is further configured to determine when the efficacy of the sensory output from the first stasis sensor has degraded below a predetermined threshold, and to initiate the transition in response to the degradation determination.

6. The coverage robot of claim 1, wherein the controller is further configured to integrate received sensory output from the first stasis sensor with sensory output from the second stasis sensor.

7. The coverage robot of claim 1, wherein the stasis indication wheel comprises a bi-colored wheel with one or more light sections and one or more dark sections, and wherein the wheel sensor comprises an optical sensor that detects transitions between the light and dark sections as the stasis indication wheel spins.

8. The coverage robot of claim 7, wherein the one or more light sections of the stasis indication wheel reflect light of a first infrared wavelength and the one or more dark sections reflect light of a second infrared wavelength different from the first wavelength.

9. The coverage robot of claim 7, wherein the optical sensor comprises:
- a signal emitter disposed remotely from the stasis indication wheel and positioned to direct a signal that sequentially is intercepted by the light and dark sections of the stasis indication wheel; and
- a signal receiver positioned to receive the signal as reflected by the stasis indication wheel as the stasis indication wheel rotates with respect to the emitter.

10. The coverage robot of claim 1, wherein the stasis indication wheel comprises one or more magnetic sections and one or more non-magnetic sections, and wherein the wheel sensor is responsive to the magnetic sections.

11. The coverage robot of claim 1, wherein the stasis indication wheel comprises a hub and multiple spokes extending outwardly from the hub.

12. The coverage robot of claim 1, further comprising a drop wheel sensor arranged to detect vertical displacement of the stasis indication wheel.

13. The coverage robot of claim 1, further comprising a wheel housing carried by the body and shrouding the stasis indication wheel, the wheel housing defining an aperture in a top portion of the wheel housing, exposing the stasis indication wheel to the wheel sensor.

14. The coverage robot of claim 13, wherein the wheel housing is configured to minimize an entry of ambient light into the aperture of the housing.

15. The coverage robot of claim 1, wherein the stasis indication wheel is disposed adjacent a drive wheel.

16. The coverage robot of claim 1, wherein at least one of the first and second stasis sensors comprises a drive motor sensor monitoring a drive motor of the wheeled-drive.

17. The coverage robot of claim 16, wherein the drive motor sensor monitors a drive current drawn by the drive motor.

18. The coverage robot of claim 1, further comprising a cliff signal emitter and a cliff signal receiver, the cliff signal emitter aligned to emit a cliff detection signal onto a floor surface proximate the body, the cliff signal receiver configured to receive the cliff detection signal reflected from the floor surface;
wherein the cliff signal emitter and cliff signal receiver are arranged with respect to the floor surface such that communication between the cliff signal emitter and the cliff signal receiver is affected by vertical movement of the floor surface with respect to the body.

19. The coverage robot of claim 1, wherein the substantially stuck condition is a condition in which one or more wheels of the wheeled-drive are rotating while the robot remains stationary relative to the surface.

20. A coverage robot comprising:
a body;
a wheeled-drive that maneuvers the body over a surface according to drive commands from a controller in communication with the drive;
a first stasis sensor carried on the body, and responsive to surface-relative movement of the body, the first stasis sensor comprising:
swivel caster assembly comprising a stasis indication wheel freely rotatable about a horizontal axis parallel to the surface and freely rotatable about a second axis at an angle relative to the horizontal axis such that rotation about the second axis causes the wheel to swivel on the surface; and
a non-contact wheel sensor defining an area of detection around the stasis indication wheel as the wheel freely rotates about the horizontal axis and as the wheel swivels on the surface; and
a second stasis sensor carried separately on the body from the first stasis sensor, and responsive to surface-relative movement of the body, the second stasis sensor comprising a drive motor sensor monitoring a drive current drawn by a drive motor of the wheeled-drive,
wherein the controller is configured to:
concurrently monitor sensory output from each of the first and second stasis sensors; and
determine whether the robot is in a substantially stuck condition or at least partially disengaged from the surface as a function of the drive commands and sensory output from each of the first and second stasis sensors.

\* \* \* \* \*